US011642653B2

(12) United States Patent
Lawrence et al.

(10) Patent No.: US 11,642,653 B2
(45) Date of Patent: May 9, 2023

(54) HYBRID MATERIAL FOR CHROMATOGRAPHIC SEPARATIONS COMPRISING A SUPERFICIALLY POROUS CORE AND A SURROUNDING MATERIAL

(71) Applicant: Waters Technologies Corporation, Milford, MA (US)

(72) Inventors: Nicole L. Lawrence, Stafford Springs, CT (US); Kevin Daniel Wyndham, Upton, MA (US); Beatrice W. Muriithi, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 305 days.

(21) Appl. No.: 16/082,823

(22) PCT Filed: Mar. 6, 2017

(86) PCT No.: PCT/US2017/020954
§ 371 (c)(1),
(2) Date: Sep. 6, 2018

(87) PCT Pub. No.: WO2017/155884
PCT Pub. Date: Sep. 14, 2017

(65) Prior Publication Data
US 2019/0091657 A1 Mar. 28, 2019

Related U.S. Application Data

(60) Provisional application No. 62/304,261, filed on Mar. 6, 2016, provisional application No. 62/304,254, filed (Continued)

(51) Int. Cl.
*B01J 20/283* (2006.01)
*B01J 20/22* (2006.01)
(Continued)

(52) U.S. Cl.
CPC ......... *B01J 20/283* (2013.01); *B01D 15/206* (2013.01); *B01J 20/22* (2013.01);
(Continued)

(58) Field of Classification Search
None
See application file for complete search history.

(56) References Cited

U.S. PATENT DOCUMENTS 3,808,125 A    4/1974   Good
3,892,678 A    7/1975   Halasz et al.
(Continued)

FOREIGN PATENT DOCUMENTS

CN    101657325 A    2/2010
CN    102471513 A    5/2012
(Continued)

OTHER PUBLICATIONS

Britt et al. Monitoring Silane Sol-Gel Kinetics with In-Situ Optical Turbidity Scanning and Dynamic Light Scattering. Molecules 2019, 24, 2931. (Year: 2019).*

(Continued)

*Primary Examiner* — Kara M Peo
(74) *Attorney, Agent, or Firm* — Womble Bond Dickinson (US) LLP; Deborah M. Vernon

(57) ABSTRACT

The present invention provides novel chromatographic materials, e.g., for chromatographic separations, processes for their preparation and separations devices containing the chromatographic materials. The preparation of the inorganic/organic hybrid materials of the invention wherein a surrounding material is condensed on a superficially porous hybrid core material will allow for families of different hybrid packing materials to be prepared from a single core hybrid material. Differences in hydrophobicity, ion-exchange capacity, chemical stability, surface charge or silanol (Continued)

activity of the surrounding material may be used for unique chromatographic separations of small molecules, carbohydrates, antibodies, whole proteins, peptides, and/or DNA.

21 Claims, 15 Drawing Sheets

Related U.S. Application Data on Mar. 6, 2016, provisional application No. 62/304,259, filed on Mar. 6, 2016.

(51) Int. Cl.
  *B01J 20/28* (2006.01)
  *B01J 20/285* (2006.01)
  *B01J 20/286* (2006.01)
  *B01J 20/32* (2006.01)
  *B01D 15/20* (2006.01)

(52) U.S. Cl.
  CPC ....... *B01J 20/28004* (2013.01); *B01J 20/285* (2013.01); *B01J 20/286* (2013.01); *B01J 20/28009* (2013.01); *B01J 20/28016* (2013.01); *B01J 20/28019* (2013.01); *B01J 20/28042* (2013.01); *B01J 20/28057* (2013.01); *B01J 20/28059* (2013.01); *B01J 20/28061* (2013.01); *B01J 20/28064* (2013.01); *B01J 20/28066* (2013.01); *B01J 20/28069* (2013.01); *B01J 20/28071* (2013.01); *B01J 20/28073* (2013.01); *B01J 20/28076* (2013.01); *B01J 20/28078* (2013.01); *B01J 20/28083* (2013.01); *B01J 20/28085* (2013.01); *B01J 20/28092* (2013.01); *B01J 20/28095* (2013.01); *B01J 20/324* (2013.01); *B01J 20/3204* (2013.01); *B01J 20/3234* (2013.01); *B01J 20/3236* (2013.01); *B01J 20/3257* (2013.01); *B01J 20/3272* (2013.01); *B01J 20/3285* (2013.01); *B01J 20/3289* (2013.01); *B01J 20/3293* (2013.01); *B01J 20/3295* (2013.01); *B01J 20/28007* (2013.01); *B01J 20/28097* (2013.01); *B01J 20/32* (2013.01); *B01J 20/3242* (2013.01); *B01J 2220/46* (2013.01); *B01J 2220/56* (2013.01); *B01J 2220/82* (2013.01)

(56) References Cited

U.S. PATENT DOCUMENTS

| | | |
|---|---|---|
| 3,935,299 A | 1/1976 | Kiselev et al. |
| 4,017,528 A | 4/1977 | Unger et al. |
| 4,029,583 A | 6/1977 | Ho Chang et al. |
| 4,104,363 A | 8/1978 | Vozka et al. |
| 4,169,069 A | 9/1979 | Unger et al. |
| 4,324,689 A | 4/1982 | Shah |
| 4,327,191 A | 4/1982 | Dromard et al. |
| 4,334,118 A | 6/1982 | Manning |
| 4,415,631 A | 11/1983 | Schutijser |
| 4,477,492 A | 10/1984 | Bergna et al. |
| 4,724,207 A | 2/1988 | Hou et al. |
| 4,775,520 A | 10/1988 | Unger et al. |
| 4,874,518 A | 10/1989 | Kirkland et al. |
| 4,889,632 A | 12/1989 | Svec et al. |
| 4,911,903 A | 3/1990 | Unger et al. |
| 4,923,610 A | 5/1990 | Svec et al. |
| 4,952,349 A | 8/1990 | Svec et al. |
| 4,983,369 A | 1/1991 | Barder et al. |
| 5,068,387 A | 11/1991 | Kleyer et al. |
| 5,071,565 A | 12/1991 | Fritz et al. |
| 5,108,595 A | 4/1992 | Kirkland et al. |
| 5,137,627 A | 8/1992 | Feibush |
| 5,154,822 A | 10/1992 | Simpson et al. |
| 5,177,128 A | 1/1993 | Lindemann et al. |
| 5,194,333 A | 3/1993 | Ohnaka et al. |
| 5,250,186 A | 10/1993 | Dollinger et al. |
| 5,256,386 A | 10/1993 | Nystrom et al. |
| 5,271,833 A | 12/1993 | Funkenbusch et al. |
| 5,298,833 A | 3/1994 | Hou |
| 5,304,243 A | 4/1994 | Yamaguchi et al. |
| 5,374,755 A | 12/1994 | Neue et al. |
| 5,378,790 A | 1/1995 | Michalczyk et al. |
| 5,403,908 A | 4/1995 | Watanabe et al. |
| 5,425,930 A | 6/1995 | Anderson |
| 5,453,185 A | 9/1995 | Frechet et al. |
| 5,498,678 A | 3/1996 | Steffier |
| 5,548,051 A | 8/1996 | Michalczyk et al. |
| 5,558,849 A | 9/1996 | Sharp |
| 5,565,142 A | 10/1996 | Deshpande et al. |
| 5,624,875 A | 4/1997 | Nakanishi et al. |
| 5,637,135 A | 6/1997 | Ottenstein et al. |
| 5,650,474 A | 7/1997 | Yamaya et al. |
| 5,651,921 A | 7/1997 | Kaijou |
| 5,667,674 A | 9/1997 | Hanggi et al. |
| 5,670,257 A | 9/1997 | Sakai et al. |
| 5,728,457 A | 3/1998 | Frechet et al. |
| 5,734,020 A | 3/1998 | Wong |
| 5,856,379 A | 1/1999 | Shiratsuchi et al. |
| 5,866,006 A | 2/1999 | Lihme et al. |
| 5,869,152 A | 2/1999 | Colon |
| 5,965,202 A | 10/1999 | Taylor-Smith et al. |
| 5,976,479 A | 11/1999 | Alcaraz et al. |
| 5,988,655 A | 11/1999 | Sakai et al. |
| 6,017,632 A | 1/2000 | Pinnavaia et al. |
| 6,022,902 A | 2/2000 | Koontz |
| 6,027,643 A | 2/2000 | Small et al. |
| 6,090,477 A | 7/2000 | Burchell et al. |
| 6,136,187 A | 10/2000 | Zare et al. |
| 6,183,867 B1 | 2/2001 | Barthel et al. |
| 6,207,098 B1 | 3/2001 | Nakanishi et al. |
| 6,210,570 B1 | 4/2001 | Holloway |
| 6,227,304 B1 | 5/2001 | Schlegel |
| 6,238,565 B1 | 5/2001 | Hatch |
| 6,248,686 B1 | 6/2001 | Inagaki et al. |
| 6,251,280 B1 | 6/2001 | Dai et al. |
| 6,271,292 B1 | 8/2001 | Mager et al. |
| 6,277,304 B1 | 8/2001 | Wei et al. |
| 6,281,257 B1 | 8/2001 | Ma et al. |
| 6,288,198 B1 | 9/2001 | Mechtel et al. |
| 6,313,219 B1 | 11/2001 | Taylor-Smith |
| 6,375,864 B1 | 4/2002 | Phillips et al. |
| 6,380,266 B1 | 4/2002 | Katz et al. |
| 6,395,341 B1 | 5/2002 | Arakawa et al. |
| 6,465,387 B1 | 10/2002 | Pinnavaia et al. |
| 6,476,098 B1 | 11/2002 | Arakawa et al. |
| 6,491,823 B1 | 12/2002 | Safir et al. |
| 6,528,167 B2 | 3/2003 | O'Gara |
| 6,599,951 B2 | 7/2003 | Zampini et al. |
| 6,663,668 B1 | 12/2003 | Chaouk et al. |
| 6,686,035 B2 | 2/2004 | Jiang et al. |
| 6,881,804 B1 | 4/2005 | Sellergren et al. |
| 7,064,234 B2 | 6/2006 | Lindner et al. |
| 7,175,913 B2 | 2/2007 | OGara |
| 7,211,192 B2 | 5/2007 | Shea et al. |
| 7,223,473 B2 | 5/2007 | Jiang et al. |
| 7,250,214 B2 | 7/2007 | Walter et al. |
| 7,439,272 B2 | 10/2008 | Xu |
| 7,488,559 B2 | 2/2009 | Inagaki et al. |
| 7,846,337 B2 | 12/2010 | Chen et al. |
| 7,919,177 B2 | 4/2011 | Jiang et al. |
| 8,404,346 B2 | 3/2013 | Walter et al. |
| 8,658,277 B2 | 2/2014 | Wyndham et al. |
| 2001/0033931 A1 | 10/2001 | Jiang et al. |
| 2002/0070168 A1 | 6/2002 | Jiang et al. |
| 2003/0150811 A1 | 8/2003 | Walter et al. |
| 2004/0035793 A1 | 2/2004 | Legendre, Jr. et al. |
| 2004/0048067 A1 | 3/2004 | O'Gara |
| 2004/0191516 A1 | 9/2004 | Jiang et al. |
| 2005/0051489 A1 | 3/2005 | Tai et al. |
| 2005/0178730 A1 | 8/2005 | Li |

(56) References Cited

U.S. PATENT DOCUMENTS

| | | | |
|---|---|---|---|
| 2005/0230298 A1 | 10/2005 | Jiang et al. | |
| 2005/0281884 A1 | 12/2005 | Mair et al. | |
| 2006/0070937 A1 | 4/2006 | Rustamov et al. | |
| 2006/0194919 A1 | 8/2006 | Lichtenhan et al. | |
| 2006/0207923 A1 | 9/2006 | Li | |
| 2007/0090052 A1 | 4/2007 | Broske et al. | |
| 2007/0135304 A1 | 6/2007 | Walter et al. | |
| 2007/0189944 A1 | 8/2007 | Kirkland | |
| 2007/0215547 A1 | 9/2007 | O'Gara | |
| 2007/0243383 A1 | 10/2007 | Jiang et al. | |
| 2008/0053894 A1 | 3/2008 | O'Gara | |
| 2008/0269368 A1 | 10/2008 | Wyndham et al. | |
| 2008/0277346 A1 | 11/2008 | Kirkland et al. | |
| 2009/0053524 A1* | 2/2009 | Yamada | B01J 20/103 428/404 |
| 2009/0127177 A1 | 5/2009 | Jiang et al. | |
| 2009/0209722 A1 | 8/2009 | Jiang et al. | |
| 2009/0277838 A1 | 11/2009 | Liu et al. | |
| 2009/0277839 A1 | 11/2009 | Linford | |
| 2009/0297853 A1 | 12/2009 | Kirkland et al. | |
| 2009/0311533 A1 | 12/2009 | Chen | |
| 2010/0005187 A1 | 1/2010 | Breiter et al. | |
| 2010/0051877 A1 | 3/2010 | Wei et al. | |
| 2010/0076103 A1 | 3/2010 | Wyndham et al. | |
| 2010/0206797 A1 | 8/2010 | Chen et al. | |
| 2012/0055860 A1 | 3/2012 | Wyndham | |
| 2013/0112605 A1 | 5/2013 | Wyndham et al. | |
| 2013/0135610 A1 | 5/2013 | Bouvier et al. | |
| 2013/0206665 A1 | 8/2013 | Wyndham et al. | |
| 2014/0284259 A1 | 9/2014 | Jiang et al. | |
| 2016/0184736 A1 | 6/2016 | Wyndham et al. | |

FOREIGN PATENT DOCUMENTS

| | | |
|---|---|---|
| CN | 102527354 A | 7/2012 |
| CN | 103551132 A | 2/2014 |
| CN | 104138751 A | 11/2014 |
| EP | 0852334 A1 | 7/1998 |
| EP | 1163050 A1 | 12/2001 |
| JP | S5080400 A | 6/1975 |
| JP | S58120525 A | 7/1983 |
| JP | 59054619 A | 3/1984 |
| JP | S60257358 A | 12/1985 |
| JP | H04187237 A | 7/1992 |
| JP | 06064915 A | 3/1994 |
| JP | H07120450 A | 5/1995 |
| JP | H07247180 A | 9/1995 |
| JP | H09278485 A | 10/1997 |
| JP | H1062401 A | 3/1998 |
| JP | H10328558 A | 12/1998 |
| JP | 2893104 B2 | 5/1999 |
| JP | H11199351 A | 7/1999 |
| JP | 2009540276 A | 11/2009 |
| WO | 98058253 A1 | 12/1998 |
| WO | 99037705 A1 | 7/1999 |
| WO | 0045951 A1 | 8/2000 |
| WO | 0118790 A1 | 3/2001 |
| WO | 0237506 A1 | 5/2002 |
| WO | 0314450 A1 | 5/2002 |
| WO | 0322392 A1 | 5/2002 |
| WO | 02060562 A1 | 8/2002 |
| WO | 0441398 A2 | 5/2004 |
| WO | 2005079427 A2 | 9/2005 |
| WO | 2006019988 A1 | 2/2006 |
| WO | 2007140963 A1 | 12/2007 |
| WO | 2008085435 A1 | 7/2008 |
| WO | 2008103423 A1 | 8/2008 |
| WO | 2009126207 A1 | 10/2009 |
| WO | 2014201033 A1 | 12/2014 |

OTHER PUBLICATIONS

Issa et al. Kinetics of Alkoxysilanes and Organoalkoxysilanes Polymerization: A Review. Polymers 2019, 11, 537. (Year: 2019).*

International Search Report and Written Opinion for International Application No. PCT/US2017/020859 dated Jul. 14, 2017, 21 pages.

Kirkland, J. J. et al., "Superficially Porous Silica Microspheres for Fast High-Performance Liquid Chromatography of Macromolecules", Journal of Chromatography A, Elsevier, Amsterdam, NL, vol. 890, No. 1, pp. 3-13, Aug. 18, 2000.

Cabrera, K. et al., "SilicaROD™—A New Challenge in Fast High-Performance Liquid Chromatography Separations", Trac Trends in Analytical Chemistry, Elsevier, Amsterdam, NL, vol. 17, No. 1, pp. 50-53, Jan. 1, 1998.

International Search Report and Written Opinion for International Application No. PCT/US2017/020907 dated Aug. 4, 2017, 31 pages.

International Search Report and Written Opinion for International Application No. PCT/US2017/020954, dated Jul. 26, 2017, 33 pages.

International Preliminary Report on Patentability for International Application No. PCT/US2017/020859 dated Sep. 20, 2018, 16 pages.

International Preliminary Report on Patentability for International Application No. PCT/US2017/020907 dated Sep. 20, 2018, 24 pages.

International Preliminary Report on Patentability for International Application No. PCT/US2017/020954 dated Sep. 20, 2018, 25 pages.

Communication pursusant to Article 94(3) EPC, for Application No. 17712323.9, dated Apr. 1, 2020, 6 pages.

Communication pursuant to Article 94(3) EPC, for Application No. 17712897.2, dated Apr. 1, 2020, 7 pages.

Communication pursuant to Article 94(3) EPC, for Application No. 17713809.6 dated Apr. 2, 2020, 8 pages.

Englehardt, H., and Mathes, D., "Chemically bonded stationary phases for aqueous high-performance exclusion chromatoqraphy", Journal of Chromatoqraphy, 142:311-320 (1977).

Porsch, B., "Epoxy- and dial-modified silica: optimization of surface bonding reaction," Journal of Chromatoqraphy A, 653, 1-7 (1993).

Asiaie, R., et al. "Sintered Octadecylsilica as Monolithic Column Packing in Capillary Electrochromatography and Micro High-Performacne Liquid Chromatography", J. Chromatogr. A, 806: 251-263 (1998).

Bereznitski, Y., et al. "Characterization of silica-based octyl phases of different bonding density Part II. Studies of surface properties and chromatographic selectivity," J. Chromatogr. A 828:59-73 (1998).

Boury, B., et al. "Generation of porosity in a hybrid organic-inorganic xerogel by chemical treatment," New J. Chem. 23: 531-538 (1999).

Boury, B., et al., "Hybrid organic-inorganic xerogel access to mesa- and microporous silica by thermal and chemical treatment," Chem. Mater. 11:281-291 (1999).

Collioud, A., et al. "Oriented and covalent immobilization of target molecules to solid supports: CG synthesis and application of a light-activatable and thiol-reactive cross-linking reagent," Bioconiuqate 4:528-536 (1993).

Czajkowska. T., et al., "Adsorption, thermogravimetric, and chromatographic studies of bare silicas and silica-based octyl bonded phases," J. Lia. Chromatoqr. Relat. Technol. 21 :1957-1977 (1998).

Chujo, Y., et al., "New Preparative Methods for Organic-Inorganic Polymer Hybrids", Polymeric Materials: Science Engineering 84, 783 (2001).

Chujo, Y., et al., "New Preparative Methods for Organic=Inorganic Polymer Hybrids", MRS Bulletin/May 2001; 389-392.

Dulay., M.T., et al., "Preparation and Characterization of Monolithic Porous Capillary Columns Loaded with Chromatoqraphic Particles", Anal. Chem., 70(23): 5103-5107 (1998).

Feng, Q., et al., "Synthesis of Polymer-Modified Mesoporous Materials Via the Nonsurfactant-Templated Sol-Gel Process", Polymer Preprints 41(1):515-516 (2000).

Feng, Q., et al., "Synthesis of Polystyrene-silica hybrid mesoporous materials via the nonsurfactant-templated Sol-Gel Process", J. Mater. Chem., 10:2490-2494 (2000).

(56) References Cited

OTHER PUBLICATIONS

Goldstein, A., et al., "Microwave Sintereing of Amorphous Silica Powders", J. of Mat. Sci. Letters, 16: 310-312 (1997).

Grun, M., et al., "Novel pathways for the preparation of mesoporous MCM-41 materials: control of porosity and morphology", Microporous and Mesoporous Materials 27:207 (1999).

Hileman, F.D., et al., "In Situ Preparation and Evaluation of Open Pore Polyurethane Chromatographic Columns", Anal. Chem. 45:1126 (1973).

Hanson, M. J., "Polymer-coated reversed-phase packings in high-performance liquid chromatography", Chromatography A, 656, pp. 369. (1993) Abstract.

Inagaki, S., et al., "Novel Mesoporous Materials with a Uniform Distribution of Organic Groups and Inorganic Oxide in Their Frameworks", J. Am. Chem. Soc. 121:9611 (1999).

Jones, G.R., and Landais, Y., "The oxidation of the carbon-silicon bond," Tetrahedron, 52(22):7599-7662 (1996).

Maskos, U., and Southern, E.M., et al., "Oligonucleotide hybridizations on glass supports: a novel linker for oligonucleotide synthesis and hybridization properties of oligonucleotides synthesised in situ," Nucleic Acids Research 20(7):1679-1684 (1992).

MacBeath, G. and Schreiber, S.L.,"Printing proteins as microarrays for high-throughput function determination," Science 289:1760-1763 (2000).

Nawrocki, J., and Buszewski, B.,"Influence of silica surface chemistry and structure on the properties, structure and coverage of alkyl-bonded phases for high-performance liquid chromatography," J. of Chromatoqraphy 449(1 ):1-24 (1988).

Nawrocki, "Silica surface controversies, strong adsorption sites, their blockage and removal. Part 1," 1991. Chromatoqraphia 31 (3-4):177-192.

Neue, U.D., et al., "Use of high-performance LC packings from pH 1 to pH 12," American Laboratory, p. 36-39 (1999).

O'Gara, J.E., et al., "Simple preparation of C8 HPLC stationary phase with an internal polar functional qroup," Analytical Chemistry 67:3809-13 (1995).

O'Gara, J.E., et al., "Dependence of cyano bonded phase hydrolytic stability on ligand structure and solution PH," J. Chromatogr. A 893:245-251 (2000).

Petro, M., and Berek, D., "Polymers Immobilized on Silica Gels as Stationary Phases for Liquid Chormatography", Chromatoqrahia, 9/10:549 (1993).

Perry, R.J., "Applications for cross-linked siloxane particles", Chemtech, 29(2):39-44 (1999) Abstract.

Reynolds, K.J., and Colon, L.A., "Submicron sized organo-silica spheres for capillary electrochromatography," J. Liq. Chrom Rel. Technol., 23(1):161-173 (2000).

Silsesquixanes—An Introduction to Hybrid Inorganic—Organic Composites—Data by Sigma Aldrich [online] [retrieved on Dec. 4, 2006] Retrieved from Internnet URL: http://www.azom.com/details.aspArticle1D=2934.

Tamaki, R., et al., "Synthesis of polystyrene/silica gel polymer hybrids by in-situ polymerization method", Polymer Bulletin 39:303-310 (1997).

Tamao, K. "Oxidative cleavage of the silicon-carbon bond: Development, mechanism, scope, and limitations," 1996 Advances in Silicon Chemistry, 3:1-62.

Tamao et al., "Oxidative cleavage of silicon-carbon bonds in organosilicon flourides to alcohols," 1982 Tetrahedron 39 (6):983-990.

Tamao, K., et al., "Hydrogen peroxide oxidation of the silicon-carbon bond in organoalkoxysilanes," Organometallics 2:1694-1696 (1983).

Tang et al., "Monolithic Columns Containing Sol-Gel Bonded Octadecylsilica for Capillary Electrochrmoatography", J. Chromatogr. A, 837: 35-50 (1999). Abstract.

Tang et al., "Continuous-Bed Columns Containing Sol-Gel Bonded Octadecylsilica for Capillary Liquid Chromatography", J Microcolumn Separations, 12: 6-12 (2000) Abstract.

Ueno et al., "Compaction and Sintering Behavior of Silica Particles Surface-Modified by Al Chelate Compounds", Journal of the Ceramic Society of Japan, 109(3): 210-216 (2001 ).

Unger et al., "Recent developments in the evaluation of chemically bonded silica packings for liquid chromatography," J Chromatogr. 1976, 125(1): 115-127 Abstract.

Wei, Y and Qiu, K-y., et al., "Synthesis and Biotechnological Application of Vinyl Polymer-Inorganic Hybrid and Mesoporous Materials", Chinese Journal of Polymer Science, 18(1):1-7 (2000).

Wei , Y.,et al., "Polymethacrylate-Silica Hybrid Nanoporous Materials: A Bridge Between Inorganic and Polymeric Molecular Sieves", Adv. Mater. 12(19):1448-1450 (2000).

Xin, B., and Lee, M., "Design and Evaluation of a New Capillary Electrochromatography System", Electrophoresis, 20: 67-73 (1999).

Yang, A., and Li, T., "Oxidative cleavage of carbon-silicon bond as a new method to characterize bonded stationary phases on silica gel," Anal. Chem. 70:2827-2830 (1998).

Inagaki, S., et al., "An ordered mesoporous organosilica hybrid material with a crystal-like wall structure," Nature 416 (6878):304-307 (2002) Abstract.

Wyndham, K.D., et al. "Characterization and Evaluation of C18 HPLC Stationary Phases Based on Ethyl-Bridged Hybrid Organic/Inorganic Particles", Analytical Chemistry, 75(24): 6781-6788 (2003).

Communication pursuant to Article 94(3) EPC for Application No. 17712323.9 dated Apr. 1, 2020, 5 pages.

\* cited by examiner (a)

(b)

(a)

(b)

(c)

(a)

(b)

(a) (b)

(c) (d)

HYBRID MATERIAL FOR CHROMATOGRAPHIC SEPARATIONS COMPRISING A SUPERFICIALLY POROUS CORE AND A SURROUNDING MATERIAL

CROSS-REFERENCE TO RELATED APPLICATIONS

This application is a national phase filing claiming the benefit of and priority to International Patent Application No. PCT/US2017/020954, filed on Mar. 6, 2017, which claims the benefit of and priority to U.S. Provisional Application Ser. No. 62/304,254 filed Mar. 6, 2016; U.S. Provisional Application Ser. No. 62/304,259 filed Mar. 6, 2016; and U.S. Provisional Application Ser. No. 62/304,261 filed Mar. 6, 2016, the disclosures of which are herein incorporated by reference in their entirety.

This application also relates to U.S. Provisional Application Ser. No. 61/183,075 filed Jun. 1, 2009; U.S. Provisional Application Ser. No. 61/367,797 filed Jul. 26, 2010; International Application Ser. No. PCT/US2010/036835 filed Jun. 1, 2010; and International Application Ser. No. PCT/US2011/045246 filed Jul. 25, 2011; the disclosures of which are herein incorporated by reference in their entirety.

BACKGROUND OF THE INVENTION

Packing materials for liquid chromatography (LC) are generally classified into two types: organic materials, e.g., polydivinylbenzene, and inorganic materials typified by silica. Many organic materials are chemically stable against strongly alkaline and strongly acidic mobile phases, allowing flexibility in the choice of mobile phase pH. However, organic chromatographic materials generally result in columns with low efficiency, particularly with low molecular-weight analytes. Many organic chromatographic materials not only lack the mechanical strength of typical chromatographic silicas, but they also shrink and swell when the composition of the mobile phase is changed.

Silica is the material most widely used in High Performance Liquid Chromatography (HPLC). The most common applications employ silica that has been surface-derivatized with an organic functional group such as octadecyl (C18), octyl (C8), phenyl, amino, cyano, etc. As stationary phases for HPLC, these packing materials result in columns that have high efficiency and do not show evidence of shrinking or swelling.

There remains a need for alternative materials that are chemically stable and provide additional mechanical strength, increased column efficiency, and chromatographic selectivity.

SUMMARY OF THE INVENTION

The present invention provides novel chromatographic materials, e.g., for chromatographic separations, processes for its preparation and separations devices containing the chromatographic material. The preparation of the inorganic/organic hybrid materials of the invention wherein a surrounding material is condensed on a superficially porous core material will allow for families of different hybrid packing materials to be prepared from a single superficially porous material. Differences in hydrophobicity, ion-exchange capacity, surface charge or silanol activity of the surrounding material may be used for unique chromatographic separations of small molecules, carbohydrates, antibodies, whole proteins, peptides, and/or DNA. In addition, by selecting a polyorganosiloxane (POS) with functional groups (e.g., pendant alkyl amines, alcohols, carboxylic acids, alkene or cyano group) that are relevant for a given chromatographic application, new hybrid materials may be prepared that have synthetically useful pendant groups near the surface of the particles.

Thus in one aspect, the invention provides an inorganic/organic hybrid material comprising an inorganic/organic hybrid surrounding material and a superficially porous core.

In certain aspects, the inorganic/organic hybrid surrounding material and the superficially porous core are composed of different materials. In other aspects the inorganic/organic hybrid surrounding material and the superficially porous core are composed of the same materials.

In yet other aspects the inorganic/organic hybrid surrounding material is composed of a material which enhances one or more of the characteristics selected from the group consisting of chromatographic selectivity, particle chemical stability, column efficiency, and mechanical strength. Similarly, in other aspects, the superficially porous core is composed of a material which enhances one or more characteristics selected from the group consisting of chromatographic selectivity, particle chemical stability, column efficiency, and mechanical strength.

In other aspects, the inorganic/organic surrounding material is composed of a material which provides a change in hydrophilic/lipophilic balance (HLB), surface charge (e.g., isoelectric point or silanol pKa), and/or surface functionality for enhanced chromatographic separation.

In still other aspects, the inorganic/organic hybrid surrounding material is independently derived from condensation of one or more polymeric organofunctional metal precursors, and/or polymeric metal oxide precursors on the surface of the superficially porous core, or application of partially condensed polymeric organofunctional metal precursors, a mixture of two or more polymeric organofunctional metal precursors, or a mixture of one or more polymeric organofunctional metal precursors with a polymeric metal oxide precursor(s) on the surface of the superficially porous core.

In certain aspects, the inorganic portion of the inorganic/organic hybrid surrounding material is independently selected from the group consisting of alumina, silica, titania, cerium oxide, or zirconium oxides, and ceramic materials.

In still other aspects, the inorganic/organic hybrid surrounding material is independently derived from condensation of one or more organofunctional silanes and/or tetraalkoxysilane on the surface of the superficially porous core, or application of partially condensed organofunctional silane, a mixture of two or more organofunctional silanes, or a mixture of one or more organofunctional silanes with a tetraalkoxysilane (i.e., tetraethoxysilane, tetramethoxysilane) on the surface of the superficially porous core.

In some aspects, the inorganic/organic hybrid surrounding material may be independently porous or nonporous. Furthermore, the pore structure of the inorganic/organic hybrid surrounding material may independently possess or not possess an ordered pore structure. In certain aspects, the inorganic/organic hybrid surrounding material may have a chromatographically enhancing pore geometry (CEPG).

In other aspects, the inorganic/organic hybrid surrounding material may independently comprise from 0-100 mol % hybrid material. In specific aspects, the inorganic portion of the inorganic/organic hybrid surrounding material may independently be present in an amount ranging from about 0 molar % to not more than about 25 molar %, wherein the pores of the inorganic/organic hybrid surrounding material are substantially disordered. Similarly, the inorganic portion of the inorganic/organic hybrid surrounding material may independently be present in an amount ranging from about 25 molar % to not more than about 50 molar %, wherein the pores of the inorganic/organic hybrid surrounding material are substantially disordered, and wherein the inorganic/organic hybrid surrounding material independently possesses a chromatographically enhancing pore geometry (CEPG).

In some aspects, the inorganic/organic hybrid surrounding material may comprise a material of formula I:

$$(SiO_2)_d/[R^2((R)_p(R^1)_qSiO_t)_m];\quad\text{(I)}$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0;

t is 0.5, 1.0, or 1.5;

d is 0 to about 30;

m is an integer from 1-20; wherein R, $R^1$ and $R^2$ are optionally substituted; provided that:

(1) when $R^2$ is absent, $m = 1$ and $t = \dfrac{(4-(p+q))}{2}$, when $0 < p + q \le 3$; and (2) when $R^2$ is present, $m = 2\text{-}20$ and $t = \dfrac{(3-(p+q))}{2}$, when $p + q \le 2$.

In other aspects, the inorganic/organic hybrid surrounding material may comprise a material of formula II:

$$(SiO_2)_d/[(R)_p(R^1)_qSiO_t]\quad\text{(II)};$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In still other aspects, the inorganic/organic hybrid surrounding material may comprise a material of formula III:

$$(SiO_2)_d/[R^2((R^1)_rSiO_t)_m]\quad\text{(III)}$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

In yet aspects, the inorganic/organic hybrid surrounding material may comprise a material of formula IV:

$$(A)x(B)y(C)z\quad\text{(IV)},$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x and y are positive numbers and z is a non negative number, wherein x+y+z=1. In certain embodiments, when z=0, then 0.002≤x/y≤210, and when z≠0, then 0.0003≤y/z≤500 and 0.002≤x/(y+z)≤210.

In still yet other aspects, the inorganic/organic hybrid surrounding material may comprise a material of formula V:

$$(A)x(B)y(B^*)y^*(C)z\quad\text{(V)},$$

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y, and y* are positive numbers and z is a non negative number, wherein x+y+z=1. In certain embodiments, when z=0, then 0.002≤x/(y+y*)≤210, and when z≠0, then 0.0003≤ (y+y*)/z≤500 and 0.002≤x/(y+y*+z)≤210.

In some aspects, the hybrid content of the superficially porous core ranges from 1-100 mol % hybrid or from 4-100 mol % hybrid. In certain aspects, the structure of the superficially porous core may independently possess or not possess a copolymeric structure. Similarly, the pore structure of the superficially porous core may independently to possess or not possess an ordered pore structure.

In some aspects, the superficially porous core has a substantially nonporous core and one or more layers of hybrid shell layer of formula I:

$$(SiO_2)_d/[R^2((R)_p(R^1)_qSiO_t)_m];\quad\text{(I)}$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0;
t is 0.5, 1.0, or 1.5;
d is 0 to about 30;
m is an integer from 1-20; wherein R, $R^1$ and $R^2$ are optionally substituted; provided that:

(1) when $R^2$ is absent, $m = 1$ and $t = \frac{(4-(p+q))}{2}$, when $0 < p + q \leq 3$; and (2) when $R^2$ is present, $m = 2-20$ and $t = \frac{(3-(p+q))}{2}$, when $p + q \leq 2$.

In other aspects, the superficially porous core has a substantially nonporous core and one or more layers of hybrid shell layer of formula II:

$$(SiO_2)_d/[(R)_p(R^1)_q SiO_t] \tag{II}$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In still other aspects, the superficially porous core has a substantially nonporous core and one or more layers of hybrid shell layer of formula III:

$$(SiO_2)_d/[R^2((R^1)SiO_r)_m] \tag{III}$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

In still yet other aspects, the superficially porous core has a substantially nonporous core and one or more layers of hybrid shell layer of formula IV:

$$(A)_x(B)_y(C)_z \tag{IV},$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x and y are positive numbers and z is a non negative number, wherein x+y+z=1. In certain embodiments, when z=0, then 0.002≤x/y≤210, and when z≠0, then 0.0003≤y/z≤500 and 0.002≤x/(y+z)≤210.

In yet other aspects, the superficially porous core has a substantially nonporous core and one or more layers of hybrid shell layer of formula V:

$$(A)_x(B)_y(B^*)_{y^*}(C)_z \tag{V},$$

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y, and y* are positive numbers and z is a non negative number, wherein x+y+z=1. In certain embodiments, when z=0, then 0.002≤x/(y+y*)≤210, and when z≠0, then 0.0003≤(y+y*)/z≤500 and 0.002≤x/(y+y*+z)≤210.

In certain aspects, the invention provides an inorganic/organic hybrid material wherein the superficially porous core and/or the inorganic/organic hybrid surrounding material is a porous hybrid inorganic/organic material comprising ordered domains have formula IV, V or VI below:

$$(A)_x(B)_y(C)_z \tag{Formula IV}$$

wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x, y are positive numbers and z is a non negative number, wherein x+y+z=1. In certain embodiments, when z=0, then 0.002≤x/y≤210, and when z≠0, then 0.0003≤y/z≤500 and 0.002≤x/(y+z)≤210;

$$(A)_x(B)_y(B^*)_{y^*}(C)_z \tag{Formula V}$$

wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y are positive numbers and z is a non negative number, wherein x+y+z=1. In certain embodiments, when z=0, then 0.002≤x/(y+y*)≤210, and when z≠0, then 0.0003≤(y+y*)/z≤500 and 0.002≤x/(y+y*+z)≤210; or $$[A]_y[B]_x \quad \text{(Formula VI)},$$

wherein x and y are whole number integers and A is $$SiO_2/(R^1_pR^2_qSiO_t)_n \text{ or } SiO_2/[R^3(R^1_rSiO_t)_m]_n;$$

wherein $R^1$ and $R^2$ are independently a substituted or unsubstituted $C_1$ to $C_7$ alkyl group, or a substituted or unsubstituted aryl group, $R^3$ is a substituted or unsubstituted $C_1$ to $C_7$ alkyl, alkenyl, alkynyl, or arylene group bridging two or more silicon atoms, p and q are 0, 1, or 2, provided that p+q=1 or 2, and that when p+q=1, t=1.5, and when p+q=2, t=1; r is 0 or 1, provided that when r=0, t=1.5, and when r=1, t=1; m is an integer greater than or equal to 2; and n is a number from 0.01 to 100;

B is.

$$SiO_2/(R^4_vSiO_t)_n$$

wherein $R^4$ is hydroxyl, fluorine, alkoxy, aryloxy, substituted siloxane, protein, peptide, carbohydrate, nucleic acid, or combinations thereof, $R^4$ is not $R^1$, $R^2$, or $R^3$; v is 1 or 2, provided that when v=1, t=1.5, and when v=2, t=1; and n is a number from 0.01 to 100;

wherein the material of formula VI has an interior area and an exterior surface, and said interior area of said material has a composition represented by A; said exterior surface of said material has a composition represented by A and B, and wherein said exterior composition is between about 1 and about 99% of the composition of B and the remainder comprising A.

In some aspects, the invention provides an inorganic/organic hybrid material in which the superficially porous core is a monolith, a particle or a spherical particle.

In other aspects, the invention provides an inorganic/organic hybrid material which has been surface modified by coating with a polymer. In certain aspects, the inorganic/organic hybrid material has been surface modified with a surface modifier having the formula $Z_a(R')_bSi$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In certain aspects, the invention provides an inorganic/organic hybrid material further comprising a nanoparticle dispersed within the superficially porous core and/or the inorganic/organic hybrid surrounding material. In other aspects, the nanoparticle may be a mixture of more than one nanoparticle and may be crystalline or amorphous. In still other aspects, the nanoparticle may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, and nitrides thereof.

In another aspect, the invention provides, an inorganic/organic hybrid particle comprising a superficially porous particle core with an inorganic/organic hybrid surrounding material wherein said particle has the formula $$(Y(CH_2)_mSiO_{1.5})_x(O_{1.5}SiCH_2CH_2SiO_{1.5})_y(SiO_2)_z$$

wherein:

each Y is independently —OH, —NH$_2$, —NR$_2$, —NR$_2$R'$^+$, SH, S(O)$_{0-2}$R, S(O)$_{0-2}$O$^-$, $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroarylaryl, $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

each R and R' are independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

n is from 0 to 18;

x, y and z are independently from about 0.0 to about 1.0 wherein y+z is 1.0–x and y is from about 3.0 to about 5.0 times greater than z.

In certain aspects, Y is —OH and n is 3. In other aspects, x is 1.0. In still other aspects Y is —OH, n is 3 and x is 1.0. In still other aspects n is from 3 to 12, or from 3 to 8.

In another aspect, the invention provides a method for preparing an inorganic/organic hybrid material comprising an superficially porous core and an inorganic/organic hybrid surrounding material comprising the steps of:

providing a superficially porous core material; and condensing one or more polymeric organofunctional metal precursors, and/or polymeric metal oxide precursors on the surface of the superficially porous core In still another aspect, the invention provides a method for preparing an inorganic/organic hybrid material comprising a superficially porous core and an inorganic/organic hybrid surrounding material comprising the steps of:

providing a superficially porous ore material;

applying a partially condensed polymeric organofunctional metal precursors, a mixture of two or more polymeric organofunctional metal precursors, or a mixture of one or more polymeric organofunctional metal precursors with a polymeric metal oxide on the surface of the superficially porous core; and further condensing said surface.

In another aspect, the invention provides a method for preparing an inorganic/organic hybrid material comprising a superficially porous core and an inorganic/organic hybrid surrounding material comprising the steps of:

providing a superficially porous core material; and condensing one or more polymeric organofunctional metal precursors, and/or polymeric metal oxide precursors on the surface of the superficially porous core.

In yet another aspect, the invention provides a method for preparing an inorganic/organic hybrid material comprising a superficially porous core and an inorganic/organic hybrid surrounding material comprising the steps of:

providing a superficially porous core material;

applying a partially condensed polymeric organofunctional metal precursors, a mixture of two or more polymeric organofunctional metal precursors, or a mixture of one or more polymeric organofunctional metal precursors with a polymeric metal oxide on the surface of the superficially porous core; and further condensing said surface.

In certain aspects, the superficially porous core material utilized in the methods of producing a hybrid material may be provided by the steps of:

a) providing a nonporous or substantially nonporous core, b) onto said nonporous or substantially nonporous core, hydrolytically condensing one or more monomers selected from the group consisting of organoalkoxysilanes and tetraalkoxysilanes, with one or more monomers selected from the group consisting of organoalkoxysilanes, tetraalkoxysilanes, metal oxide precursors and ceramic precursors, to produce a polyorganoalkoxysiloxane;

c) further condensing the polyorganoalkoxysiloxane to form a superficially porous particle; and d) subjecting the resulting particle to hydrothermal treatment; to thereby produce a porous superficially porous core material.

In other aspects, the superficially porous core material utilized in the methods of producing a hybrid material may be provided by the steps of:

(a) providing a nonporous or substantially nonporous core, (b) onto said nonporous or substantially nonporous core, hydrolytically condensing an alkenyl-functionalized organosilane with a tetraalkoxysilane;

(c) copolymerizing the product of step (a) with an organic olefin monomer; and (d) further condensing the product of step (b) to form a superficially porous particle.

In still other aspects, the superficially porous core material utilized in the methods of producing a hybrid material may be provided by the steps of:

(a) providing a nonporous or substantially nonporous core, (b) copolymerizing an organic olefin monomer with an alkenyl-functionalized organosilane; and (c) onto said nonporous or substantially nonporous core, hydrolytically condensing the product of step (b) with a tetraalkoxysilane in the presence of a non-optically active porogen; and (d) further condensing the product of step (c) to form a superficially porous particle.

In other aspects, the invention provides a separations device having a stationary phase comprising the inorganic/organic hybrid material of the invention. In certain aspects, the separations device may be a chromatographic column, a thin layer plate, a filtration membrane, a sample cleanup device, a solid support, a microchip separation device, or a microtiter plate. In still other aspects, the separations device may be useful for solid phase extraction, high pressure liquid chromatography, ultra high liquid chromatography, combinatorial chemistry, synthesis, biological assays, or mass spectrometry.

In another aspect, the invention provides a chromatographic column, comprising a) a column having a cylindrical interior for accepting a packing material and b) a packed chromatographic bed comprising the inorganic/organic hybrid material of the invention.

DETAILED DESCRIPTION OF THE INVENTION

Figure 1:
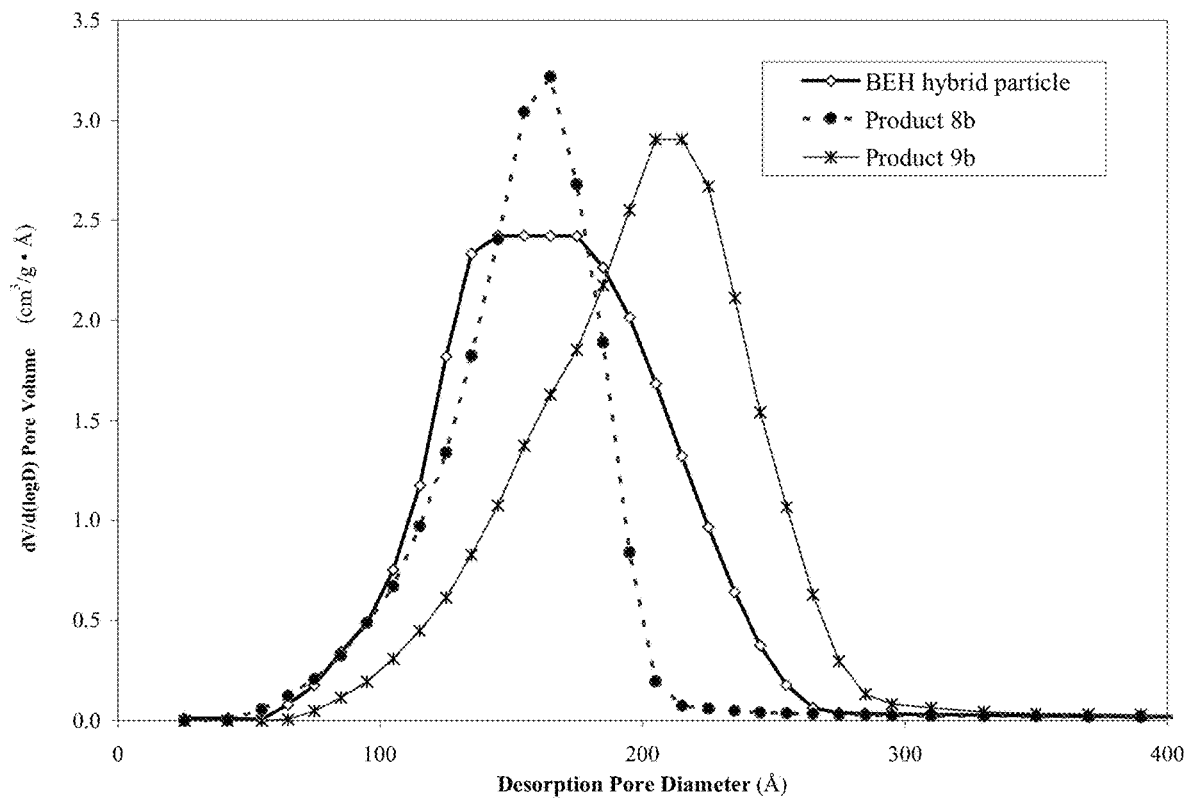
FIG. 1 is a desorption pore diameter comparison of products 8b, 9b and the unmodified hybrid core from multipoint $N_2$ sorption analysis.

The present invention provides novel chromatographic materials, e.g., for chromatographic separations, processes for its preparation and separations devices containing the chromatographic material. The preparation of the materials of the invention wherein the surrounding material is condensed on a porous hybrid core material will allow for families of different hybrid packing materials to be prepared from a single core hybrid material. Differences in hydrophobicity, ion-exchange capacity, surface charge or silanol activity of the surrounding material may be used for unique chromatographic separations of small molecules, carbohydrates, antibodies, whole proteins, peptides, and/or DNA. In addition, by selecting a polyorganosiloxane (POS) with functional groups (e.g., pendant alkyl amines, alcohols, carboxylic acids, alkene or cyano group) that are relevant for a given chromatographic application, new hybrid materials may be prepared that have synthetically useful pendant groups near the surface of the particles. In certain embodiments, the term "surrounding material" may refer to the materials which make up the surrounding material coating or the surrounding material coating itself.

The present invention will be more fully illustrated by reference to the definitions set forth below.
Definitions As used herein, "superficially porous" or "pellicular" refers to a porous material in which the porosity is localized to the outer portion of the material and wherein the central or core portion of the material is substantially non-porous. Without limitation, superficially porous materials and superficially porous cores demonstrate a porosity of less than 0.1 cc/g in the central portion of the material and greater porosity toward the surface of the material.

"Hybrid" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or "Hybrid" includes inorganic-based structures wherein an organic functionality is integral to both the internal or "skeletal" inorganic structure as well as the hybrid material surface. The inorganic portion of the hybrid material may be, e.g., alumina, silica, titanium, cerium, or zirconium oxides, or ceramic material; in a preferred embodiment, the inorganic portion of the hybrid material is silica. As noted above, exemplary hybrid materials are shown in U.S. Pat. Nos. 4,017,528, 6,528,167, 6,686,035 and 7,175,913.

"Hybrid core" includes a hybrid material, as defined herein, in the form of a superficially proious particle, monolith or other suitable structure which forms the internal portion of the inorganic/organic hybrid materials comprising an inorganic/organic hybrid surrounding material of the invention.

"Inorganic/organic hybrid surrounding material" includes a hybrid material, as defined herein, which surrounds the superficially porous core. The inorganic/organic hybrid surrounding material may surround the superficially porous core entirely, thus encapsulating the superficially porous core or may only partially surround the superficially porous core, thus leaving a surface of the superficially porous core exposed at one or more positions on the surface area of the superficially porous core. The inorganic/organic hybrid surrounding material may be disposed on or bonded to or annealed to the superficially porous core in such a way that a discrete or distinct transition is discernable or may be bound to the superficially porous core in such a way as to blend with the surface of the superficially porous core resulting in a gradation of materials. and no discrete internal core surface. In certain embodiments, the inorganic/organic hybrid surrounding material may be the same or different from the material of the superficially porous core. In certain embodiments, including those in which the inorganic/organic hybrid surrounding material and the superficially porous core are composed of the same materials, the surrounding material may exhibit different physical or physiochemical properties, including, but not limited to, average pore volume, specific surface area, micropore volume, micropore surface area, average pore diameter, carbon content or hydrolytic pH stability.

The term "alicyclic group" includes closed ring structures of three or more carbon atoms. Alicyclic groups include cycloparaffins or naphthenes which are saturated cyclic hydrocarbons, cycloolefins, which are unsaturated with two or more double bonds, and cycloacetylenes which have a triple bond. They do not include aromatic groups. Examples of cycloparaffins include cyclopropane, cyclohexane and cyclopentane. Examples of cycloolefins include cyclopentadiene and cyclooctatetraene. Alicyclic groups also include fused ring structures and substituted alicyclic groups such as alkyl substituted alicyclic groups. In the instance of the alicyclics such substituents can further comprise a lower alkyl, a lower alkenyl, a lower alkoxy, a lower alkylthio, a lower alkylamino, a lower alkylcarboxyl, a nitro, a hydroxyl, —CF3, —CN, or the like.

The term "aliphatic group" includes organic compounds characterized by straight or branched chains, typically having between 1 and 22 carbon atoms. Aliphatic groups include alkyl groups, alkenyl groups and alkynyl groups. In complex structures, the chains can be branched or cross-linked. Alkyl groups include saturated hydrocarbons having one or more carbon atoms, including straight-chain alkyl groups and branched-chain alkyl groups. Such hydrocarbon moieties may be substituted on one or more carbons with, for example, a halogen, a hydroxyl, a thiol, an amino, an alkoxy, an alkylcarboxy, an alkylthio, or a nitro group. Unless the number of carbons is otherwise specified, "lower aliphatic" as used herein means an aliphatic group, as defined above (e.g., lower alkyl, lower alkenyl, lower alkynyl), but having from one to six carbon atoms. Representative of such lower aliphatic groups, e.g., lower alkyl groups, are methyl, ethyl, n-propyl, isopropyl, 2-chloropropyl, n-butyl, sec-butyl, 2-aminobutyl, isobutyl, tert-butyl, 3-thiopentyl and the like. As used herein, the term "nitro" means —NO2; the term "halogen" designates —F, —Cl, —Br or —I; the term "thiol" means SH; and the term "hydroxyl" means —OH. Thus, the term "alkylamino" as used herein means an alkyl group, as defined above, having an amino group attached thereto. Suitable alkylamino groups include groups having 1 to about 12 carbon atoms, preferably from 1 to about 6 carbon atoms. The term "alkylthio" refers to an alkyl group, as defined above, having a sulfhydryl group attached thereto. Suitable alkylthio groups include groups having 1 to about 12 carbon atoms, preferably from 1 to about 6 carbon atoms. The term "alkylcarboxyl" as used herein means an alkyl group, as defined above, having a carboxyl group attached thereto. The term "alkoxy" as used herein means an alkyl group, as defined above, having an oxygen atom attached thereto. Representative alkoxy groups include groups having 1 to about 12 carbon atoms, preferably 1 to about 6 carbon atoms, e.g., methoxy, ethoxy, propoxy, tert-butoxy and the like. The terms "alkenyl" and "alkynyl" refer to unsaturated aliphatic groups analogous to alkyls, but which contain at least one double or triple bond respectively. Suitable alkenyl and alkynyl groups include groups having 2 to about 12 carbon atoms, preferably from 1 to about 6 carbon atoms.

The term "alkyl" includes saturated aliphatic groups, including straight-chain alkyl groups, branched-chain alkyl groups, cycloalkyl (alicyclic) groups, alkyl substituted cycloalkyl groups and cycloalkyl substituted alkyl groups. In certain embodiments, a straight chain or branched chain alkyl has 30 or fewer carbon atoms in its backbone, e.g., C1-C30 for straight chain or C3-C30 for branched chain. In certain embodiments, a straight chain or branched chain alkyl has 20 or fewer carbon atoms in its backbone, e.g., C1-C20 for straight chain or C3-C20 for branched chain, and more preferably 18 or fewer. Likewise, preferred cycloalkyls have from 4-10 carbon atoms in their ring structure and more preferably have 4-7 carbon atoms in the ring structure. The term "lower alkyl" refers to alkyl groups having from 1 to 6 carbons in the chain and to cycloalkyls having from 3 to 6 carbons in the ring structure.

Moreover, the term "alkyl" (including "lower alkyl") as used throughout the specification and claims includes both "unsubstituted alkyls" and "substituted alkyls", the latter of which refers to alkyl moieties having substituents replacing a hydrogen on one or more carbons of the hydrocarbon backbone. Such substituents can include, for example, halogen, hydroxyl, alkylcarbonyloxy, arylcarbonyloxy, alkoxycarbonyloxy, aryloxycarbonyloxy, carboxylate, alkylcarbonyl, alkoxycarbonyl, aminocarbonyl, alkylthiocarbonyl, alkoxyl, phosphate, phosphonato, phosphinato, cyano, amino (including alkyl amino, dialkylamino, arylamino, diarylamino and alkylarylamino), acylamino (including alkylcarbonylamino, arylcarbonylamino, carbamoyl and ureido), amidino, imino, sulfhydryl, alkylthio, arylthio, thiocarboxylate, sulfate, sulfonato, sulfamoyl, sulfonamido, nitro, trifluoromethyl, cyano, azido, heterocyclyl, aralkyl, or an aromatic or heteroaromatic moiety. It will be understood by those skilled in the art that the moieties substituted on the hydrocarbon chain can themselves be substituted, if appropriate. Cycloalkyls can be further substituted, e.g., with the substituents described above. An "aralkyl" moiety is an alkyl substituted with an aryl, e.g., having 1 to 3 separate or fused rings and from 6 to about 18 carbon ring atoms, e.g., phenylmethyl (benzyl).

The term "amino," as used herein, refers to an unsubstituted or substituted moiety of the formula —NRaRb, in which Ra and Rb are each independently hydrogen, alkyl, aryl, or heterocyclyl, or Ra and Rb, taken together with the nitrogen atom to which they are attached, form a cyclic moiety having from 3 to 8 atoms in the ring. Thus, the term "amino" includes cyclic amino moieties such as piperidinyl or pyrrolidinyl groups, unless otherwise stated. An "amino-substituted amino group" refers to an amino group in which at least one of Ra and Rb, is further substituted with an amino group.

The term "aromatic group" includes unsaturated cyclic hydrocarbons containing one or more rings. Aromatic groups include 5- and 6-membered single-ring groups which may include from zero to four heteroatoms, for example, benzene, pyrrole, furan, thiophene, imidazole, oxazole, thiazole, triazole, pyrazole, pyridine, pyrazine, pyridazine and pyrimidine and the like. The aromatic ring may be substituted at one or more ring positions with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like.

The term "aryl" includes 5- and 6-membered single-ring aromatic groups that may include from zero to four heteroatoms, for example, unsubstituted or substituted benzene, pyrrole, furan, thiophene, imidazole, oxazole, thiazole, triazole, pyrazole, pyridine, pyrazine, pyridazine and pyrimidine and the like. Aryl groups also include polycyclic fused aromatic groups such as naphthyl, quinolyl, indolyl and the like. The aromatic ring can be substituted at one or more ring positions with such substituents, e.g., as described above for alkyl groups. Suitable aryl groups include unsubstituted and substituted phenyl groups. The term "aryloxy" as used herein means an aryl group, as defined above, having an oxygen atom attached thereto. The term "aralkoxy" as used herein means an aralkyl group, as defined above, having an oxygen atom attached thereto. Suitable aralkoxy groups have 1 to 3 separate or fused rings and from 6 to about 18 carbon ring atoms, e.g., O-benzyl.

The terms "as made" and "freshmade" are used interchangeably and refer to particles obtained after the gelation process but prior to hydrothermal treatment.

The term "ceramic precursor" is intended include any compound that results in the formation of a ceramic material.

The term "chiral moiety" is intended to include any functionality that allows for chiral or stereoselective syntheses. Chiral moieties include, but are not limited to, substituent groups having at least one chiral center, natural and unnatural amino-acids, peptides and proteins, derivatized cellulose, macrocyclic antibiotics, cyclodextrins, crown ethers, and metal complexes.

The language "chromatographically-enhancing pore geometry" includes the geometry of the pore configuration of the presently-disclosed materials, which has been found to enhance the chromatographic separation ability of the material, e.g., as distinguished from other chromatographic media in the art. For example, a geometry can be formed, selected or constructed, and various properties and/or factors can be used to determine whether the chromatographic separations ability of the material has been "enhanced", e.g., as compared to a geometry known or conventionally used in the art. Examples of these factors include high separation efficiency, longer column life and high mass transfer properties (as evidenced by, e.g., reduced band spreading and good peak shape.) These properties can be measured or observed using art-recognized techniques. For example, the chromatographically-enhancing pore geometry of the present porous inorganic/organic hybrid particles is distinguished from the prior art particles by the absence of "ink bottle" or "shell shaped" pore geometry or morphology, both of which are undesirable because they, e.g., reduce mass transfer rates, leading to lower efficiencies.

Chromatographically-enhancing pore geometry is found in hybrid materials containing only a small population of micropores. A small population of micropores is achieved in hybrid materials when all pores of a diameter of about <34 Å contribute less than about 110 m$^2$/g to the specific surface area of the material. Hybrid materials with such a low micropore surface area (MSA) give chromatographic enhancements including high separation efficiency and good mass transfer properties (as evidenced by, e.g., reduced band spreading and good peak shape). Micropore surface area (MSA) is defined as the surface area in pores with diameters less than or equal to 34 Å, determined by multipoint nitrogen sorption analysis from the adsorption leg of the isotherm using the BJH method. As used herein, the acronyms "MSA" and "MPA" are used interchangeably to denote "micropore surface area".

The term "functionalizing group" includes organic functional groups which impart a certain chromatographic functionality to a chromatographic stationary phase.

The term "heterocyclic group" includes closed ring structures in which one or more of the atoms in the ring is an element other than carbon, for example, nitrogen, sulfur, or oxygen. Heterocyclic groups can be saturated or unsaturated and heterocyclic groups such as pyrrole and furan can have aromatic character. They include fused ring structures such as quinoline and isoquinoline. Other examples of heterocyclic groups include pyridine and purine. Heterocyclic groups can also be substituted at one or more constituent atoms with, for example, a halogen, a lower alkyl, a lower alkenyl, a lower alkoxy, a lower alkylthio, a lower alkylamino, a lower alkylcarboxyl, a nitro, a hydroxyl, —CF3, —CN, or the like. Suitable heteroaromatic and heteroalicyclic groups generally will have 1 to 3 separate or fused rings with 3 to about 8 members per ring and one or more N, O or S atoms, e.g. coumarinyl, quinolinyl, pyridyl, pyrazinyl, pyrimidyl, furyl, pyrrolyl, thienyl, thiazolyl, oxazolyl, imidazolyl, indolyl, benzofuranyl, benzothiazolyl, tetrahydrofuranyl, tetrahydropyranyl, piperidinyl, morpholino and pyrrolidinyl.

The term "metal oxide precursor" is intended include any compound that contains a metal and results in the formation of a metal oxide, e.g., alumina, silica, titanium oxide, zirconium oxide.

The term "monolith" is intended to include a collection of individual particles packed into a bed formation, in which the shape and morphology of the individual particles are maintained. The particles are advantageously packed using a material that binds the particles together. Any number of binding materials that are well known in the art can be used such as, for example, linear or cross-linked polymers of divinylbenzene, methacrylate, urethanes, alkenes, alkynes, amines, amides, isocyanates, or epoxy groups, as well as condensation reactions of organoalkoxysilanes, tetraalkoxysilanes, polyorganoalkoxysiloxanes, polyethoxysiloxanes, and ceramic precursors. In certain embodiments, the term "monolith" also includes hybrid monoliths made by other methods, such as hybrid monoliths detailed in U.S. Pat. No. 7,250,214; hybrid monoliths prepared from the condensation of one or more monomers that contain 0-99 mole percent silica (e.g., SiO2); hybrid monoliths prepared from coalesced porous inorganic/organic particles; hybrid monoliths that have a chromatographically-enhancing pore geometry; hybrid monoliths that do not have a chromatographically-enhancing pore geometry; hybrid monoliths that have ordered pore structure; hybrid monoliths that have non-periodic pore structure; hybrid monoliths that have non-crystalline or amorphous molecular ordering; hybrid monoliths that have crystalline domains or regions; hybrid monoliths with a variety of different macropore and mesopore properties; and hybrid monoliths in a variety of different aspect ratios. In certain embodiments, the term "monolith" also includes inorganic monoliths, such as those described in G. Guiochon/*J. Chromatogr. A* 1168 (2007) 101-168.

The term "substantially disordered" refers to a lack of pore ordering based on x-ray powder diffraction analysis. Specifically, "substantially disordered" is defined by the lack of a peak at a diffraction angle that corresponds to a d value (or d-spacing) of at least 1 nm in an x-ray diffraction pattern.

"Surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The language "surface modified" is used herein to describe the composite material of the present invention that possess both organic groups and silanol groups which may additionally be substituted or derivatized with a surface modifier. "Surface modifiers" include (typically) organic functional groups which impart a certain chromatographic functionality to a chromatographic stationary phase. Surface modifiers such as disclosed herein are attached to the base material, e.g., via derivatization or coating and later cross-linking, imparting the chemical character of the surface modifier to the base material. In one embodiment, the organic groups of a hybrid material, e.g., particle, react to form an organic covalent bond with a surface modifier. The modifiers can form an organic covalent bond to the material's organic group via a number of mechanisms well known in organic and polymer chemistry including but not limited to nucleophilic, electrophilic, cycloaddition, free-radical, carbene, nitrene, and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur, and the halogens. In addition, carbon-silicon and carbon-oxygen-silicon bonds are defined as organic covalent bonds, whereas silicon-oxygen-silicon bonds that are not defined as organic covalent bonds. A variety of synthetic transformations are well known in the literature, see, e.g., March, *J. Advanced Organic Chemistry,* 3rd Edition, Wiley, New York, 1985.

The term "nanoparticle" is a microscopic particle/grain or microscopic member of a powder/nanopowder with at least one dimension less than about 100 nm, e.g., a diameter or particle thickness of less than about 100 nm (0.1 μm), which may be crystalline or noncrystalline. Nanoparticles have properties different from, and often superior to those of conventional bulk materials including, for example, greater strength, hardness, ductility, sinterability, and greater reactivity among others. Considerable scientific study continues to be devoted to determining the properties of nanomaterials, small amounts of which have been synthesized (mainly as nano-size powders) by a number of processes including colloidal precipitation, mechanical grinding, and gas-phase nucleation and growth. Extensive reviews have documented recent developments in nano-phase materials, and are incorporated herein by reference thereto: Gleiter, H. (1989) "Nano-crystalline materials," Prog. Mater. Sci. 33:223-315 and Siegel, R. W. (1993) "Synthesis and properties of nano-phase materials," Mater. Sci. Eng. A168:189-197. In certain embodiments, the nanoparticles comprise oxides or nitrides of the following: silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, and mixtures thereof. In certain embodiments, the nanoparticles of the present invention are selected from diamonds, zirconium oxide (amorphous, monoclinic, tetragonal and cubic forms), titanium oxide (amorphous, anatase, brookite and rutile forms), aluminum (amorphous, alpha, and gamma forms), and boronitride (cubic form). In particular embodiments, the nanoparticles of the present invention are selected from nano-diamonds, silicon carbide, titanium dioxide (anatase form), cubic-boronitride, and any combination thereof. Moreover, in particular embodiments, the nanoparticles may be crystalline or amorphous. In particular embodiments, the nanoparticles are less than or equal to 100 nm in diameter, e.g., less than or equal to 50 nm in diameter, e.g., less than or equal to 20 nm in diameter.

Moreover, it should be understood that the nanoparticles that are characterized as dispersed within the composites of the invention are intended to describe exogenously added nanoparticles. This is in contrast to nanoparticles, or formations containing significant similarity with putative nanoparticles, that are capable of formation in situ, wherein, for example, macromolecular structures, such as particles, may comprise an aggregation of these endogenously created.

The language, "composite material" and the term "composite" are used interchangeably herein to describe the engineered materials of the invention composed of one or more components described herein in combination with dispersed nanoparticles, wherein each component/nanoparticle remains separate and distinct on a macroscopic level within the finished structure. The composite material of the present invention is independent of form, and may be monolithic or particulate in nature. Moreover, a short-hand convention may be used to describe a composite material containing a dispersed nanoparticle, $Np/(A)_w(B)_x(C)_y$, and may be understood as follows: the symbolic representation to the left of the slash mark represents the dispersed nanoparticle, and the symbolic representations to the right of the slash mark represent the components that comprise the material that the nanoparticle (noted on the left of the slash mark) is dispersed within. In certain embodiments, the composite materials of the present invention may be nanocomposites, which are known to include, at least, for example, nano/nano-type, intra-type, inter-type, and intra/inter-type. (Nanocomposites Science and Technology, edited by P. M. Ajayan, L. S. Schadler, P. V. Braun, Wiley-V C H (Weinheim, Germany), 2003)

The terms "material having a high thermal conductivity", "high thermal conductivity core", and a "high thermal conductivity additive" are defined as a material, core material, or composite additive having a thermal conductivity greater than 20 W/(m·K). In various embodiments the additive has a thermal conductivity ranges from: about 20 W/(m·K) to not more than 3500 W/(m·K); about 100 W/(m·K) to not more than 3300 W/(m·K); and 400 W/(m·K) to not more than 3000 W/(m·K). High thermal conductivity cores or additives can be, for example and without limitation, a 0.1-8 μm core particle, nanoparticle additives, or a metal oxide precursor. In various embodiments the high thermal conductivity core or additive includes (but is not limited to) aluminum, gold, silver, iron, copper, titanium, niobium, diamond, cerium, carbon, zirconium, barium, cerium, cobalt, copper, europium, gadolinium, iron, nickel, samarium, silicon, silver, titanium, zinc, boron, or an oxide or a nitride thereof, or combinations thereof.

A "high thermal diffusivity" core or additive is defined as an additive used in a superficially porous materials as having a thermal diffusivity greater than 20 $mm^2/s$. In various embodiments the core or additive has a thermal diffusivity ranges from: about 20 $mm^2/s$ to not more than 2000 $mm^2/s$; about 100 $mm^2/s$ to not more than 1600 $mm^2/s$; and 150 $mm^2/s$ to not more than 1400 $mm^2/s$. This high thermal conductivity core or additive can be a 0.1-8 μm core particle, nanoparticle additives, or a metal oxide precursor. In various embodiments the high thermal conductivity core or additive includes (but is not limited to) aluminum, copper, gold, and diamonds.

A "high thermal conductivity superficially porous material (or particle)" is defined as a material that has improved thermal conductivity or improved thermal diffusivity over a porous silica particle of the same size. In various embodiments the higher thermal conductivity superficially porous material is a material that has improved thermal conductivity or thermal diffusivity over a superficially porous silica particle of the same size. In various embodiments the higher thermal conductivity superficially porous material is a material that has improved thermal conductivity over a fully porous hybrid particle of the same size. Determination of particle thermal conductivity can be made by the method of Gritti and Guiochon [J. Chromatogr. A, 2010, 1217, 5137) taking into account differences in bulk material properties, pore volume, surface modification type and coverage.

The terms "magnetic material", "magnetic cores" and "magnetic additives" are defined as a material, core material, or composite additive that gas a mass magnetization (σ, magnetic moment per unit mass, magnetic saturation or saturation magnetization) at room temperature greater than 15 emu/g (A $m^2$/kg). This includes ferromagnetic and ferrimagnetic materials, including (but not limited to): magnetite (ferrous ferric oxide); maghemite; yttrium iron garnet, cobalt, $CrO_2$; and ferrites containing iron and Al, Mg, Ni, Zn, Mn or Co). Magnetic core particles do not include other oxides of iron, including hematite and goethite, that have mass magnetization values less than 10 emu/g. Hematite (0.4 emu/g) is considered antiferromagnetic at room temperature.

As used herein, the term "fines" refers to undesired materials generated in the processes of the invention that are below the 10 vo % of the target particle size distribution. Fines can be formed from reseeding events or from particle breakage. Resulting fines can be nonporous or fully porous. Often fines are substantially smaller than the 10 vol % of the target particle size distribution. Often fines are <1 um in size. Very small fines can cause problems in chromatography in that the percolate through the packed bed and get stuck in the outlet frit. This generates increased column pressure. Alternatively fines small enough to percolate through the packed bed and outlet frit can result in problems with detectors and can contaminate a product. Problems with detector include clogging flow channels, blocking detector windows, and anomalous detector readings. Such issues can reduce the lifetime of a detector and can require extensive cleaning protocols. Such issues can also impact the precision, accuracy, reliability, reproducibility, and robustness of analytical data generated. Fines can be removed by classification.

As used herein, the terms "aggregates" and "agglomerates" refer to undesired materials generated in the processes of the invention that are larger than the 90 vol % of the target particle size distribution. aggregates and/or agglomerates can form from imperfections of the core material, improper mixing or dispersion in the process, or excessive forces during workup. Aggregates and agglomerates can impact the efficiency, permeability, reproducibility and robustness of packed beds within chromatographic columns. It is difficult to optimally pack a chromatographic column with materials having an elevated amount of aggregates and agglomerates. Aggregates and agglomerates can break apart within a packed bed structure when exposed to high pressures and shears. This can result in a mechanical instability of the packed bed and the result of a void on the top of the column. This breaking of aggregates and agglomerates can also result in the generation of fines. Aggregates and agglomerates can be removed by classification.

As used herein, the term "small population of micropores" refers to is defined as having less than or equal to 40 $m^2$/g of the surface area resides in pores less than or equal to 34 Å—as determined by t-plot As used herein, the term "high pH stability," also referred to as "base stability", is measured by significant changes, or lack thereof, in column performance or attributes, such as efficiency, peak capacity, peak shape, retention factor, column pressure, column hold-up volume, or stationary phase mass, due to exposure to high pH mobile phase (pH>7) over an extended period of time generally acceptable to one skilled in the art. This period of time is highly dependent on pH, temperature, mobile phase type, and column volumes. Typical testing mobile phases are in the pH range of 7-12, more specifically 8-11, and include, but are not limited to, the following: Ammonium Hydroxide, Sodium Hydroxide, Triethylamine, Ammonium Bicarbonate, Diethylamine, Pyrrolidin, Ammonium Formate, Ammonium acetate, Ammonium chloride, Triethylammonium bicarbonate, Dimethylhexyl amine, Tris(2-aminoethyl)amine. Typical testing temperatures are 0-100° C., more specifically, 10-90° C., more specifically 20-80° C., more specifically 25-75° C., more specifically 30-70° C. Materials are not considered "high pH stable" or "base stable" if one or more of the following changes in performance or attributes are observed: Losing more than 30% of initial efficiency or more than 15% of initial peak capacity and/or, a significant shift in peak shape denoted by a peak tailing factor (USP tailing factor) <0.90, indicating severe "peak fronting" and/or, column pressure increase of more than 15% over the initial pressure and/or, losing more than 30% of initial retention factor and/or, increasing column hold-up more than 10% and/or, losing more than 20-40% of the stationary phase mass [being swept out of the column by the mobile phase] and/or, generally failing to provide acceptable separation after exposure to high pH mobile phase.

As used herein, the term "substantially nonporous" refers to a material which, although porous, is impermeable or otherwise functions as a non-porous material. Such a substantially nonporous material has a pore volume of less than about 0.10 cc/g.

As used herein the ther "90/10 ratio" refers to the ratio of the particle size distribution of a particulate material of the invention. In the 90/10 ratio, the particle sizes of the material is measured and plotted on an S-curve. The particle size value of represented by 90% of the particles (i.e. the value for which 90% of the particles are equal to or smaller than) is compared as a ratio to the particle size value represented by 10% of the particles (i.e., the value for which 10&% of the particles is equal to or smaller than).

Surrounding Materials

The invention provides a chromatographic material comprising asuperficially porous core and an inorganic/organic surrounding material.

The composition of the surrounding material may be varied by one of ordinary skill in the art to provide enhanced chromatographic selectivity, enhanced particle chemical stability, enhanced column efficiency, and/or enhanced mechanical strength. Similarly, the composition of the surrounding material provides a change in hydrophilic/lipophilic balance (HLB), surface charge (e.g., isoelectric point or silanol pKa), and/or surface functionality for enhanced chromatographic separation. Furthermore, in some embodiments, the composition of the surrounding material may also provide a surface functionality for available for further surface modification.

The surrounding material may be independently derived from
condensation of one or more polymeric organofunctional metal precursors, and/or polymeric metal oxide precursors on the surface of the superficially porous core, or
application of partially condensed polymeric organofunctional metal precursors, a mixture of two or more polymeric organofunctional metal precursors, or a mixture of one or more polymeric organofunctional metal precursors with a polymeric metal oxide precursors on the surface of the superficially porous core.

In certain aspects, the inorganic portion of the surrounding material is independently selected from the group consisting of alumina, silica, titania, cerium oxide, or zirconium oxides, and ceramic materials.

Alternatively, the surrounding material may independently derived from
condensation of one or more organofunctional silanes and/or tetraalkoxysilane on the surface of the superficially porous core, or
application of partially condensed organofunctional silane, a mixture of two or more organofunctional silanes, or a mixture of one or more organofunctional silanes with a tetraalkoxysilane (i.e., tetraethoxysilane, tetramethoxysilane) on the surface of the superficially porous core.

The surrounding material may be independently porous or nonporous. Furthermore, the pore structure of the surrounding material may independently possess or not possess an ordered pore structure. In certain aspects, the surrounding material may have a chromatographically enhancing pore geometry (CEPG).

In other aspects, the surrounding material may independently comprise from about 0-100 mol % hybrid material. The inorganic portion of the surrounding material may independently be alumina, silica, titanium oxide, cerium oxide, zirconium oxide or ceramic materials or a mixture thereof.

In specific aspects, the inorganic portion of the surrounding material may independently be present in an amount ranging from about 0 molar % to not more than about 25 molar %, wherein the pores of the surrounding material are substantially disordered. Similarly, the inorganic portion of the surrounding material may independently be present in an amount ranging from about 25 molar % to not more than about 50 molar %, wherein the pores of the surrounding material are substantially disordered, and wherein the surrounding material independently possesses a chromatographically enhancing pore geometry (CEPG). In certain embodiments, the inorganic portion of the surrounding material may independently be present in an amount ranging from about 50 molar % to not more than about 75 molar %, wherein the pores of the surrounding material are substantially disordered, and wherein the surrounding material independently possesses a chromatographically enhancing pore geometry (CEPG). In still other embodiments, the inorganic portion of the surrounding material may independently be present in an amount ranging from about 75 molar % to not more than about 100 molar %, wherein the pores of the surrounding material are substantially disordered, and wherein the surrounding material independently possesses a chromatographically enhancing pore geometry (CEPG).

In some aspects, the surrounding material may comprise a material of formula I:

$$(SiO_2)_d[R^2((R)_p(R^1)_qSiO_t)_m];\qquad(I)$$

wherein,
R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;
$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;
p and q are each independently 0.0 to 3.0;
t is 0.5, 1.0, or 1.5;
d is 0 to about 30;
m is an integer from 1-20; wherein R, $R^1$ and $R^2$ are optionally substituted; provided that:

(1) when $R^2$ is absent, $m = 1$ and $t = \dfrac{(4-(p+q))}{2}$, when $0 < p + q \leq 3$; and (2) when $R^2$ is present, $m = 2\text{-}20$ and $t = \dfrac{(3-(p+q))}{2}$, when $p + q \leq 2$.

In other aspects, the surrounding material may comprise a material of formula II:

$$(SiO_2)_d/[(R)_p(R^1)_qSiO_t]\qquad(II);$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In still other aspects, the surrounding material may comprise a material of formula III:

$$(SiO_2)_d[/R^2((R^1)_rSiO_t)_m]$$ (III)

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

In yet aspects, the surrounding material may comprise a material of formula IV:

$$(A)x(B)y(C)z$$ (IV), wherein the order of repeat units A, B, and C may be random, block, or a combination of random and block;

A is an organic repeat unit which is covalently bonded to one or more repeat units A or B via an organic bond;

B is an organosiloxane repeat unit which is bonded to one or more repeat units B or C via an inorganic siloxane bond and which may be further bonded to one or more repeat units A or B via an organic bond;

C is an inorganic repeat unit which is bonded to one or more repeat units B or C via an inorganic bond; and x and y are positive numbers and z is a non negative number, wherein x+y+z=1. In certain embodiments, when z=0, then $0.002 \le x/y \le 210$, and when z≠0, then $0.0003 \le y/z \le 500$ and $0.002 \le x/(y+z) \le 210$.

In still yet other aspects, the surrounding material may comprise a material of formula V:

$$(A)x(B)y(B^*)y^*(C)z$$ (V), wherein the order of repeat units A, B, B*, and C may be random, block, or a combination of random and block;

A is an organic repeat unit which is covalently bonded to one or more repeat units A or B via an organic bond;

B is an organosiloxane repeat units which is bonded to one or more repeat units B or B* or C via an inorganic siloxane bond and which may be further bonded to one or more repeat units A or B via an organic bond;

B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization;

C is an inorganic repeat unit which is bonded to one or more repeat units B or B* or C via an inorganic bond; and x, y, and y* are positive numbers and z is a non negative number, wherein x+y+y*+z=1. In certain embodiments, when z=0, then $0.002 \le x/(y+y^*) \le 210$, and when z≠0, then $0.0003 \le (y+y^*)/z \le 500$ and $0.002 \le x/(y+y^*+z) \le 210$.

In certain aspects, $R^2$ in the formulas presented above may be present or absent.

In certain aspects, $R^1$ in the formulas presented above is $C_1$-$C_{18}$ alkyl group substituted by hydroxyl. In still other aspects, $R^1$ in the formulas presented above is hydroxypropyl. In still other aspects, the hydroxy substituted alkyl group is further functionalized by an isocyanate. In yet other aspects, the isocyanate is Octadecyl isocyanate, Dodecyl isocyanate, Pentafluorophenyl isocyanate, 4-cyanophenyl isocyanate, 3-cyanophenyl isocyanate, 2-cyanophenyl isocyanate, phenyl isocyate, benzyl isocyanate, phenethyl isocyanate or diphenylethyl isocyante.

In another aspect, the invention provides materials as described herein wherein the surrounding material further comprises a nanoparticle or a mixture of more than one nanoparticles dispersed within the superficially porous core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride.

In other embodiments, the nanoparticles may be less than or equal to 200 nm in diameter, less than or equal to 100 nm in diameter, less than or equal to 50 nμm in diameter, or less than or equal to 20 nm in diameter.

Figure 16:
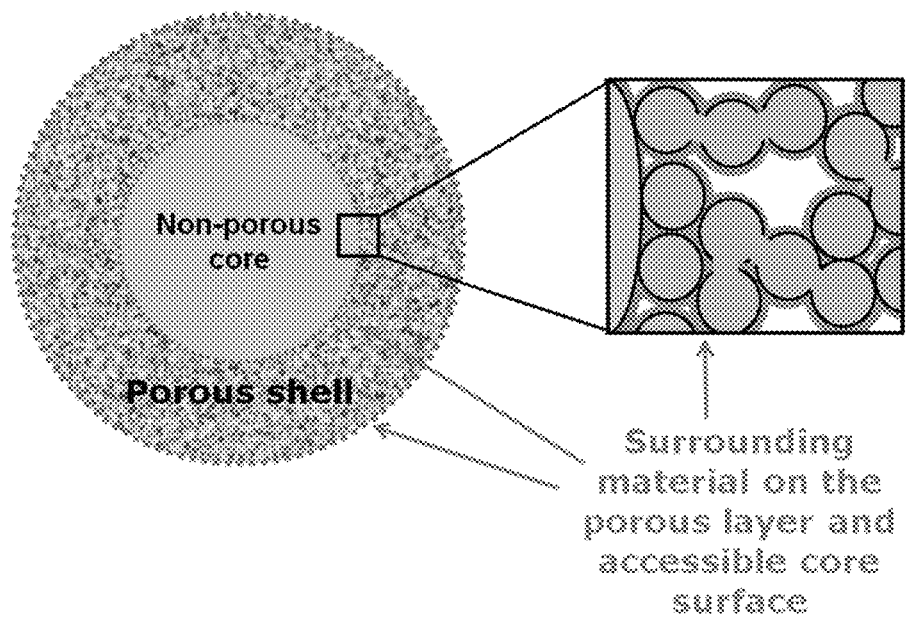
FIG. 16 shows a cross section of a material of the invention showing surrounding material on the porous layer as well as the accessible core surface.

Care is taken in the choice of surrounding material and the amount thereof used in preparing the materials of the invention. Specifically, although adding additional surrounding material may increase the base stability of the superficially porous core material, the inclusion of excessive amounts of surrounding material will reduce pore volume such that the resultant material becomes substantially nonporous. See, FIG. 16.

Superficially Porous Core Materials

The novel inorganic/organic hybrid materials of the invention comprise an inorganic/organic hybrid surrounding material and a superficially porous core. The superficially porous core may possess or not possess a copolymeric structure and may or may not possess an ordered pore structure.

In certain embodiments, the superficially porous core material is silica; silica coated with an inorganic/organic hybrid surrounding material; an inorganic/organic hybrid material, an inorganic organic hybrid material coated with an inorganic/organic hybrid surrounding material; a magnetic core material; a magnetic core material coated with silica; a high thermal conductivity core material; a high thermal conductivity core material coated with silica; a composite material; an inorganic/organic hybrid surrounding material; a composite material coated with silica; a magnetic core material coated with an inorganic/organic hybrid surrounding material; or a high thermal conductivity core material coated with an inorganic/organic hybrid surrounding material; silica coated with a high thermal conductivity material; or an inorganic/organic hybrid material coated with a high thermal conductivity material.

In particular, the superficially porous core materials comprise a substantially nonporous core and one or more layers of a porous shell material or porous surrounding material. In certain embodiments, the porous shell material or the porous surrounding material is an inorganic/organic surrounding material as defined herein above. In particular embodiments, the surrounding material of the superficially porous core is different from the inorganic/organic hybrid materials of the invention.

In another embodiment, when the superficially porous material core is a composite material, the composite material comprises a magnetic additive material or a high thermal conductivity additive or a combination thereof.

In specific embodiments, wherein the material of the invention comprises a composite material, the composite material comprises a magnetic additive material. In some such embodiments, the magnetic additive material has a mass magnetization at room temperature greater than 15 emu/g. In still other embodiments, the magnetic additive material is a ferromagnetic material. In yet other embodiments, the magnetic additive material is a ferrimagnetic material. In specific embodiments the magnetic additive material is a magnetite; maghemite; yttrium iron garnet; cobalt; $CrO_2$; a ferrite containing iron and Al, Mg, Ni, Zn, Mn or Co; or a combination thereof.

In specific embodiments, wherein the material of the invention comprises a magnetic core material, the magnetic core material has a mass magnetization at room temperature greater than 15 emu/g. In still other embodiments, the magnetic core material is a ferromagnetic material. In yet other embodiments, the magnetic core material is a ferrimagnetic material. In specific embodiments the magnetic core material is a magnetite; maghemite; yttrium iron garnet; cobalt; $CrO_2$; a ferrite containing iron and Al, Mg, Ni, Zn, Mn or Co; or a combination thereof.

In specific embodiments, wherein the material of the invention comprises a composite, the composite comprises a high thermal conductive additive material, the composite material comprises a magnetic additive material. In some such embodiments, the high thermal conductivity additive is crystalline or amorphous silicon carbide, aluminum, gold, silver, iron, copper, titanium, niobium, diamond, cerium, carbon, zirconium, barium, cerium, cobalt, copper, europium, gadolinium, iron, nickel, samarium, silicon, silver, titanium, zinc, boron, or an oxide or a nitride thereof, or combinations thereof. In other embodiments, the high thermal conductivity additive is diamond.

In specific embodiments, wherein the material of the invention comprises a high thermal conductivity core material, the high thermal conductivity core material is crystalline or amorphous silicon carbide, aluminum, gold, silver, iron, copper, titanium, niobium, diamond, cerium, carbon, zirconium, barium, cerium, cobalt, copper, europium, gadolinium, iron, nickel, samarium, silicon, silver, titanium, zinc, boron, or an oxide or a nitride thereof, or combinations thereof.

In certain embodiments, the material of the invention has a highly spherical core morphology; a rod shaped core morphology; a bent-rod shaped core morphology; a toroid shaped core morphology; or a dumbbell shaped core morphology.

In particular embodiments, the material of the invention has a mixture of highly spherical, rod shaped, bent-rod shaped, toroid shaped or dumbbell shaped core morphologies.

Thus, in one aspect, the invention comprises a superficially porous core, wherein the inorganic portion of the superficially porous core is present in an amount ranging from about 0 molar % to not more than about 100 molar %, wherein the pores of the core are substantially disordered. In other embodiments, the inorganic portion of the superficially porous core is present in an amount from about 0 molar % to not more than about 75 molar %. In still other embodiments, the inorganic portion of the superficially porous core is present in an amount from about 0 molar % to not more than about 50 molar %. In yet other embodiments, the inorganic portion of the superficially porous core is present in an amount from about 0 molar % to not more than about 25 molar %.

In various embodiments of the aforementioned aspect of the invention, the amount of the inorganic portion of the superficially porous core ranges from: about 0 molar % to not more than about 1 molar %; about 0 molar % to not more than about 2 molar %; about 0 molar % to not more than about 3 molar %; about 0 molar % to not more than about 4 molar %; about 0 molar % to not more than about 5 molar %; about 0 molar % to not more than about 6 molar %; about 0 molar % to not more than about 7 molar %; about 0 molar % to not more than about 8 molar %; about 0 molar % to not more than about 9 molar %; about 0 molar % to not more than about 10 molar %; about 0 molar % to not more than about 11 molar %; about 0 molar % to not more than about 12 molar %; about 0 molar % to not more than about 13 molar %; about 0 molar % to not more than about 14 molar %; about 0 molar % to not more than about 15 molar %; about 0 molar % to not more than about 16 molar %; about 0 molar % to not more than about 17 molar %; about 0 molar % to not more than about 18 molar %; about 0 molar % to not more than about 19 molar %; about 0 molar % to not more than about 20 molar %; about 0 molar % to not more than about 21 molar %; about 0 molar % to not more than about 22 molar; about 0 molar % to not more than about 23 molar %; about 0 molar % to not more than about 24 molar %; and about 0 molar % to not more than about 25 molar.

In another aspect, the invention provides a superficially porous core, wherein the inorganic portion of the superficially porous core is present in an amount ranging from about 0 molar % to not more than about 100 molar %, wherein the pores of the superficially porous core are substantially disordered and wherein the superficially porous core has a chromatographically enhancing pore geometry (CEPG). In another embodiment, the inorganic portion of the superficially porous core is present in an amount ranging from about 25 molar % to not more than about 50 molar %, wherein the pores of the superficially porous core are substantially disordered and wherein the hybrid core has a chromatographically enhancing pore geometry (CEPG). In other embodiments, the inorganic portion of the superficially porous core is present in an amount ranging from about 50 molar % to not more than about 75 molar %, wherein the pores of the superficially porous core are substantially disordered and wherein the hybrid core has a chromatographically enhancing pore geometry (CEPG). In yet other embodiments the inorganic portion of the superficially porous core is present in an amount ranging from about 75 molar % to not more than about 100 molar %, wherein the pores of the superficially porous core are substantially disordered and wherein the hybrid core has a chromatographically enhancing pore geometry (CEPG).

In various embodiments of the aforementioned aspects of the invention, the amount of the inorganic portion of the superficially porous core ranges from: about 25 molar % to not more than about 26 molar %; about 25 molar % to not more than about 27 molar %; about 25 molar % to not more than about 28 molar %; about 25 molar % to not more than about 29 molar %; about 25 molar % to not more than about 30 molar %; about 25 molar % to not more than about 31 molar %; about 25 molar % to not more than about 32 molar %; about 25 molar % to not more than about 33 molar %; about 25 molar % to not more than about 34 molar %; about 25 molar % to not more than about 35 molar %; about 25 molar % to not more than about 36 molar %; about 25 molar % to not more than about 37 molar %; about 25 molar % to not more than about 38 molar %; about 25 molar % to not more than about 39 molar %; about 25 molar % to not more than about 40 molar %; about 25 molar % to not more than about 41 molar %; about 25 molar % to not more than about 42 molar %; about 25 molar % to not more than about 43 molar %; about 25 molar % to not more than about 44 molar %; about 25 molar % to not more than about 45 molar %; about 25 molar % to not more than about 46 molar %; about 25 molar % to not more than about 47 molar %; about 25 molar % to not more than about 48 molar %; about 25 molar % to not more than about 49 molar %; about 25 molar % to not more than about 50 molar %; about 25 molar % to not more than about 100 molar %; about 50 molar % to not more than about 100 molar %; about 50 molar % to not more than about 75 molar %; and about 75 molar % to not more than about 100 molar %.

The inorganic portion of the superficially porous core may be alumina, silica ($SiO_2$), titanium oxide, zirconium oxide, or ceramic materials. The hybrid materials of the invention in which the inorganic portion is $SiO_2$ is particularly advantageous. In certain embodiments, the core material may not be a hybrid core but may be an entirely inorganic core made only of an inorganic portion.

In one embodiment, the organic content is from about 0 to about 60% carbon. In another embodiment, the organic content is from about 1 to about 50%, about 1 to about 40%, 5 to about 35% carbon. In yet another embodiment, the invention provides a porous inorganic/organic hybrid particle, wherein the organic content is from about 25 to about 40% carbon. In a further embodiment, the organic content is from about 25 to about 35% carbon. In a further embodiment, the organic content is from about 5 to about 15% carbon.

In one embodiment, the superficially porous cores of the invention comprise a substantially nonporous core and one or more layers of inorganic/organic shell material of formula I:

$$(SiO_2)_d/[R^2((R)_p(R^1)_q SiO_t)_m] \qquad (I)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0, t is 0.5, 1.0, or 1.5;

d is 0 to about 30;

m is an integer from 1-20; wherein R, $R^1$ and $R^2$ are optionally substituted; provided that:

(1) when $R^2$ is absent, $m = 1$ and $t = \dfrac{(4-(p+q))}{2}$, when $0 < p+q \leq 3$; and (2) when $R^2$ is present, $m = 2\text{-}20$ and $t = \dfrac{(3-(p+q))}{2}$, when $p+q \leq 2$.

In certain embodiments, $R^2$ is absent, t=1.5 when p+q=1; or t=1 when p+q=2. In other embodiments, $R^2$ is present, p=0, q is 0 or 1 and t=1.5 when q=0; or t=1 when q=1.

In certain embodiments, $R^2$ is absent. In other embodiments, $R^2$ is present. In embodiments of formula I in which $R^2$ is present, the invention comprises a hybrid core of formula I, wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another embodiment, d is 0.11. In still another embodiment, d is 0.33. In certain embodiments, d is 0.83.

In other embodiments of formula I in which $R^2$ is present, the invention comprises a hybrid core of formula I, wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; and wherein each $R^2$ is attached to two or more silicon atoms. In a further embodiment, p is 0, 1, or 2. In another further embodiment, t is 1.0 or 1.5. In another embodiment, m is 1 or 2.

In certain embodiments, the substantially nonporous core is a hybrid core of formula I. Certain preferred embodiments of hybrid cores of formula I in which $R^2$ is present are set forth in the following table (product numbers refer to the numbers used in the examples set forth below):

| Reference | Product In Reference | Formula | d | p | q | t | m |
|---|---|---|---|---|---|---|---|
| U.S. Pat. No. 6,686,035 | 3i | $(SiO2)_{0.96}(O_{1.5}SiCH_2\text{—}CH_2SiO_{1.5})_{0.04}$ | 27 | 0 | 0 | 1.5 | 2 |
| U.S. Pat. No. 6,686,035 | 3j | $(SiO2)_{0.89}(O_{1.5}SiCH_2\text{—}CH_2SiO_{1.5})_{0.11}$ | 8 | 0 | 0 | 1.5 | 2 |
| U.S. Pat. No. 6,686,035 | 3k | $(SiO2)_{0.85}(O_{1.5}SiCH_2\text{—}CH_2SiO_{1.5})_{0.2}$ | 4 | 0 | 0 | 1.5 | 2 |
| U.S. Pat. No. 6,686,035 | 3l | $(SiO2)_{0.66}(O_{1.5}SiCH_2\text{—}CH_2SiO_{1.5})_{0.33}$ | 2 | 0 | 0 | 1.5 | 2 |
| U.S. Pat. No. 6,686,035 | 3n | $(SiO2)_{0.5}(O_{1.5}SiCH_2\text{—}CH_2SiO_{1.5})_{0.5}$ | 1 | 0 | 0 | 1.5 | 2 |
| WO 2008/103423 | 13a | $(SiO2)_{0.45}(O_{1.5}SiCH_2\text{—}CH_2SiO_{1.5})_{0.55}$ | 0.83 | 0 | 0 | 1.5 | 2 |
| WO 2008/103423 | 13b, 13d-13g | $(SiO2)_{0.25}(O_{1.5}SiCH_2\text{—}CH_2SiO_{1.5})_{0.75}$ | 0.33 | 0 | 0 | 1.5 | 2 |
| WO 2008/103423 | 13c | $(SiO2)_{0.1}(O_{1.5}SiCH_2\text{—}CH_2SiO_{1.5})_{0.9}$ | 0.11 | 0 | 0 | 1.5 | 2 |
| WO 2008/103423 | 5h | $(O_{1.5}SiCH_2CH_2SiO_{1.5})$ | 0 | 0 | 0 | 1.5 | 2 |

| Reference | Product In Reference | Formula | d | p | q | t | m |
|---|---|---|---|---|---|---|---|
| WO 2008/103423 | 11a-i, l-q, t | $(O_{1.5}SiCH_2CH_2SiO_{1.5})_x$—$(YSiO_{1.5})_{1-x}$ | 0 | 0, 1 | 0 | 1.5, 1.5 | 2, 1 |
| WO 2008/103423 | 11j | $(O_{1.5}SiCH_2CH_2SiO_{1.5})_x$—$(YSiO_{1.5})_w(ZSiO_{1.5})_{1-x-w}$ | 0 | 0, 1, 1 | 0, 0, 0 | 1.5, 1.5, 1.5 | 2, 1, 1 |
| WO 2008/103423 A1 | 11k, s | $(O_{1.5}SiCH_2CH_2SiO_{1.5})_x$—$(O_{1.5}Si$—$Y$—$SiO_{1.5})_{1-x}$ | 0 | 0, 0 | 0, 0 | 1.5, 1.5 | 2, 2 |
| WO 2008/103423 A1 | 11e | $(O_{1.5}SiCH_2CH_2SiO_{1.5})_x$—$(Y_2SiO_1)_{1-x}$ | 0 | 0, 2 | 0, 0 | 1, 5, 1.0 | 2, 1 |
| WO 2008/103423 A1 | 11r | $(O_{1.5}SiCH_2CH_2SiO_{1.5})_x$—$(FSiO_{1.5})_{1-x}$ | 0 | 0, 0 | 0, 0 | 1.5, 1.5 | 2, 1 |

In one embodiment, the superficially porous cores of the invention comprise a substantially nonporous core and one or more layers of inorganic/organic shell material of formula II:

$$(SiO_2)_d/[(R)_p(R^1)_qSiO_t] \quad (II)$$

wherein,

R and $R^1$ are each independently $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

In yet another embodiment, the superficially porous cores of the invention comprise a substantially nonporous core and one or more layers of inorganic/organic shell material of formula III:

$$(SiO_2)_d/[R^2((R^1)_rSiO_t)_m] \quad (III)$$

wherein, $R^1$ is $C_1$-$C_{18}$ alkoxy, $C_1$-$C_{18}$ alkyl, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; when r=1 then t=1; or when r=2, then t=0.5; and m is an integer from 1-20.

In various embodiments, the invention comprises a hybrid core of formulas I and II, wherein R is $C_1$-$C_{18}$ alkoxy, $C_1$-$C_{18}$ alkyl, or $C_1$-$C_{18}$ alkyl. In various embodiments, the invention comprises a hybrid core of formulas I, II and III, wherein $R^1$ is $C_1$-$C_{18}$ alkoxy, $C_1$-$C_{18}$ alkyl, or $C_1$-$C_{18}$ alkyl. In various embodiments, the invention comprises a hybrid core of formulas I and III, wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In yet another embodiment, the superficially porous cores of the invention comprise a substantially nonporous core and one or more layers of inorganic/organic shell material of formula IV:

$$(A)_x(B)_y(C)_z \quad (IV)$$

wherein the order of repeat units A, B, and C may be random, block, or a combination of random and block; A is an organic repeat unit which is covalently bonded to one or more repeat units A or B via an organic bond; B is an organosiloxane repeat unit which is bonded to one or more repeat units B or C via an inorganic siloxane bond and which may be further bonded to one or more repeat units A or B via an organic bond; C is an inorganic repeat unit which is bonded to one or more repeat units B or C via an inorganic bond; x and y are positive numbers, and z is a non negative number, wherein x+y+z=1. In certain embodiments, z=0, then $0.002 \leq x/y \leq 210$, and when $z \leq 0$, then $0.0003 \leq y/z \leq 500$ and $0.002 \leq x/(y+z) \leq 210$.

In a related embodiment, the superficially porous cores of the invention comprise a substantially nonporous core and one or more layers of inorganic/organic shell material of formula V:

$$(A)_x(B)_y(B^*)_{y^*}(C)_z \quad (V)$$

wherein the order of repeat units A, B, B*, and C may be random, block, or a combination of random and block; A is an organic repeat unit which is covalently bonded to one or more repeat units A or B via an organic bond; B is an organosiloxane repeat unit which is bonded to one or more repeat units B or B* or C via an inorganic siloxane bond and which may be further bonded to one or more repeat units A or B via an organic bond, B* is an organosiloxane repeat unit which is bonded to one or more repeat units B or B* or C via an inorganic siloxane bond, wherein B* is an organosiloxane repeat unit that does not have reactive (i.e., polymerizable) organic components and may further have a protected functional group that may be deprotected after polymerization; C is an inorganic repeat unit which is bonded to one or more repeat units B or B* or C via an inorganic bond; x, y, and y* are positive numbers and z is a non negative number, wherein x+y+z=1. In certain embodiments, when z=0, then $0.002 \leq x/(y+y^*) \leq 210$, and when $z \neq 0$, then $0.0003 \leq (y+y^*)/z \leq 500$ and $0.002 \leq x/(y+y^*+z) \leq 210$.

Repeat unit A may be derived from a variety of organic monomer reagents possessing one or more polymerizable moieties, capable of undergoing polymerization, e.g., a free radical-mediated polymerization. A monomers may be oligomerized or polymerized by a number of processes and mechanisms including, but not limited to, chain addition and step condensation processes, radical, anionic, cationic, ring-opening, group transfer, metathesis, and photochemical mechanisms.

A may also be one of the following:

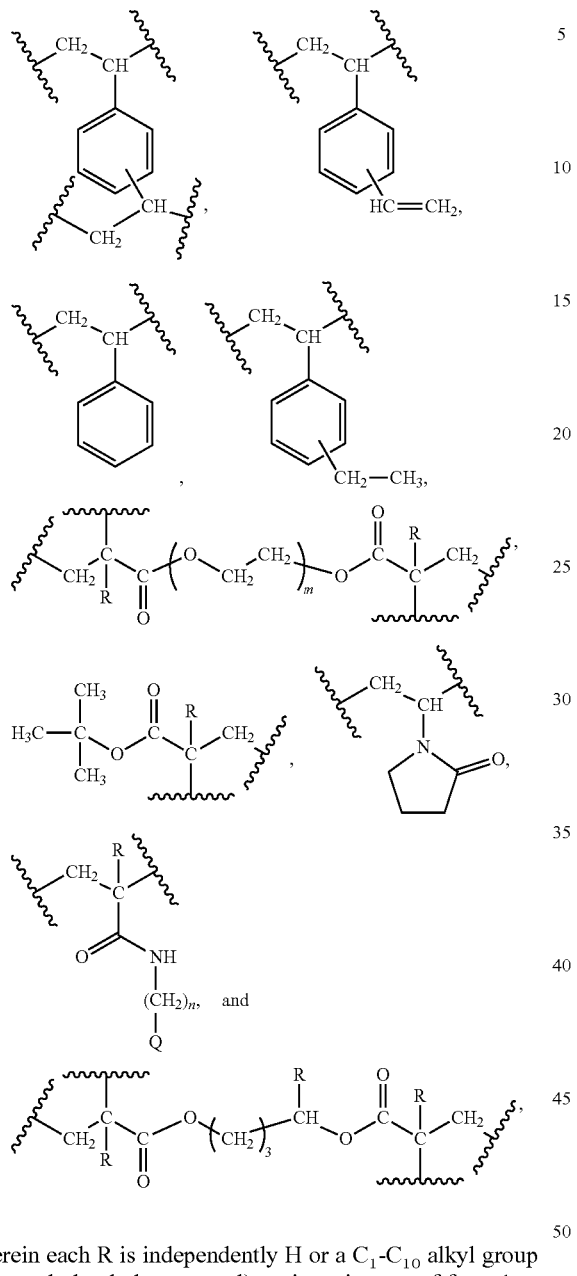

wherein each R is independently H or a $C_1$-$C_{10}$ alkyl group (e.g, methyl, ethyl, or propyl); m is an integer of from 1 to about 20; n is an integer of from 0 to 10; and Q is hydrogen, $N(C_{1-6}alkyl)_3$, $N(C_{1-6}alkyl)_2(C_{1-6}alkyl-SO_3)$, or $C(C_{1-6}hydroxyalkyl)_3$.

Repeat unit B may be derived from several mixed organic-inorganic monomer reagents possessing two or more different polymerizable moieties, capable of undergoing polymerization, e.g., a free radical-mediated (organic) and hydrolytic (inorganic) polymerization. B monomers may be oligomerized or polymerized by a number of processes and mechanisms including, but not limited to, chain addition and step condensation processes, radical, anionic, cationic, ring-opening, group transfer, metathesis, and photochemical mechanisms.

B may also be one of the following:

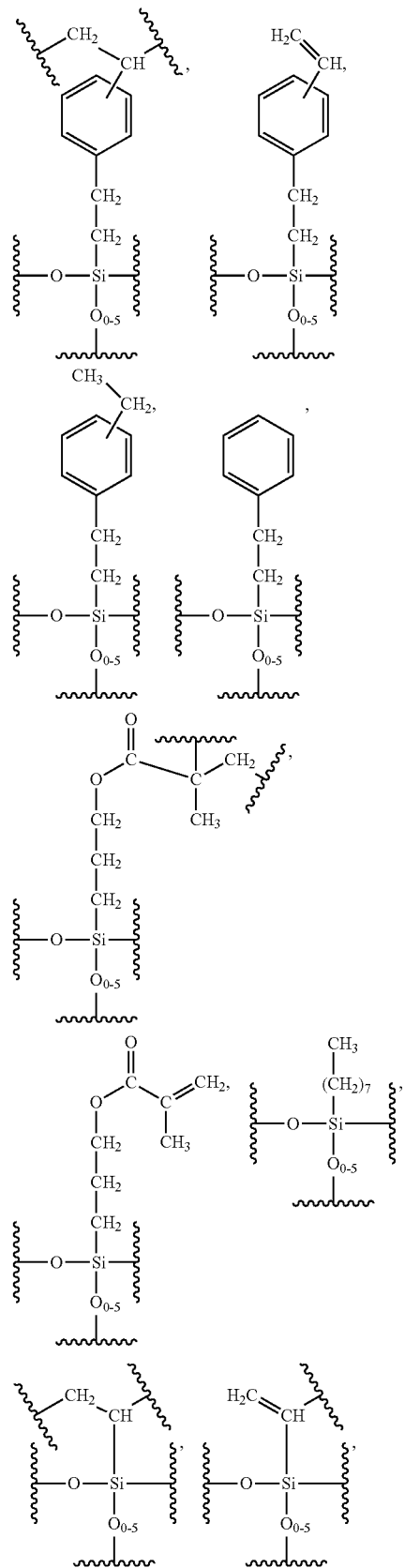

-continued

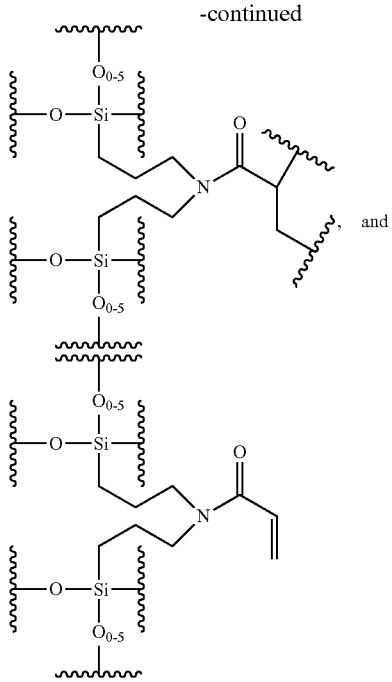

Repeat unit C may be —SiO$_2$— and may be derived from an alkoxysilane, such as tetraethoxysilane (TEOS) or tetramethoxysilane (TMOS).

In one embodiment, A is a substituted ethylene group, B is a oxysilyl-substituted alkyl group, and C is a oxysilyl group, for example the following:

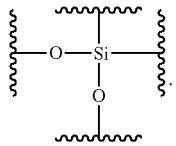

A specific embodiment of a porous hybrid core of formula IV is:

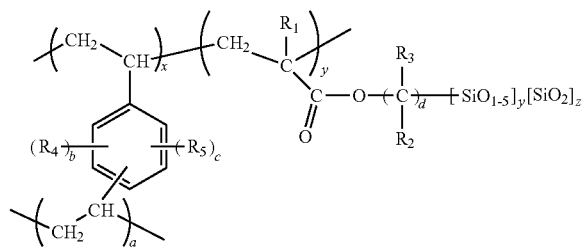

wherein
$R_1$ is H, F, Cl, Br, I, lower alkyl (e.g., CH$_3$ or CH$_2$CH$_3$);
$R_2$ and $R_3$ are each independently H, F, Cl, Br, I, alkane, substituted alkane, alkene, substituted alkene, aryl, substituted aryl, cyano, ether, substituted ether, embedded polar group;
$R_4$ and $R_5$ are each independently H, F, Cl, Br, I, alkane, substituted alkane, alkene, substituted alkene, aryl, substituted aryl, ether, substituted ether, cyano, amino, substituted amino, diol, nitro, sulfonic acid, cation or anion exchange groups, $0 \leq a \leq 2x$, $0 \leq b \leq 4$, and $0 \leq c \leq 4$, provided that $b+c \leq 4$ when $a=1$;
$1 \leq d \leq 20$,
$0.0003 \leq y/z \leq 500$ and $0.002 \leq x/(y+z) \leq 210$.

In certain embodiments, the substantially nonporous core is a hybrid core of formula II, III, IV, or V.

In still another embodiment, the superficially porous cores are spherical. In a further embodiment, the spherical core has a non-crystalline or amorphous molecular ordering. In a further embodiment, the spherical core has a non-periodic pore structure.

In other embodiments, the superficially porous core has a surface area of about 2 to 1100 m$^2$/g. In certain instances, the superficially porous core has a surface area of about 80 to 500 m$^2$/g. In other instances, the particle has a surface area of about 60 to 200 m$^2$/g.

In one embodiment, the superficially porous core has an average pore volume of about 0.2 to 1.5 cm$^3$/g. In certain instances, the superficially porous core has an average pore volume of about 0.6 to 1.3 cm$^3$/g.

In another embodiment, the superficially porous core has a micropore surface area of less than about 110 m$^2$/g. In certain instances, the superficially porous core has a micropore surface area of less than about 105 m$^2$/g. In other instances, the superficially porous core has a micropore surface area of less than about 80 m$^2$/g. In still other instances, the superficially porous core has a micropore surface area of less than about 50 m$^2$/g.

In one embodiment, the porous superficially porous core has an average pore diameter of about 20 to 1000 Å. In a further embodiment, the superficially porous core has an average pore diameter of about 30 to 300 Å. In another embodiment, the superficially porous core has an average pore diameter of about 60 to 200 Å. In a further embodiment, the particle has an average pore diameter of about 80 to 140 Å.

In another embodiment, the superficially porous core has an average size of about 0.1 μm to about 300 μm. In a further embodiment, the superficially porous core has an average size of about 0.1 μm to about 30 μm.

In certain embodiments, the superficially porous core is hydrolytically stable at a pH of about 1 to about 14. In one embodiment, the superficially porous core is hydrolytically stable at a pH of about 8 to about 14. In another embodiment, the superficially porous core is hydrolytically stable at a pH of about 1 to about 5.

In one embodiment, the invention comprises a superficially porous core as described herein, wherein the core is formed by hydrolytic condensation of one or more monomers selected from the group consisting of:

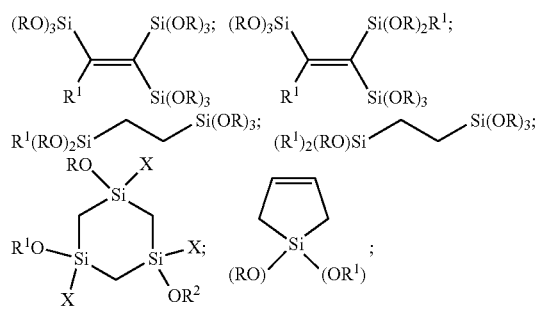

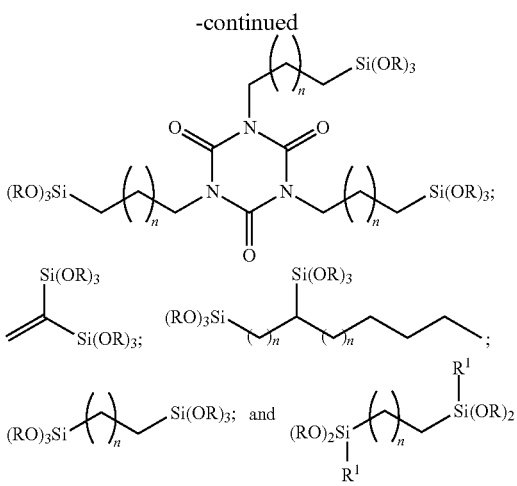

wherein R, $R^1$ and $R^2$ are as defined previously; X is $C_1$-$C_{18}$ alkoxy or $C_1$-$C_{18}$ alkyl; and n is 1-8.

In a further embodiment, the monomer is 1,2-bis(triethoxysilyl)ethane:

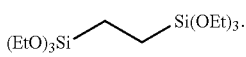

In another further embodiment, the monomer is 1,2-bis(methyldiethoxy silyl)ethane:

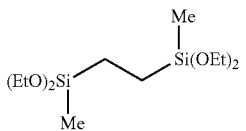

or 1,8-bis(triethoxysilyl)octane:

In other embodiment, the superficially porous core as described herein has been surface modified with a surface modifier having the formula $Z_a(R')_bSi$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the superficially porous core have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier is selected from the group consisting of octyltrichlorosilane, octadecyl-trichlorosilane, octyldimethylchlorosilane and octadecyldimethylchlorosilane. Preferably, the surface modifier is selected from the group consisting of octyltrichlorosilane and octadecyltrichlorosilane.

In another embodiment, the superficially porous core has been surface modified by a combination of organic group and silanol group modification.

In still another embodiment, the superficially porous core has been surface modified by a combination of organic group modification and coating with a polymer. In a further embodiment, the organic group comprises a chiral moiety.

In yet another embodiment, the superficially porous core has been surface modified by a combination of silanol group modification and coating with a polymer.

In other embodiments, the superficially porous core has been surface modified via formation of an organic covalent bond between the particle's organic group and the modifying reagent.

In still other embodiments, the superficially porous core has been surface modified by a combination of organic group modification, silanol group modification and coating with a polymer.

In another embodiment, the superficially porous core has been surface modified by silanol group modification.

In another aspect, the superficially porous core has a chromatographically enhancing pore geometry, wherein the material comprises a combination of the particles described herein.

In certain embodiments, the superficially porous core is a monolith.

In another aspect, the invention provides materials as described herein wherein the superficially porous core further comprises a nanoparticle or a mixture of more than one nanoparticles dispersed within the superficially porous core.

In certain embodiments, the nanoparticle is present in <20% by weight of the nanocomposite, <10% by weight of the nanocomposite, or <5% by weight of the nanocomposite.

In other embodiments, the nanoparticle is crystalline or amorphous and may be silicon carbide, aluminum, diamond, cerium, carbon black, carbon nanotubes, zirconium, barium, cerium, cobalt, copper, europium, gadolinium, iron, nickel, samarium, silicon, silver, titanium, zinc, boron, oxides thereof, or a nitride thereof. In particular embodiments, the nanoparticle is a substance which comprises one or more moieties selected from the group consisting of nano-diamonds, silicon carbide, titanium dioxide, cubic-boronitride.

In other embodiments, the nanoparticles may be less than or equal to 200 nm in diameter, less than or equal to 100 nm in diameter, less than or equal to 50 nm in diameter, or less than or equal to 20 nm in diameter.

Surface Modification

The novel inorganic/organic hybrid materials of the invention may further be surface modified.

Thus, in one embodiment, the material as described herein may be surface modified with a surface modifier having the formula $Z_a(R')_bSi$—R", where Z=Cl, Br, I, $C_1$-$C_5$ alkoxy, dialkylamino or trifluoromethanesulfonate; a and b are each an integer from 0 to 3 provided that a+b=3; R' is a $C_1$-$C_6$ straight, cyclic or branched alkyl group, and R" is a functionalizing group.

In another embodiment, the materials have been surface modified by coating with a polymer.

In certain embodiments, R' is selected from the group consisting of methyl, ethyl, propyl, isopropyl, butyl, t-butyl, sec-butyl, pentyl, isopentyl, hexyl and cyclohexyl. In other embodiments, R is selected from the group consisting of alkyl, alkenyl, alkynyl, aryl, cyano, amino, diol, nitro, ester, a cation or anion exchange group, an alkyl or aryl group containing an embedded polar functionality and a chiral moiety.

In one embodiment, R" is a $C_1$-$C_{30}$ alkyl group. In a further embodiment, R" comprises a chiral moiety. In another further embodiment, R" is a $C_1$-$C_{20}$ alkyl group.

In certain embodiments, the surface modifier is selected from the group consisting of octyltrichlorosilane, octadecyltrichlorosilane, octyldimethylchlorosilane and octadecyldimethylchlorosilane. In some embodiments, the surface modifier is selected from the group consisting of octyltrichlorosilane and octadecyltrichlorosilane. In other embodiments, the surface modifier is selected from the group consisting of an isocyanate or 1,1'-carbonyldiimidazole (particularly when the hybrid group contains a $(CH_2)_3OH$ group).

In another embodiment, the material has been surface modified by a combination of organic group and silanol group modification.

In still another embodiment, the material has been surface modified by a combination of organic group modification and coating with a polymer. In a further embodiment, the organic group comprises a chiral moiety.

In yet another embodiment, the material has been surface modified by a combination of silanol group modification and coating with a polymer.

In other embodiments, the material has been surface modified via formation of an organic covalent bond between the particle's organic group and the modifying reagent.

In still other embodiments, the material has been surface modified by a combination of organic group modification, silanol group modification and coating with a polymer.

In another embodiment, the material has been surface modified by silanol group modification.

In certain embodiments, the surface modified layer may be porous or nonporous.

Separation Devices and Kits

Another aspect provides a variety of separations devices having a stationary phase comprising the inorganic/organic hybrid materials as described herein. The separations devices include, e.g., chromatographic columns, thin layer plates, filtration membranes, sample cleanup devices and microtiter plates. The separations devices can be used for a variety of separations techniques including, but not limited to, normal-phase separations, reversed-phase separations, HILIC separations, SFC separations, affinity separations, and SEC separations.

The inorganic/organic hybrid materials impart to these devices improved lifetimes because of their improved stability. Thus, in a particular aspect, the invention provides a chromatographic column having improved lifetime, comprising
a) a column having a cylindrical interior for accepting a packing material, and
b) a packed chromatographic bed comprising the inorganic/organic hybrid materials as described herein.

The invention also provides for a kit comprising the inorganic/organic hybrid materials as described herein, as described herein, and instructions for use. In one embodiment, the instructions are for use with a separations device, e.g., chromatographic columns, thin layer plates, filtration membranes, sample cleanup devices and microtiter plates.

Synthesis of Materials of the Invention

The invention also provides methods for producing the inorganic/organic hybrid materials described herein.

In one embodiment, the invention provides a method for producing the inorganic/organic hybrid materials described herein comprising:
providing a superficially porous core material; and
condensing one or more polymeric organofunctional metal precursors, and/or polymeric metal oxide precursors on the surface of the superficially porous core.

In another embodiment, the invention provides a method for producing the inorganic/organic hybrid materials described herein comprising:
providing a superficially porous core material;
applying a partially condensed polymeric organofunctional metal precursors, a mixture of two or more polymeric organofunctional metal precursors, or a mixture of one or more polymeric organofunctional metal precursors with a polymeric metal oxide on the surface of the superficially porous core; and
further condensing said surface.

In certain embodiments, the method producing the inorganic/organic hybrid materials described herein further comprises the step of subjecting the hybrid material to hydrothermal treatment.

In another embodiment, the invention provides a method for producing the inorganic/organic hybrid materials described herein, comprising the steps of:
providing a superficially porous core material; and
condensing one or more polymeric organofunctional metal precursors, and/or polymeric metal oxide precursors on the surface of the superficially porous core.

In another embodiment, the invention provides a method for producing the inorganic/organic hybrid materials described herein comprising the steps of:
providing a superficially porous core material;
applying a partially condensed polymeric organofunctional metal precursors, a mixture of two or more polymeric organofunctional metal precursors, or a mixture of one or more polymeric organofunctional metal precursors with a polymeric metal oxide on the surface of the superficially porous core; and further condensing said surface.

In certain embodiments, the process of producing the inorganic/organic hybrid materials described herein further comprises the step of subjecting the hybrid material to hydrothermal treatment.

In a particular embodiment, the invention provides methods for producing the inorganic/organic hybrid materials described herein in which the superficially porous core of the materials is provided by the steps of:
a) providing a nonporous or substantially nonporous core material;
b) onto said nonporous or substantially nonporous core material, hydrolytically condensing one or more monomers selected from the group consisting of organoalkoxysilanes and tetraalkoxysilanes with one or more monomers selected from the group consisting of organoalkoxysilanes, tetraalkoxysilanes, metal oxide precursors, and ceramic precursors to produce a polyorganoalkoxysiloxane;
c) further condensing the polyorganoalkoxysiloxane to form a superficially porous particle; and
d) subjecting the resulting particle to hydrothermal treatment to form a substantially porous core material.

In an embodiment of the foregoing method when preparing a superficially porous core, comprising the inorganic portion in an amount ranging from about 0 molar % to not more than about 25 molar %, wherein the pores of the particle are substantially disordered, the hydrolytic condensing of one or more monomers excludes tetraalkoxysilanes. In some embodiments of the foregoing method, the inorganic portion is present in an amount ranging from about 0 molar % to not more than about 100 molar %; from 25 molar % to about 50 molar %, from about 50 molar % to about 75 molar %; or from about 75 molar % to about 100 molar %; wherein the pores of the particle are substantially disordered, the hydrolytic condensation of one or more monomers excludes tetraalkoxysilanes.

In one embodiment, the metal oxide precursors of the superficially porous cores are selected from the group consisting of the oxide, hydroxide, ethoxide, methoxide, propoxide, isopropoxide, butoxide, sec-butoxide, tert-butoxide, iso-butoxide, phenoxide, ethylhexyloxide, 2-methyl-2-butoxide, nonyloxide, isooctyloxide, glycolates, carboxylate, nitrate, chlorides, and mixtures thereof of titanium, zirconium, or aluminum. Preferably, the metal oxide precursors are methyl titanium triisopropoxide, methyl titanium triphenoxide, titanium allylacetoacetatetriisopropoxide, titanium methacrylate triisopropoxide, titanium methacryloxyethylacetoacetate triisopropoxide, pentamethylcyclopentadienyl titanium trimethoxide, pentamethylcyclopentadienyl titanium trichloride, and zirconium methacryloxyethylacetoacetate tri-n-propoxide.

In another aspect, the invention provides methods for producing the materials of the invention in which the superficially porous core of the materials is provided by the steps of:

a) providing a nonporous or substantially nonporous core material;

b) onto said nonporous or substantially nonporous core materia, a) hydrolytically condensing one or more monomers selected from the group consisting of organoalkoxysilanes and tetraalkoxysilanes, to produce a polyorganoalkoxysiloxane;

c) further condensing the polyorganoalkoxysiloxane to form a superficially porous particle; and d) subjecting the resulting particle to hydrothermal treatment; to thereby produce a porous superficially porous core.

In certain embodiments, the invention provides a method of producing a superficially porous core comprising $SiO_2$ in an amount ranging from about 0 molar % to not more than about 25 molar %, wherein the pores of the particle are substantially disordered, wherein the one or more monomers exclude tetraalkoxysilanes. In some embodiments of the foregoing method $SiO_2$ is present in an amount ranging from about 0 molar % to not more than about 100 molar %; from 25 molar % to about 50 molar %, from about 50 molar % to about 75 molar %; or from about 75 molar % to about 100 molar %; wherein the pores of the particle are substantially disordered, wherein the one or more monomers exclude tetraalkoxysilanes.

In still another aspect, the invention provides methods for producing the materials of the invention in which a superficially porous core, comprising $SiO_2$ in an amount ranging from about 0 molar % to not more than about 100 molar %, wherein the pores of the particle are substantially disordered, is provided by the steps of:

a) providing a nonporous or substantially nonporous core material;

b) onto said nonporous or substantially nonporous core materia, a) hydrolytically condensing one or more monomers selected from the group consisting of organoalkoxysilanes and tetraalkoxysilanes, to produce a polyorganoalkoxysiloxane;

c) further condensing the polyorganoalkoxysiloxane to form a superficially porous particle; and d) subjecting the resulting particle to hydrothermal treatment; to thereby produce a superficially porous porous inorganic/organic hybrid particle.

In certain embodiments, the condensing step comprises treating an aqueous emulsion of the polyorganoalkoxysiloxane with base to form a superficially porous core.

In another embodiment, the invention provides a method of producing a superficially porous core as described above, further comprising treating the superficially porous particle with acid.

In still another embodiment, the invention provides a method of producing a superficially porous core as described above, further comprising treating the aqueous emulsion of the polyorganoalkoxysiloxane with one or more additional aliquots of base to form a superficially porous particle. In a further embodiment, the invention provides a method further comprises treating the superficially porous particle with acid.

In certain embodiments, the invention provides a method, wherein the superficially porous core has a chromatographically enhancing pore geometry (CEPG).

In one embodiment, the foregoing methods produce the superficially porous core having formula I, II, or II described above.

In certain embodiments, the invention provides a method, further comprises preparing an aqueous suspension of the polyorganoalkoxysiloxane and gelling in the presence of a base catalyst to produce the superficially porous core.

In certain embodiments of the method of producing the superficially porous core, step a) or step b) is acid-catalyzed or base-catalyzed. In one embodiment, step a) is acid catalyzed. In another embodiment, step b) is base catalyzed. In a further embodiment, the base-catalyzed reaction is an oil-in-water emulsification reaction.

Thus, in an advantageous embodiment, step b) of producing the superficially porous core further comprises treating an aqueous emulsion of the polyorganoalkoxysiloxane with base. In a further advantageous embodiment, following treatment with base, the particle produced in step b) is treated with acid. In an alternative advantageous embodiment, the treatment of the aqueous emulsion of the polyorganoalkoxysiloxane with base in step b) is followed by treatment with one or more additional aliquots of base and then the resulting particles are treated with acid.

Suitable acids for use with the methods of the invention include hydrochloric acid, hydrobromic acid, hydrofluoric acid, hydroiodic acid, sulfuric acid, formic acid, acetic acid, trichloroacetic acid, trifluoroacetic acid and phosphoric acid. Suitable bases for use with the methods of the invention include alkyl amines, ammonium hydroxide, hydroxide salts of the group I and group II metals, carbonate and hydrogen carbonate salts of the group I metals and alkoxide salts of the group I and group II metals. Alkyl amines include, e.g., trimethyl amine, triethyl amine, diisopropyl ethyl amine, etc. Tris(hydroxymethyl) methylamine is a preferred alkyl amine.

In certain embodiments, steps a) and b) of producing the superficially porous core are performed in a solvent selected from the group consisting of water, methanol, ethanol, propanol, isopropanol, butanol, tert-butanol, pentanol, hexanol, cyclohexanol, hexafluoroisopropanol, cyclohexane, petroleum ethers, diethyl ether, dialkyl ethers, tetrahydrofuran, acetonitrile, ethyl acetate, pentane, hexane, heptane, benzene, toluene, xylene, N,N-dimethylformamide, dimethyl sulfoxide, 1-methyl-2-pyrrolidinone, methylene chloride, chloroform and combinations thereof.

In still another aspect, the invention provides methods for producing the inorganic/organic hybrid materials described herein in which a hybrid core, of formula IV or formula V, is produced comprising the steps of:

(a) providing a nonporous or substantially nonporous core;

(b) hydrolytically condensing an alkenyl-functionalized organosilane with a tetraalkoxysilane;

(c) onto the nonporous or substantially nonporous core, copolymerizing the product of step (b) with an organic olefin monomer; and (d) further condensing the product of step (c) to form a superficially porous particle.

In still another aspect, the invention provides methods for producing the materials of the invention in which a hybrid core, of formula IV or formula V described above, is produced comprising the steps of:

(a) providing a nonporous or substantially nonporous core;

(b) copolymerizing an organic olefin monomer with an alkenyl-functionalized organosilane; and (c) onto the nonporous or substantially nonporous core, hydrolytically condensing the product of step (a) with a tetraalkoxysilane in the presence of a non-optically active porogen; and (d) further condensing the product of step (b) to form a superficially porous particle.

In certain embodiments, the copolymerizing step is free radical-initiated and wherein the hydrolytically condensing step is an acid- or base-catalyzed.

In one embodiment, the invention provides a method as described above, further comprising subjecting the resulting hybrid core to hydrothermal treatment.

In certain embodiments, the superficially porous core produced in step b) or step c) are sized to generate a particle size distribution that is distinct from the particle size distribution of the spherical porous particles produced in step b) or step c).

In other embodiments, the superficially porous hybrid core has a non-crystalline or amorphous molecular ordering. In a further embodiment, the spherical hybrid core has a non-periodic pore structure.

In certain embodiments, the invention provides a method of producing the superficially porous core of the material of the invention, wherein the superficially porous core has a surface area of about 40 to 1100 m$^2$/g. In a further embodiment, the superficially porous core has a surface area of about 80 to 500 m$^2$/g. In another further embodiment, the superficially porous core has a surface area of about 800 to 1100 m$^2$/g.

In one embodiment, the invention provides a method of producing the superficially porous core of the material of the invention wherein the superficially porous core has an average pore volume of about 0.2 to 1.5 cm$^3$/g. In a further embodiment, the superficially porous core has an average pore volume of about 0.6 to 1.3 cm$^3$/g.

In another embodiment, the invention provides a method of producing the superficially porous core of the material of the invention wherein the superficially porous core has a micropore surface area of less than about 110 m$^2$/g. In a further embodiment, the superficially porous core has a micropore surface area of less than about 105 m$^2$/g. In another embodiment, the superficially porous core has a micropore surface area of less than about 80 m$^2$/g. In a further embodiment, the superficially porous core has a micropore surface area of less than about 50 m$^2$/g.

In another embodiment, the invention provides a method of producing the superficially porous core of the material of the invention wherein the superficially porous core has an average pore diameter of about 20 to 500 Å. In a further embodiment, the superficially porous core has an average pore diameter of about 30 to 180 Å.

In certain instances, the superficially porous core of the material has an average pore diameter of about 60 to 600 Å. Preferably, the superficially porous core has an average pore diameter of about 60 to 200 Å or of about 80 to 140 Å.

In other instances, the superficially porous core of the material has an average size of about 0.1 µm to about 300 µm, preferably about 0.1 µm to about 30 µm.

In another embodiment, the invention provides a method of producing the superficially porous core of the material of the invention wherein the superficially porous core is hydrolytically stable at a pH of about 1 to about 14. In certain instances, the superficially porous core is hydrolytically stable at a pH of about 8 to about 14. In other instances, the particle is hydrolytically stable at a pH of about 1 to about 5.

In one embodiment, the invention provides a method of producing the superficially porous core of the material of the invention wherein the organic content is from about 0 to about 40% carbon. In a further embodiment, the organic content is from about 25 to about 35% carbon. In one embodiment, the organic content is from about 1 to about 40% carbon. In another embodiment, the organic content is from about 5 to about 35% carbon. In yet another embodiment, the invention provides a porous inorganic/organic hybrid particle, wherein the organic content is from about 25 to about 40% carbon. In a further embodiment, the organic content is from about 25 to about 35% carbon. In a further embodiment, the organic content is from about 5 to about 15% carbon.

In certain instances, the invention provides a method of producing the superficially porous core of the material of the invention wherein R is $C_1$-$C_{18}$ alkoxy, $C_1$-$C_{18}$ alkyl, or $C_1$-$C_{18}$ alkyl.

In another embodiment, $R^1$ is $C_1$-$C_{18}$ alkoxy $C_1$-$C_{18}$ alkyl, or $C_1$-$C_{18}$ alkyl.

In other embodiments, $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl.

In one embodiment, the invention provides a method of producing the superficially porous core of formula I wherein p is 0, q is 0, t is 1.5, m is 2, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, d is 0. In another further embodiment, d is 0.11. In still another further embodiment, d is 0.33. In yet another further embodiment, d is 0.83.

In another embodiment, the invention provides a method of producing the superficially porous core of formula I wherein d is 0, q is 0, and $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, or $C_1$-$C_{18}$ heteroaryl; wherein each $R^2$ is attached to two or more silicon atoms. In a further embodiment, p is 0, 1, or 2. In another embodiment, t is 1.0 or 1.5. In another embodiment, m is 1 or 2.

In one embodiment, the invention provides a method of producing the superficially porous core of the invention wherein the one or more monomers are selected from the group consisting of:

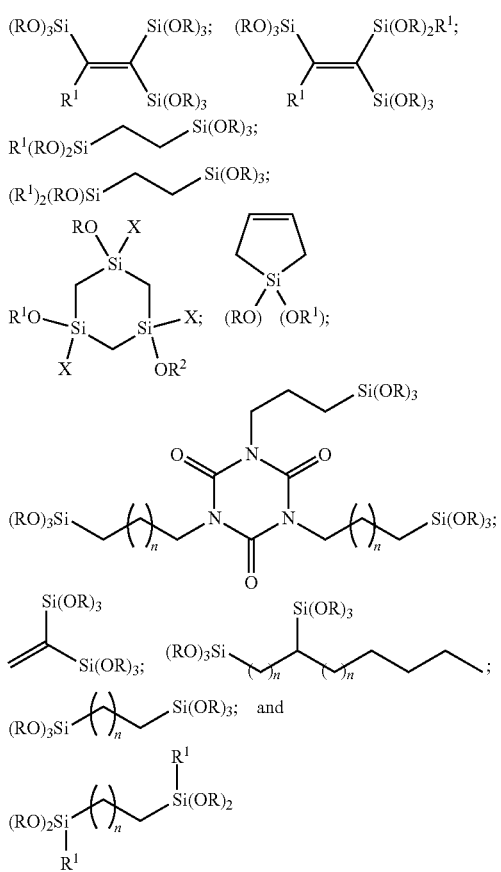

wherein R, $R^1$ and $R^2$ are as defined previously; X is $C_1$-$C_{18}$ alkoxy or $C_1$-$C_{18}$ alkyl; and n is 1-8.

In certain embodiments, the monomer is 1,2-bis(triethoxysilyl)ethane:

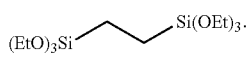

In other embodiments, the monomer is 1,2-bis(methyldiethoxy silyl)ethane:

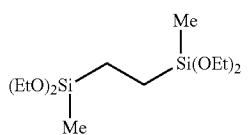

or 1,8-bis(triethoxysilyl)octane:

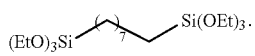

The freshmade hybrid cores resulting from step b) are advantageously sized to generate a particle size distribution that is distinct from the particle size distribution of the freshmade superficially porous particles resulting form step b). Any number of well known sizing techniques may be used. Such sizing techniques are described, for example, in W. Gerhartz, et al. (editors) *Ullmann's Encyclopedia of Industrial Chemistry*, 5th edition, Volume B2: Unit Operations I, VCH Verlagsgesellschaft mbH, (Weinheim, Fed. Rep. Germ. 1988). Particles are advantageously sized to a diameter range of about 0.5 μm to about 300 μm, more advantageously about 1 μm to about 20 μm.

The superficially porous cores of the material of the invention can be prepared by the foregoing methods. Further details on the synthesis of the superficially porous cores of formulas IV and V can be found, for example, in WO2004/041398-A2. Certain embodiments of the synthesis of the porous inorganic/organic hybrid particles of formulas I-III described above are further described as follows.

Porous spherical particles of hybrid core may, in a preferred embodiment, be prepared by a four-step process. In the first step, an organoalkoxysilane can be prepolymerized by itself, or with one or more organoalkoxysilanes or with 0-49 molar % tetraalkoxysilane such as tetraethoxysilane (TEOS) to form a polyorganoalkoxysiloxe (POS) by co-hydrolyzing in the presence of an acid catalyst. A list of organoalkoxysilanes that may be used in this approach includes (but is not limited to); bis(triethoxysilyl)ethane; bis(triethoxylsilyl)octane; bis(methyldiethoxysilyl)ethane; bis(triethoxysilyl)ethene; bis(trimethoxysilylethyl)benzene; ethyltriethoxysilane; diethyldiethoxysilane; mercaptopropyltriethoxysilane; methyltriethoxysilane; vinyltriethoxysilane; hexyltriethoxysilane; chloropropyltriethoxysilane; phenylethyltrimethoxysilane; octadecyltrimethoxysilane; octyltrimethoxysilane; 3,3.3-trifluoropropyltrimethoxysilane; and 3-cyanobutyltriethoxysilane. The use of reactive organoalkoxysilanes that have been shown to react by protodesilylation, deprotection, or decompose may also be useful in introducing porosity into hybrid particles. A list of organoalkoxysilanes that may protodesilylate, deprotect or decompose to introduce porosity into hybrid cores includes (but is not limited to); phenyltriethoxysilane; methacryloxypropyltrimethoxysilane; acetyloxyethyltrimethoxysilane, chloroethyltriethoxysilane, and fluorotriethoxysilane.

In the second step, the POS is suspended in an aqueous medium in the presence of a surfactant or a combination of surfactants and gelled into porous superficially porous cores. The process of gelation can be controlled using a single addition of base catalyst or multiple additions of base catalyst, a combination of base and acid catalyst, or the multi-addition of base catalyst followed by acid catalyst.

In the third step, the pore structure of the superficially porous cores is modified by hydrothermal treatment, producing an intermediate hybrid product which may be used for particular purposes itself, or may be further processed below. The above three steps of the process allow much better control of the particle sphericity, morphology, pore volume and pore sizes than those described in the prior art, and thus provide the chromatography-enhancing pore geometry.

In one embodiment of the invention, the surface organic groups of the superficially porous cores and/or the materials may be derivatized or modified in a subsequent step via formation of an organic covalent bond between the particle's organic group and the modifying reagent. Alternatively, the surface silanol groups of the superficially porous cores and/or the surrounding materials are derivatized or modified into siloxane functional groups, such as by reacting with an organotrihalosilane, e.g., octadecyltrichlorosilane, or a halopolyorganosilane, e.g., octadecyldimethylchlorosilane. Alternatively, the surface organic and silanol groups of the superficially porous cores and/or the surrounding materials are both derivatized or modified. The surface of the thus-prepared material is then covered by the organic groups, e.g., alkyl, embedded during the gelation and the organic groups added during the derivatization process or processes. The surface coverage by the overall organic groups is higher than in conventional silica-based packing materials and, therefore, the surface concentration of the remaining silanol groups in the hybrid particles is smaller. The resulting material, used as a stationary phase for LC, shows excellent peak shape for basic analytes and better stability to alkaline mobile phases than silica-based packing materials.

Where the prepolymerization step involves co-hydrolyzing a mixture of the two or more components in the presence of an acid catalyst, the content of the organoalkoxysilane, e.g., organotrialkoxysilane can be varied, e.g., from about 0.03 to about 1.0 mole per mole, or more preferably, about 0.2 to about 0.5 mole per mole, of the tetraalkoxysilane. The amount of the water used for the hydrolysis can be varied, e.g., from 1.10 to 1.35 mole per mole of the silane. The silane, water and the ethanol mixture, in the form of a homogeneous solution, is stirred and heated to reflux under a flow of argon. After it is refluxed for a time sufficient to prepolymerize to form polyorganoalkoxysiloxane (POS), e.g., polyalkylalkoxysiloxane, the solvent and the side product, mainly ethanol, is distilled off from the reaction mixture. Thereafter, the residue is heated at an elevated temperature, e.g., in the range of 45 to 85° C. under an atmosphere of an inert gas, e.g., nitrogen, argon, etc., for a period of time, e.g., 0.5 to 48 h. The residue is further heated at 95° C. to 120° C., e.g., for 1 to 3 h at atmospheric pressure or under reduced pressure, e.g., $10^{-2}$-$10^{-3}$ torr, to remove any volatile species.

In the second step, the POS is suspended into fine beads in a solution containing water and an alcohol, such as ethanol or butanol, at 55° C. by agitation. The volume percent of alcohol in the solution is varied from 10 to 20%. A surfactant such Triton® X-100, Triton® X-165, as sodium dodecylsulfate (SDS), ammonia docecylsulfate or TRIS docecylsulfate, is added into the suspension as the suspending agent. The surfactants, are believed to be able to orient at the hydrophobic/hydrophilic interface between the POS beads and the aqueous phase to stabilize the POS beads. The surfactants are also believed to enhance the concentration of water and the base catalyst on the surface of the POS beads during the gelation step, through their hydrophilic groups, which induces the gelation of the POS beads from the surface towards the center. Use of surfactants to modulate the surface structure of the POS beads stabilizes the shape of the POS beads throughout the gelling process and minimizes or suppresses formation of particles having an irregular shapes, e.g., "shell shaped", and inhomogeneous morphology.

It is also possible to suspend a solution containing POS and a porogen in the aqueous phase, instead of POS alone. The porogen, which is insoluble in the aqueous phase, remains in the POS beads during the gelation step and functions as a porogen. Porogen include, e.g., toluene and mesitylene. By controlling the relative amount of toluene in the POS/toluene solution, the pore volume of the final hybrid particles can be more precisely controlled. This allows the preparation of hybrid particles having large pore volume, e.g., 0.25-1.5 cm$^3$/g.

The gelation step is initiated by adding the basic catalyst, e.g., ammonium hydroxide into the POS suspension. Thereafter, the reaction mixture is agitated to drive the reaction to completion. Ammonium hydroxide and sodium hydroxide are preferred. The particles are isolated and washed with water. The condensation can be furthered by redispersing the particles in an aqueous acid suspension at reflux for 1-4 days. The use of hydrochloric acid is preferred. The thus-prepared freshmade hybrid cores and/or surrounding materials are filtered and washed with water and methanol free of ammonium ions, then dried.

In one embodiment, the pore structure of the as-prepared hybrid cores and/or surrounding materials is modified by hydrothermal treatment, which enlarges the openings of the pores as well as the pore diameters, as confirmed by nitrogen ($N_2$) sorption analysis. The hydrothermal treatment is performed by preparing a slurry containing the as-prepared hybrid material and a solution of a base in water, heating the slurry in an autoclave at an elevated temperature, e.g., 100 to 200° C., for a period of 10 to 30 h. The use of an alkyl amine such as trimethylamine (TEA) or Tris(hydroxymethyl) methyl amine or the use of sodium hydroxide is advantageous. The thus-treated hybrid material is cooled, filtered and washed with water and methanol, then dried at 80° C. under reduced pressure for 16 h.

In certain embodiments, following hydrothermal treatment, the surfaces of the superficially porous cores and/or the materials are modified with various agents. Such "surface modifiers" include (typically) organic functional groups which impart a certain chromatographic functionality to a chromatographic stationary phase. The porous inorganic/organic hybrid particles possess both organic groups and silanol groups which may additionally be substituted or derivatized with a surface modifier.

The surface of the hydrothermally treated hybrid cores and/or surrounding materials contains organic groups, which can be derivatized by reacting with a reagent that is reactive towards the particles' organic group. For example, vinyl groups on the particle can be reacted with a variety of olefin reactive reagents such as bromine ($Br_2$), hydrogen ($H_2$), free radicals, propagating polymer radical centers, dienes and the like. In another example, hydroxyl groups on the particle can be reacted with a variety of alcohol reactive reagents such as isocyanates, carboxylic acids, carboxylic acid chlorides and reactive organosilanes as described below. Reactions of this type are well known in the literature, see, e.g., March, J. *Advanced Organic Chemistry*, 3$^{rd}$ Edition, Wiley, New York, 1985; Odian, G. *The Principles of Polymerization*, 2$^{nd}$ Edition, Wiley, New York, 1981.

In addition, the surface of the hydrothermally treated hybrid cores and/or surrounding materials also contains silanol groups, which can be derivatized by reacting with a reactive organosilane. The surface derivatization of the superficially porous cores and/or surrounding materials is conducted according to standard methods, for example by reaction with octadecyltrichlorosilane or octadecyldimethylchlorosilane in an organic solvent under reflux conditions. An organic solvent such as toluene is typically used for this reaction. An organic base such as pyridine or imidazole is added to the reaction mixture to catalyze the reaction. The product of this reaction is then washed with water, toluene and acetone and dried at 80° C. to 100° C. under reduced pressure for 16 h. The resultant hybrid particles can be further reacted with a short-chain silane such as trimethylchlorosilane to endcap the remaining silanol groups, by using a similar procedure described above.

Surface modifiers such as disclosed herein are attached to the base material, e.g., via derivatization or coating and later crosslinking, imparting the chemical character of the surface modifier to the base material. In one embodiment, the organic groups of the superficially porous cores and/or surrounding materials react to form an organic covalent bond with a surface modifier. The modifiers can form an organic covalent bond to the particle's organic group via a number of mechanisms well known in organic and polymer chemistry including but not limited to nucleophilic, electrophilic, cycloaddition, free-radical, carbene, nitrene and carbocation reactions. Organic covalent bonds are defined to involve the formation of a covalent bond between the common elements of organic chemistry including but not limited to hydrogen, boron, carbon, nitrogen, oxygen, silicon, phosphorus, sulfur and the halogens. In addition, carbon-silicon and carbon-oxygen-silicon bonds are defined as organic covalent bonds, whereas silicon-oxygen-silicon bonds that are not defined as organic covalent bonds.

The term "functionalizing group" includes organic functional groups which impart a certain chromatographic functionality to a chromatographic stationary phase, including, e.g., octadecyl ($C_{18}$) or phenyl. Such functionalizing groups are incorporated into base material directly, or present in, e.g., surface modifiers such as disclosed herein which are attached to the base material, e.g., via derivatization or coating and later crosslinking, imparting the chemical character of the surface modifier to the base material.

In certain embodiments, silanol groups are surface modified. In other embodiments, organic groups are surface modified. In still other embodiments, the superficially porous cores' and/or surrounding materials' organic groups and silanol groups are both surface modified or derivatized. In another embodiment, the particles are surface modified by coating with a polymer. In certain embodiments, surface modification by coating with a polymer is used in conjunction with silanol group modification, organic group modification, or both silanol and organic group modification.

More generally, the surface of hybrid cores and/or surrounding materials may be modified by: treatment with surface modifiers including compounds of formula $Z_a(R')_b Si—R''$, where Z=Cl, Br, I, $C_1$-$C_5$ alkoxy, dialkylamino, e.g., dimethylamino, or trifluoromethanesulfonate; a and b are each an integer from 0 to 3 provided that a+b=3; R' is a $C_1$-$C_6$ straight, cyclic or branched alkyl group, and R'' is a functionalizing group. In certain instances, such particles have been surface modified by coating with a polymer.

R' includes, e.g., methyl, ethyl, propyl, isopropyl, butyl, t-butyl, sec-butyl, pentyl, isopentyl, hexyl or cyclohexyl; preferably, R' is methyl.

The functionalizing group R'' may include alkyl, alkenyl, alkynyl, aryl, cyano, amino, diol, nitro, ester, cation or anion exchange groups, an alkyl or aryl group containing an embedded polar functionalities or chiral moieties. Examples of suitable R'' functionalizing groups include chiral moieties, $C_1$-$C_{30}$ alkyl, including $C_1$-$C_{20}$, such as octyl ($C_8$), octadecyl ($C_{18}$) and triacontyl ($C_{30}$); alkaryl, e.g., $C_1$-$C_4$-phenyl; cyanoalkyl groups, e.g., cyanopropyl; diol groups, e.g., propyldiol; amino groups, e.g., aminopropyl; and alkyl or aryl groups with embedded polar functionalities, e.g., carbamate functionalities such as disclosed in U.S. Pat. No. 5,374,755, and chiral moieties. Such groups include those of the general formula

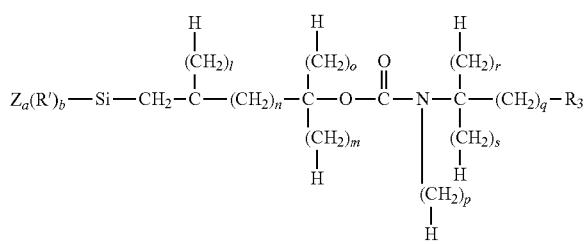

wherein l, m, o, r and s are 0 or 1, n is 0, 1, 2 or 3 p is 0, 1, 2, 3 or 4 and q is an integer from 0 to 19; $R_3$ is selected from the group consisting of hydrogen, alkyl, cyano and phenyl; and Z, R', a and b are defined as above. Preferably, the carbamate functionality has the general structure indicated below:

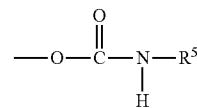

wherein $R^5$ may be, e.g., cyanoalkyl, t-butyl, butyl, octyl, dodecyl, tetradecyl, octadecyl, or benzyl. Advantageously, $R^5$ is octyl, dodecyl, or octadecyl.

In certain applications, such as chiral separations, the inclusion of a chiral moiety as a functionalizing group is particularly advantageous.

Polymer coatings are known in the literature and may be provided generally by polymerization or polycondensation of physisorbed monomers onto the surface without chemical bonding of the polymer layer to the support (type I), polymerization or polycondensation of physisorbed monomers onto the surface with chemical bonding of the polymer layer to the support (type II), immobilization of physisorbed prepolymers to the support (type III) and chemisorption of presynthesized polymers onto the surface of the support (type IV). see, e.g., Hanson, et al., *J. Chromat. A* 656 (1993) 369-380, the text of which is incorporated herein by reference. As noted above, coating the hybrid material with a polymer may be used in conjunction with various surface modifications described in the invention.

Thus, in certain embodiments, the surface modifier is selected from the group consisting of octyltrichlorosilane, octadecyltrichlorosilane, octyldimethylchlorosilane and octadecyldimethylchlorosilane. In a further embodiment, the surface modifier is selected from the group consisting of octyltrichlorosilane and octadecyltrichlorosilane.

In another embodiment, the superficially porous cores and/or surrounding materials have been surface modified by a combination of organic group and silanol group modification.

In other embodiments, the superficially porous cores and/or surrounding materials have been surface modified by a combination of organic group modification and coating with a polymer.

In other embodiments, the superficially porous cores and/or surrounding materials have been surface modified by a combination of silanol group modification and coating with a polymer.

In another embodiment, the superficially porous cores and/or surrounding materials have been surface modified via formation of an organic covalent bond between the superficially porous cores' and/or surrounding materials' organic group and the modifying reagent.

In certain embodiments, the superficially porous cores and/or surrounding materials have been surface modified by a combination of organic group modification, silanol group modification and coating with a polymer.

In one embodiment, the superficially porous cores and/or surrounding materials have been surface modified by silanol group modification.

In another embodiment, the invention provides a method wherein the superficially porous cores and/or surrounding materials are modified by further including a porogen. In a further embodiment, the porogen is selected from the group consisting of cyclohexanol, toluene, mesitylene, 2-ethylhexanoic acid, dibutylphthalate, 1-methyl-2-pyrrolidinone, 1-dodecanol and Triton X-45. In certain embodiments, the porogen is toluene or mesitylene.

In one embodiment, the invention provides a method wherein the superficially porous cores and/or surrounding materials are further modified by including a surfactant or stabilizer. In certain embodiments, the surfactant is Triton X-45, Triton X100, Triton X305, TLS, Pluronic F-87, Pluronic P-105, Pluronic P-123, sodium dodecylsulfate (SDS), ammonia docecylsulfate, TRIS docecylsulfate, or Triton X-165. In certain embodiments, the surfactant is sodium dodecylsulfate (SDS), ammonia docecylsulfate, or TRIS docecylsulfate.

In certain embodiments, the superficially porous core is subjected to a thermal treatment prior to the application of a surrounding material. In such embodiments, the core materials are thermally treated in air or in an inert atmosphere (e.g., nitrogen) at temperatures ranging from 600-1300° C., more specifically 800-1250° C., more specifically 900-1200° C.

In still other embodiments, the materials of the invention are subject to a thermal treatment after application of the surrounding material In such embodiments, the materials are thermally treated in air or in an inert atmosphere (e.g., nitrogen) at temperatures ranging from 600-1300° C., more specifically 800-1250° C., more specifically 900-1200° C. Particles can be thermally treated at these temperatures between layers of sols during superficially porous synthesis and/or on the final layer with or without the application of a surrounding material between layers or on the final layer.

Certain embodiments of the synthesis of the superficially porous cores and/or surrounding materials described above are further illustrated in the Examples below.

EXAMPLES

The present invention may be further illustrated by the following non-limiting examples describing the preparation of porous inorganic/organic hybrid particles and their use.
I. Superficially Porous Materials—General The following non-limiting examples describe superficially porous chromatographic materials in general. The cores described in these examples may or may not be superficially porous. One of ordinary skill in the art would be able to use the techniques described herein and in the superficially porous core examples below to prepare the materials of the invention.
Materials All reagents were used as received unless otherwise noted. Those skilled in the art will recognize that equivalents of the following supplies and suppliers exist and, as such, the suppliers listed below are not to be construed as limiting.
Characterization Those skilled in the art will recognize that equivalents of the following instruments and suppliers exist and, as such, the instruments listed below are not to be construed as limiting.

The % C values were measured by combustion analysis (CE-440 Elemental Analyzer; Exeter Analytical Inc., North Chelmsford, Mass.) or by Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multi-point $N_2$ sorption method (Micromeritics ASAP 2400; Micromeritics Instruments Inc., Norcross, Ga.). The SSA was calculated using the BET method, the SPV was the single point value determined for $P/P_0>0.98$ and the APD was calculated from the desorption leg of the isotherm using the BJH method. The micropore surface area (MSA) was determined as the cumulative adsorption pore diameter data for pores<34 Å subtracted from the specific surface area (SSA). The median mesopore diameter (MPD) and mesopore pore volume (MPV) were measured by mercury porosimetry (Micromeritics AutoPore IV, Micromeritics, Norcross, Ga.). Skeletal densities were measured using a Micromeritics AccuPyc 1330 Helium Pycnometer (V2.04N, Norcross, Ga.). Scanning electron microscopic (SEM) image analyses were performed (JEOL JSM-5600 instrument, Tokyo, Japan) at 7 kV. High resolution SEM image analyses were performed using a Focused Ion Beam (FIB/SEM) instrument (Helios 600 Nanolab, FEI Company, Hillsboro, Oreg.) at 20 kV. Particle sizes were measured using a Beckman Coulter Multisizer 3 analyzer (30-μm aperture, 70,000 counts; Miami, Fla.). The particle diameter (dp) was measured as the 50% cumulative diameter of the volume based particle size distribution. The width of the distribution was measured as the 90% cumulative volume diameter divided by the 10% cumulative volume diameter (denoted 90/10 ratio). Viscosity was determined for these materials using a Brookfield digital viscometer Model DV-II (Middleboro, Mass.). FT-IR spectra were obtained using a Bruker Optics Tensor 27 (Ettlingen, Germany). Multinuclear ($^{13}C$, $^{29}Si$) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}C$ and $^{29}Si$ CP-MAS NMR spectral shifts were recorded relative to tetramethylsilane using the external standards adamantane ($^{13}C$ CP-MAS NMR, δ 38.55) and hexamethylcyclotrisiloxane ($^{29}Si$ CP-MAS NMR, δ-9.62). Populations of different silicon environments were evaluated by spectral deconvolution using DMFit software. [Massiot, D.; Fayon, F.; Capron, M.; King, I.; Le Calvé, S.; Alonso, B.; Durand, J.-O.; Bujoli, B.; Gan, Z.; Hoatson, G. Magn. Reson. Chem. 2002, 40, 70-76]

Example 1

Synthesis of Polyorganosiloxanes

One or more tetraalkoxysilanes or organoalkoxysilanes (all from Gelest Inc., Morrisville, Pa. or United Chemical Technologies, INC., Bristol, Pa.) or zirconium n-propoxide (70% in propanol, Gelest Inc., Morrisville, Pa., 172.5 g solution used in reaction 1n) were mixed with ethanol (anhydrous, J. T. Baker, Phillipsburgh, N.J.) and an aqueous hydrochloric acid solution (Aldrich, Milwaukee, Wis.) in a flask. Reactions 1a-1r, 1u-1y used 0.1 N HCl, reactions 1s and 1t used 0.01 N HCl, reaction 1z used 0.1 M acetic acid (J. T. Baker). Hydroquinone (Aldrich, Milwaukee, Wis.) was also added to reaction 10 (8.4 mg) and reaction 1p (17.6 mg) to prevent polymerization of the methacryloxypropyl groups. Product 1y was prepared following a literature protocol (as described in K. Unger, et. Al. *Colloid & Polymer Science vol.* 253 pp. 658-664 (1975)). The resulting solution was agitated and refluxed for 16 hours in an atmosphere of argon or nitrogen. Alcohol was removed from the flask by distillation at atmospheric pressure. Residual alcohol and volatile species were removed by heating at 95-120° C. for 1-2 hours in a sweeping stream of argon or nitrogen. The resulting polyorganoalkoxy siloxanes were clear viscous liquids. The chemical formulas are listed in Table 1 for the organoalkoxysilanes used to make the product polyorganoalkoxysiloxanes (POS). Specific amounts are listed in Table 2 for the starting materials used to prepare products 1a-1x. Structural analysis was performed using NMR spectroscopy.

TABLE 1

| Product | Chemical Formula A | Chemical Formula B | Chemical Formula C | Mol Ratio A:B:C |
|---|---|---|---|---|
| 1a | $CH_2=C(CH_3)CO_2(CH_2)_3Si(OCH_3)_3$ | $Si(OCH_2CH_3)_4$ | — | 1:5:0 |
| 1b | $(CH_3CH_2O)_3Si(CH_2)_2Si(OCH_2CH_3)_3$ | $Si(OCH_2CH_3)_4$ | — | 3:1:0 |
| 1c | $(CH_3CH_2O)_3Si(CH_2)_2Si(OCH_2CH_3)_3$ | $Si(OCH_2CH_3)_4$ | — | 1:4:0 |
| 1d | $CH_3Si(OCH_2CH_3)_3$ | $Si(OCH_2CH_3)_4$ | — | 1:2:0 |
| 1e | $(CH_3CH_2O)_3Si(CH_2)_2Si(OCH_2CH_3)_3$ | $CH_3(CH_2)_{17}Si(OCH_3)_3$ | — | 20:1:0 |
| 1f | $(CH_3CH_2O)_3Si(CH_2)_2Si(OCH_2CH_3)_3$ | — | — | 1:0:0 |
| 1g | $(CH_3CH_2O)_3Si(CH_2)_2Si(OCH_2CH_3)_3$ | $CH_3(CN)CH(CH_2)_2Si(OCH_2CH_3)_3$ | — | 10:1 |
| 1h | $(CH_3CH_2O)_3Si(CH_2)_2Si(OCH_2CH_3)_3$ | $(CH_3CH_2)_2Si(OCH_2CH_3)_2$ | — | 10:1 |
| 1i | $(CH_3CH_2O)_3Si(CH_2)_2Si(OCH_2CH_3)_3$ | $CH_2=CHC(O)N[(CH_2)_3Si(OCH_3)]_2$ | — | 20:1 |
| 1j | $(CH_3CH_2O)_3Si(CH_2)_2Si(OCH_2CH_3)_3$ | $CF_3(CF_2)_5(CH_2)_2Si(OCH_2CH_3)_3$ | — | 10:1 |
| 1k | $(CH_3CH_2O)_3Si(CH_2)_2Si(OCH_2CH_3)_3$ | $Si(OCH_2CH_3)_4$ | $CH_2=C(CH_3)CO_2(CH_2)_3Si(OCH_3)_3$ | 0.3:2.4:0.7 |
| 1l | $(CH_3CH_2O)_3Si(CH_2)_2Si(OCH_2CH_3)_3$ | $Si(OCH_2CH_3)_4$ | $(CH_3)_3COC(O)NH(CH_2)_3Si(OCH_2CH_3)_3$ | 0.3:2.7:0.7 |
| 1m | $(CH_3CH_2O)_3Si(CH_2)_2Si(OCH_2CH_3)_3$ | $Si(OCH_2CH_3)_4$ | $C_6H_5(CH_2)_2Si(OCH_3)_3$ | 0.3:2.4:0.7 |
| 1n | $(CH_3CH_2O)_3Si(CH_2)_2Si(OCH_2CH_3)_3$ | $Si(OCH_2CH_3)_4$ | $Zr(O(CH_2)_2CH_3)_4$ | 1:3:0.2 |
| 1o | $CH_2=C(CH_3)CO_2(CH_2)_3Si(OCH_3)_3$ | — | — | 1:0:0 |
| 1p | $Si(OCH_2CH_3)_4$ | $CH_2=C(CH_3)CO_2(CH_2)_3Si(OCH_3)_3$ | — | 1:1:0 |
| 1q | $Si(OCH_2CH_3)_4$ | $(CH_3)_3COC(O)NH(CH_2)_3Si(OCH_2CH_3)_3$ | — | 1:1:0 |
| 1r | $(CH_3)_3COC(O)NH(CH_2)_3Si(OCH_2CH_3)_3$ | — | — | 1:0:0 |
| 1s | $Si(OCH_2CH_3)_4$ | $CH_3CO_2(CH_2)_3Si(OCH_3)_3$ | — | 1:1:0 |
| 1t | $CH_3CO_2(CH_2)_3Si(OCH_3)_3$ | — | — | 1:0:0 |
| 1u | $Si(OCH_2CH_3)_4$ | $C_6F_5Si(OCH_2CH_3)_3$ | — | 5:1:0 |
| 1v | $Si(OCH_2CH_3)_4$ | $CH_3(CH_2)_3Si(OCH_3)_3$ | — | 1:1:0 |
| 1w | $CH_3(CH_2)_3Si(OCH_3)_3$ | — | — | 1:0:0 |
| 1x | $Si(OCH_2CH_3)_4$ | $(CH_3CH_2)_2Si(OCH_2CH_3)_2$ | — | 1:1:0 |
| 1y | $Si(OCH_2CH_3)_4$ | — | — | 1:0:0 |
| 1z | $CH_3CO_2(CH_2)_3Si(OCH_3)_3$ | — | — | 1:0:0 |

TABLE 2

| Product | Component A (g) | Component B (g) | Component C (g) | Acid Solution (g) | Ethanol (g) | % C | Viscosity (cP) |
|---|---|---|---|---|---|---|---|
| 1a | 62 | 260 | 0 | 35 | 218 | 35.5 | 40 |
| 1b | 399 | 78 | 0 | 41 | 218 | 36.9 | 50 |
| 1c | 106 | 250 | 0 | 40 | 218 | 31.6 | 84 |
| 1d | 534 | 1248 | 0 | 203 | 450 | 31.1 | 36 |
| 1e | 507 | 27 | 0 | 44 | 179 | 39.8 | 83 |
| 1f | 519 | 0 | 0 | 134 | 653 | 34.7 | 70 |
| 1g | 484 | 34 | 0 | 31 | 179 | 37.0 | 63 |
| 1h | 484 | 24 | 0 | 42 | 218 | 36.5 | 53 |
| 1i | 507 | 28 | 0 | 45 | 218 | 38.5 | 200 |
| 1j | 338 | 49 | 0 | 30 | 125 | 35.9 | 74 |
| 1k | 47 | 221 | 77 | 37 | 218 | 36.2 | 64 |
| 1l | 43 | 228 | 91 | 34 | 218 | 37.4 | 77 |
| 1m | 47 | 229 | 70 | 37 | 218 | 39.8 | 45 |
| 1n | 654 | 1,152 | 121 | 204 | 921 | 31.9 | 67 |
| 1o | 373 | 0 | 0 | 22 | 218 | 49.1 | 21 |
| 1p | 156 | 186 | 0 | 26 | 218 | 44.2 | 19 |
| 1q | 156 | 241 | 0 | 26 | 218 | 42.7 | 256 |
| 1r | 482 | 0 | 0 | 22 | 218 | 48.8 | 701 |
| 1s | 156 | 167 | 0 | 26 | 218 | 38.7 | 34 |
| 1t | 333 | 0 | 0 | 22 | 218 | 42.4 | 104 |
| 1u | 149 | 47 | 0 | 16 | 125 | 35.6 | 12 |
| 1v | 156 | 133 | 0 | 26 | 218 | 43.5 | 6 |
| 1w | 267 | 0 | 0 | 22 | 218 | 48.1 | 9 |
| 1x | 156 | 132 | 0 | 22 | 218 | 40.9 | 7 |
| 1z | 667 | 0 | 0 | 46 | 357 | 42.3 | 104 |

Example 2

Hybrid Inorganic/Organic Material Surrounding of Hybrid Particles

To a suspension of 5 μm BEH porous hybrid particles (20 g, Waters Corporation, Milford, Mass.; 6.5% C; SSA=190 m$^2$/g; SPV=0.80 cm$^3$/g; APD=155 Å) of the formula (O$_{1.5}$SiCH$_2$CH$_2$SiO$_{1.5}$)(SiO$_2$)$_4$ (prepared following the method described in U.S. Pat. No. 6,686,035) in ethanol (anhydrous, J. T. Baker, Phillipsburgh, N.J.; 5 ml/g) was added POS 1a from Example 1. The solvent was slowly removed under reduced pressure in a rotary evaporator for 0.5-4 hours. The particles were isolated on 0.5 μm filtration paper and washed repeatedly using ethanol (anhydrous, J. T. Baker, Phillipsburgh, N.J.). The material was then heated 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 20 hours. The reaction was then cooled and the product was filtered and washed successively with water and methanol (J. T. Baker, Phillipsburgh, N.J.). The product was then dried at 80° C. under reduced pressure for 16 hours. Specific amounts of starting materials used to prepare these products are listed in Table 3. The % C values, specific surface areas (SSA), specific pore volumes (SPV) and average pore diameters (APD) of these materials are listed in Table 3.

TABLE 3

| Product | POS (g) | Evaporation Time (h) | % C | SSA (m$^2$/g) | SPV (cm$^3$/g) | APD (Å) |
|---|---|---|---|---|---|---|
| 2a | 1.54 | 0.5 | 6.65 | 191 | 0.80 | 153 |
| 2b | 16.42 | 1 | 6.61 | 187 | 0.66 | 141 |
| 2c | 56.19 | 4 | 7.05 | 190 | 0.80 | 154 |

Example 3

Hybrid Inorganic/Organic Material Surrounding of Hybrid Particles

To a suspension of 5 μm BEH porous hybrid particles (20 g, Waters Corporation, Milford, Mass.; 6.5% C; SSA=190 m$^2$/g; SPV=0.80 cm$^3$/g; APD=155 Å) of the formula (O$_{1.5}$SiCH$_2$CH$_2$SiO$_{1.5}$)(SiO$_2$)$_4$ (prepared following the method described in U.S. Pat. No. 6,686,035) in dry toluene (Fisher Scientific, Fairlawn, N.J.; 5 ml/g) was added POS 1a from Example 1 and water. This reaction was heated at 80° C. for one hour and 110° C. for 20 hours using a Dean-Stark trap to remove residual water. The reaction was cooled to room temperature and particles were isolated on 0.5 μm filtration paper and washed repeatedly using ethanol (anhydrous, J. T. Baker, Phillipsburgh, N.J.). The material was then heated to 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. Specific amounts of starting materials used to prepare these products are listed in Table 4. The % C values, specific surface areas (SSA), specific pore volumes (SPV), average pore diameters (APD), and changes in SPV (ΔSPV) are listed in Table 4.

The increase in carbon content (1.0-1.8% C) and reduction in SPV (0.10 cm$^3$/g average change) were observed by this approach. SEM analysis indicated equivalent particle morphology and surface features of the starting particles. Particle size analysis (by Coulter Counter) indicated equivalent particle size and distribution of the starting particles. This suggests the decreased porosity of this Material Surrounding process is due to a filling of the porous particle framework, and is not due to the introduction of surface debris or a secondary nonporous particle distribution. The reduction in APD also indicates that this Material Surrounding process is filling the pore framework. The slight increase in SSA may indicate the surrounding material has a small degree of porosity.

TABLE 4

| Product | Particles (g) | POS (g) | Water (mL) | % C | SSA (m$^2$/g) | SPV (cm$^3$/g) | APD (Å) | ΔSPV (cm$^3$/g) |
|---|---|---|---|---|---|---|---|---|
| 3a | 20 | 16.42 | 0.4 | 7.67 | 199 | 0.68 | 137 | −0.12 |
| 3b | 20 | 16.42 | 0.8 | 7.71 | 198 | 0.68 | 137 | −0.12 |
| 3c | 7.0 | 7.92 | 0.0 | 8.06 | 217 | 0.66 | 124 | −0.14 |
| 3d | 7.0 | 7.92 | 0.2 | 7.50 | 194 | 0.67 | 137 | −0.13 |
| 3e | 7.0 | 7.92 | 0.4 | 8.25 | 229 | 0.61 | 118 | −0.19 |

Example 4

Hybrid Inorganic/Organic Material Surrounding of Hybrid Particles

To a suspension of 3.5 μm BEH porous hybrid particles (Waters Corporation, Milford, Mass.; 6.5% C; SSA=185 m$^2$/g; SPV=0.76 cm$^3$/g; APD=146 Å) of the formula (O$_{1.5}$SiCH$_2$CH$_2$SiO$_{1.5}$)(SiO$_2$)$_4$ (prepared following the method described in U.S. Pat. No. 6,686,035) in dry toluene (Fisher Scientific, Fairlawn, N.J.; 5 ml/g for 4a-4b; 10 ml/g for 4e-4i) was added POS 1a from Example 1 and water. This reaction was heated at 80° C. for one hour and 110° C. for 20 hours. Reactions 4a and 4c did not employ the use of a Dean-Stark trap to remove residual water; while the other reactions used of a Dean-Stark trap. The reaction was cooled to room temperature and particles were isolated on 0.5 μm filtration paper and washed repeatedly using ethanol (anhydrous, J. T. Baker, Phillipsburgh, N.J.). The material was then heated 50° C. in a suspension with ethanol (3 ml/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. Specific amounts of starting materials used to prepare these products are listed in Table 5. The % C values, specific surface areas (SSA), specific pore volumes (SPV), average pore diameters (APD) and changes in SPV ($\Delta$SSA) are listed in Table 5.

Increases in carbon content (1.0-2.6% C) and reductions in SPV (0.12-0.44 cm³/g) were achieved by this Material Surrounding approach. SEM analysis confirmed equivalent particle morphology and surface features of the starting particles. Particle size analysis (by Coulter Counter) indicated equivalent particle size and distribution of the starting particles. This suggests the decreased porosity of this Material Surrounding process is due to a filling of the porous particle framework, and is not due to the introduction of surface debris or a secondary nonporous particle distribution.

TABLE 5

| Product | Particles (g) | POS (g) | Water (mL) | % C | SSA (m²/g) | SPV (cm³/g) | APD (Å) | $\Delta$SPV (cm³/g) |
|---|---|---|---|---|---|---|---|---|
| 4a | 20 | 32.84 | 1.6 | 7.70 | 201 | 0.58 | 119 | −0.18 |
| 4b | 20 | 32.84 | 1.6 | 7.62 | 199 | 0.60 | 123 | −0.16 |
| 4c | 20 | 56.19 | 2.8 | 8.44 | 178 | 0.41 | 100 | −0.35 |
| 4d | 20 | 56.19 | 2.8 | 8.06 | 183 | 0.50 | 114 | −0.26 |
| 4e | 20 | 100 | 5.0 | 8.92 | 209 | 0.32 | 76 | −0.44 |
| 4f | 20 | 50 | 2.5 | 9.11 | 208 | 0.32 | 77 | −0.44 |
| 4g | 20 | 16.42 | 0.8 | 7.525 | 193 | 0.64 | 133 | −0.12 |
| 4h | 50 | 41.05 | 0.8 | 7.49 | 200 | 0.64 | 131 | −0.12 |

Example 5

Hydrothermal Processing of Hybrid Surrounded Hybrid Particles

As a means to modify the pore structure of surrounded hybrid particles, particles from Examples 3 and 4 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the product was were isolated on 0.5 μm filtration paper and washed with water and methanol (Fisher Scientific, Suwanee, Ga.). The particles were then dried at 80° C. under vacuum for 16 hours. Specific characterization data for these materials are listed in Table 6. Changes in product % C ($\Delta$% C), SSA ($\Delta$SSA) and APD ($\Delta$APD), relative to the precursor material from Examples 3 and 4, are listed in Table 6.

This set of experiments showed that hydrothermal processing of surrounded hybrid particles could be used to modify the pore attributes of these materials. All products had noticeable reductions in SSA, increases in APD and no significant changes in SPV or particle morphology (as determined by SEM), when compared with the precursor materials from Examples 3 and 4. It was concluded that the use of hydrothermal treatment was successful in increasing the APD. The APD for these products was within a range that is comparable with commercially available HPLC packing materials. Reductions in % C for these products are due in part to a removal of surface alkoxides and the partial hydrolysis of the methacryloxypropyl group of the surrounding material. This hydrolysis results in the formation of a hydroxypropyl group (e.g., $HO(CH_2)_3SiO_{1.5}$), as confirmed by NMR and FT-IR spectroscopy.

TABLE 6

| Product | Precursor | % C | SSA (m²/g) | SPV (cm³/g) | APD (Å) | $\Delta$ % C | $\Delta$SSA (m²/g) | $\Delta$APD (Å) |
|---|---|---|---|---|---|---|---|---|
| 5a | 3a, 3b | 6.77 | 158 | 0.69 | 153 | −0.92 | −41 | 16 |
| 5b | 4a | 6.95 | 158 | 0.61 | 140 | −0.75 | −43 | 21 |
| 5c | 4b | 6.96 | 159 | 0.63 | 142 | −0.66 | −40 | 19 |
| 5d | 4c | 6.95 | 129 | 0.46 | 125 | −1.49 | −49 | 25 |
| 5e | 4d | 6.94 | 143 | 0.54 | 132 | −1.12 | −40 | 18 |

TABLE 6-continued

| Product | Precursor | % C | SSA (m²/g) | SPV (cm³/g) | APD (Å) | Δ % C | ΔSSA (m²/g) | ΔAPD (Å) |
|---|---|---|---|---|---|---|---|---|
| 5f | 4e | 6.86 | 116 | 0.36 | 113 | −2.06 | −93 | 37 |
| 5g | 4f | 7.01 | 119 | 0.37 | 112 | −2.10 | −89 | 35 |
| 5h | 4g | 6.98 | 160 | 0.66 | 145 | −0.55 | −33 | 12 |
| 5i | 4h | 7.21 | 157 | 0.66 | 148 | −0.28 | −43 | 17 |

Example 6

Secondary Hybrid Inorganic/Organic Material Surrounding of Hybrid Particles

To a suspension of porous hybrid particles from Example 5 in dry toluene (Fisher Scientific, Fairlawn, N.J.; 10 mL/g) was added POS 1a from Example 1 and water. This reaction was heated at 80° C. for one hour and 110° C. for 20 hours using a Dean-Stark trap to remove residual water. The reaction was cooled to room temperature and particles were isolated on 0.5 μm filtration paper and washed repeatedly using ethanol (anhydrous, J. T. Baker, Phillipsburgh, N.J.). The material was then heated to 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. Specific amounts of starting materials used to prepare these products are listed in Table 7. The % C values, specific surface areas (SSA), specific pore volumes (SPV), average pore diameters (APD), and changes in SPV (ΔSPV) are listed in Table 7.

This set of experiments showed that repeated Material Surrounding can be used to further change the pore properties of these materials. Increases in carbon content (0.7% C) and reduction in SPV (0.13 cm³/g) were achieved with this Material Surrounding approach. Comparing these products with the unmodified BEH particle used in Example 3 and 4, we observe a larger increase in carbon content (1.00-1.36% C) and a decrease in SPV (0.23-0.24 cm³/g) have been achieved by this iterative process. SEM analysis confirmed equivalent particle morphology and surface features of the precursor materials.

TABLE 7

| Product | Precursor | Particles (g) | POS (g) | Water (mL) | % C | SSA (m²/g) | SPV (cm³/g) | APD (Å) | ΔSPV (cm³/g) |
|---|---|---|---|---|---|---|---|---|---|
| 6a | 5a | 15 | 16.42 | 0.8 | 7.50 | 175 | 0.56 | 129 | −0.13 |
| 6b | 5i | 20 | 16.42 | 8 | 7.86 | 172 | 0.53 | 120 | −0.13 |

Example 7

Hydrothermal Processing of Hybrid Inorganic/Organic Surrounded Hybrid Particles Hybrid particles from Examples 6 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the products were isolated on 0.5 μm filtration paper and washed with water and methanol (Fisher Scientific, Suwanee, Ga.). The particles were then dried at 80° C. under vacuum for 16 hours. Specific characterization data for these materials are listed in Table 8. Changes in product % C (Δ% C), SSA (ΔSSA) and APD (ΔAPD), relative to the precursor material from Example 6, are listed in Table 8.

This set of experiments showed that hydrothermal processing of repeated surrounded hybrid particles could be used reduce the SSA, increase APD and have no significant changes in SPV or particle morphology (as determined by SEM), when compared with the precursor materials. Reductions in % C for these products are due in part to a removal of surface alkoxides of the precursor materials and the partial hydrolysis of the methacryloxypropyl group of the surrounding material. This hydrolysis results in the formation of a hydroxypropyl group (e.g., $HO(CH_2)_3SiO_{1.5}$), as confirmed by NMR and FT-IR spectroscopy.

(7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. The % C values, specific surface areas (SSA), specific pore volumes (SPV) and average pore diameters (APD) of these materials are listed in Table 9. Changes in product % C (Δ% C), and SPV (ΔSPV) are listed in Table 9.

This set of experiments showed that a variety of different POS can be used to create hybrid surrounded materials. This series of surrounded materials differ in hydrophobicity and surface activity. For example, the octadecyl groups of surrounded product 8d and partially fluorinated groups of surrounded product 8i may result in increased hydrophobicity over the unmodified BEH particles. The zirconium containing product 8m may display increased surface activity, which may be beneficial for some chromatographic separations. The hydrophobic and strong electron withdrawing nature of the perfluorophenyl containing surrounded product 8t may display both increased hydrophobicity and modified surface silanol activity. As shown with product 8b, the use of a POS with the formula $(O_{1.5}SiCH_2CH_2SiO_{1.5})$ $(SiO_2)_4$ resulted in hybrid surrounded particles that have the same chemical composition as the unmodified particles, allowing for changes only in particle pore properties.

Carbon content varied due to the composition of the surrounding material. For example, product 8b showed no change in carbon content. This was expected since the surrounding material and the base particle have the same chemical composition. The surrounding material of product

TABLE 8

| Product | Precursor | % C | SSA (m²/g) | SPV (cm³/g) | APD (Å) | Δ % C | ΔSSA (m²/g) | ΔAPD (Å) |
|---|---|---|---|---|---|---|---|---|
| 7a | 6a | 6.93 | 146 | 0.58 | 144 | −0.57 | −29 | 15 |
| 7b | 6b | 7.35 | 142 | 0.54 | 138 | −0.51 | −30 | 18 |

Example 8

Hybrid Inorganic/Organic Material Surrounding of Hybrid Particles

To a suspension of 3.0-3.5 μm BEH porous hybrid particles (20 g, Waters Corporation, Milford, Mass.; 6.5% C; SSA=185-191 m²/g; SPV=0.76-0.82 cm³/g; APD=146-153 Å) of the formula $(O_{1.5}SiCH_2CH_2SiO_{1.5})(SiO_2)_4$ (prepared following the method described in U.S. Pat. No. 6,686,035) in toluene (Fisher Scientific, Fairlawn, N.J.; 10 mL/g) was added a POS from Example 1 (16.42 g) and deionized water (0.8 mL). Reactions 8u, 8v and 8ad used a 4.8 μm BEH porous particle. Reactions 8p and 8q used 8.2 mL of deionized water. Reactions 8s and 8t were performed at a two-fold increased scale, reactions 8w and 8x at ten-fold increased scale, and reaction 8y at 25-fold increased scale. Hydroquinone (30 ppm, Aldrich, Milwaukee, Wis.) was added to reactions 8n and 8o to prevent polymerization of the methacryloxypropyl group. Reactions were heated at 80° C. for one hour and 110° C. for 20 hours using a Dean-Stark trap to remove residual water. The reaction was cooled to room temperature and particles were isolated on 0.5 μm filtration paper and washed repeatedly using ethanol (anhydrous, J. T. Baker, Phillipsburgh, N.J.). The material was then heated 50° C. in a suspension with ethanol (3 mL/g, anhydrous, J. T. Baker, Phillipsburgh, N.J.), deionized water 8t, which has a lower carbon content than the BEH material, resulted in a reduction in carbon content of the surrounded product. Products 8u-8y were repeat experiments aimed at determining the reproducibility of this process at increased reaction scale. These products have good reproducibility, having relative standard deviations less than 4.5% for % C, SSA, SPV, and APD data.

Reductions in SPV (−0.04 to −0.25 cm³/g) were also achieved by this Material Surrounding approach. SEM analysis confirmed equivalent particle morphology and surface features of the starting particles. Particle size analysis (by Coulter Counter) indicated equivalent particle size and distribution to that of the starting particles.

TABLE 9

| Product | POS | % C | SSA (m²/g) | SPV (cm³/g) | APD (Å) | Δ % C | ΔSPV (cm³/g) |
|---|---|---|---|---|---|---|---|
| 8a | 1b | 7.54 | 220 | 0.62 | 129 | 1.03 | −0.14 |
| 8b | 1c | 6.51 | 197 | 0.63 | 138 | 0.00 | −0.13 |
| 8c | 1d | 6.44 | 179 | 0.67 | 142 | −0.07 | −0.09 |
| 8d | 1e | 7.46 | 205 | 0.68 | 143 | 0.95 | −0.08 |
| 8e | 1f | 7.36 | 210 | 0.67 | 136 | 0.85 | −0.09 |
| 8f | 1g | 6.96 | 191 | 0.72 | 145 | 0.45 | −0.04 |
| 8g | 1h | 7.18 | 203 | 0.69 | 143 | 0.67 | −0.07 |
| 8h | 1i | 7.91 | 226 | 0.65 | 121 | 1.40 | −0.11 |
| 8i | 1j | 7.21 | 203 | 0.69 | 145 | 0.70 | −0.07 |
| 8j | 1k | 7.63 | 194 | 0.63 | 131 | 1.12 | −0.13 |

TABLE 9-continued

| Product | POS | % C | SSA (m²/g) | SPV (cm³/g) | APD (Å) | Δ % C | ΔSPV (cm³/g) |
|---|---|---|---|---|---|---|---|
| 8k | 1l | 8.67 | 183 | 0.51 | 108 | 2.16 | −0.25 |
| 8l | 1m | 7.42 | 197 | 0.67 | 136 | 0.91 | −0.09 |
| 8m | 1n | 6.70 | 267 | 0.54 | 86 | 0.19 | −0.22 |
| 8n | 1o | 9.65 | 179 | 0.67 | 135 | 3.13 | −0.15 |
| 8o | 1p | 8.46 | 188 | 0.68 | 138 | 1.94 | −0.14 |
| 8p | 1q | 10.78 | 157 | 0.53 | 125 | 4.26 | −0.25 |
| 8q | 1r | 11.06 | 150 | 0.60 | 130 | 4.54 | −0.18 |
| 8r | 1s | 8.08 | 178 | 0.65 | 138 | 1.56 | −0.13 |
| 8s | 1t | 9.08 | 174 | 0.66 | 139 | 2.56 | −0.12 |
| 8t | 1u | 6.22 | 189 | 0.71 | 149 | −0.30 | −0.07 |
| 8u | 1t | 8.92 | 173 | 0.65 | 135 | 2.02 | −0.14 |
| 8v | 1t | 8.93 | 174 | 0.65 | 135 | 2.03 | −0.14 |
| 8w | 1t | 9.01 | 171 | 0.60 | 128 | 2.36 | −0.12 |
| 8x | 1t | 9.03 | 172 | 0.60 | 129 | 2.25 | −0.12 |
| 8y | 1t | 8.97 | 175 | 0.61 | 129 | 2.43 | −0.11 |
| 8z | 1z | 9.08 | 171 | 0.60 | 126 | 2.54 | −0.12 |
| 8aa | 1z | 8.90 | 170 | 0.64 | 138 | 1.69 | −0.12 |
| 8ab | 1z | 8.83 | 172 | 0.65 | 136 | 1.62 | −0.11 |
| 8ac | 1z | 8.82 | 167 | 0.62 | 137 | 2.13 | −0.13 |
| 8ad | 1z | 8.90 | 166 | 0.62 | 134 | 2.09 | −0.12 |

Example 9

Hydrothermal Processing of Hybrid Coated Hybrid Particles

Hybrid particles from Examples 8 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the product was isolated on 0.5 μm filtration paper and washed with water and methanol (Fisher Scientific, Suwanee, Ga.). The particles were then dried at 80° C. under vacuum for 16 hours. Specific characterization data for these materials are listed in Table 10.

This set of experiments showed that hydrothermal processing of surrounded hybrid particles could be used reduce the SSA, increase APD and have no significant changes in SPV or particle morphology (as determined by SEM), when compared with the precursor materials. While most modifications in % C were small (<0.35% C), larger reductions in % C for some of these products are due in part to a removal of surface alkoxides of the precursor materials and chemical modification of some of specific organofunctional groups of the surrounding material. For example, the partial ester hydrolysis for products 9j, 9n, 9o, 9r and 9s results in the formation of a hydroxypropyl group (e.g., $HO(CH_2)_3SiO_{1.5}$). The deprotection of the tert-butoxycarbonyl group for products 9k, 9p and 9q results in the formation of an aminopropyl gre.g.,e.g., $NH_2(CH_2)_3SiO_{1.5}$), as confirmed by NMR spectroscopy.

The modifications in pore structure obtained by hydrothermal treatment of an surrounded hybrid particle can be observed in the nitrogen desorption data (BJH dV/dlog(D) pore volume data). As shown in FIG. 1 for the Material Surrounding and hydrothermal treatment products 8b and 9b, respectively, noticeable changes in mean pore diameter are obtained by this process. The width of the pores size distribution decreased relative to the unmodified BEH hybrid particles as a result of this process. Repeat experiments, products 9u-9y, demonstrate good reproducibility with relative standard deviations for % C, SSA, SPV, and APD less than 4.5%.

TABLE 10

| Product | Precursor | % C | SSA (m²/g) | SPV (cm³/g) | APD (Å) | Δ % C | ΔSSA (m²/g) | ΔAPD (Å) |
|---|---|---|---|---|---|---|---|---|
| 9a | 8a | 7.30 | 145 | 0.64 | 158 | −0.24 | −75 | 29 |
| 9b | 8b | 6.40 | 125 | 0.64 | 180 | −0.11 | −72 | 42 |
| 9c | 8c | 6.37 | 142 | 0.67 | 164 | −0.07 | −37 | 22 |
| 9d | 8d | 7.29 | 147 | 0.67 | 163 | −0.17 | −58 | 20 |
| 9e | 8e | 7.20 | 148 | 0.66 | 162 | −0.16 | −62 | 26 |
| 9f | 8f | 6.82 | 155 | 0.71 | 167 | −0.14 | −36 | 22 |
| 9g | 8g | 7.08 | 150 | 0.69 | 163 | −0.10 | −53 | 20 |
| 9h | 8h | 7.76 | 156 | 0.64 | 145 | −0.15 | −70 | 24 |
| 9i | 8i | 7.23 | 151 | 0.69 | 165 | 0.02 | −52 | 20 |
| 9j | 8j | 7.15 | 157 | 0.65 | 149 | −0.48 | −37 | 18 |
| 9k | 8k | 7.13 | 122 | 0.57 | 158 | −1.54 | −61 | 50 |
| 9l | 8l | 7.14 | 156 | 0.67 | 154 | −0.28 | −41 | 18 |
| 9m | 8m | 6.88 | 152 | 0.54 | 129 | 0.18 | −115 | 43 |
| 9n | 8n | 8.14 | 176 | 0.71 | 144 | −1.52 | −3 | 9 |
| 9o | 8o | 7.48 | 170 | 0.7 | 149 | −0.98 | −18 | 11 |
| 9p | 8p | 7.94 | 142 | 0.63 | 155 | −2.84 | −15 | 30 |
| 9q | 8q | 8.43 | 149 | 0.68 | 163 | −2.64 | −1 | 33 |
| 9r | 8r | 7.83 | 162 | 0.67 | 147 | −0.25 | −16 | 9 |
| 9s | 8s | 8.52 | 161 | 0.67 | 145 | −0.56 | −13 | 6 |
| 9t | 8t | 6.05 | 134 | 0.71 | 189 | −0.17 | −55 | 40 |
| 9u | 8u | 8.53 | 165 | 0.67 | 140 | −0.39 | −8 | 5 |
| 9v | 8v | 8.63 | 164 | 0.66 | 140 | −0.30 | −10 | 5 |
| 9w | 8w | 8.61 | 164 | 0.62 | 134 | −0.40 | −7 | 6 |
| 9x | 8x | 8.54 | 162 | 0.62 | 133 | −0.49 | −10 | 4 |
| 9y | 8y | 8.59 | 161 | 0.61 | 134 | −0.38 | −14 | 5 |
| 9z | 8z | 8.63 | 165 | 0.62 | 133 | −0.45 | −6 | 7 |
| 9aa | 8aa | 8.42 | 160 | 0.66 | 141 | −0.48 | −10 | 3 |
| 9ab | 8ab | 8.51 | 162 | 0.66 | 141 | −0.32 | −10 | 5 |
| 9ac | 8ac | 8.36 | 159 | 0.65 | 142 | −0.46 | −8 | 5 |
| 9ad | 8ad | 8.44 | 162 | 0.65 | 140 | −0.46 | −4 | 6 |

Example 10

Silica Based Material Surrounding of Hybrid Particles

To a suspension of 3.5 μm BEH porous hybrid particles (Waters Corporation, Milford, Mass.; 6.5% C; SSA=185 m$^2$/g; SPV=0.76 cm$^3$/g; APD=146 Å) of the formula $(O_{1.5}SiCH_2CH_2SiO_{1.5})(SiO_2)_4$ (prepared following the method described in U.S. Pat. No. 6,686,035) in dry toluene (Fisher Scientific, Fairlawn, N.J.; 10 mL/g) was added POS 1y from Example 1 and deionized water. This reaction was heated at 80° C. for one hour and 110° C. for 20 hours using a Dean-Stark trap to remove residual water. The reaction was cooled to room temperature and particles were isolated on 0.5 μm filtration paper and washed repeatedly using ethanol (anhydrous, J. T. Baker, Phillipsburgh, N.J.). The material was then heated 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. Specific amounts of starting materials used to prepare these products are listed in Table 11. The % C values, specific surface areas (SSA), specific pore volumes (SPV) and average pore diameters (APD) of these materials are listed in Table 11. Changes in product % C (Δ% C) and SPV (ΔSPV) are listed in Table 11.

This set of experiments showed that a tetraalkoxysilane-based POS can be used to create silica surrounded hybrid materials. This may allow for modification of particle surface properties (e.g., silanol activity and hydrophilicity). Carbon content, SSA, SPV and APD decreased as a result of silica Material Surrounding of these hybrid materials, which is due to the lack of carbon in the surrounding material (e.g., $SiO_2$). SEM analysis confirmed equivalent particle morphology and surface features of the starting particles. Particle size analysis (by Coulter Counter) indicated equivalent particle size and distribution of the starting particles.

TABLE 11

| Product | Particles (g) | POS (g) | Water (mL) | % C | SSA (m$^2$/g) | SPV (cm$^3$/g) | APD (Å) | Δ % C | ΔSPV (cm$^3$/g) |
|---|---|---|---|---|---|---|---|---|---|
| 10a | 50 | 41.05 | 2.1 | 6.29 | 173 | 0.63 | 140 | −0.23 | −0.13 |
| 10b | 20 | 16.42 | 0.8 | 5.94 | 182 | 0.64 | 141 | −0.57 | −0.12 |

Example 11

Hydrothermal Processing of Silica Coated Hybrid Particles

Hybrid particles from Example 10 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the product was isolated on 0.5 μm filtration paper and washed with water and methanol (Fisher Scientific, Suwanee, Ga.). The particles were then dried at 80° C. under vacuum for 16 hours. Specific characterization data for these materials are listed in Table 12.

This set of experiments showed that hydrothermal processing of silica surrounded hybrid particles could be used reduce the SSA, increase APD and have no significant changes in % C, SPV or particle morphology (as determined by SEM) when compared with the precursor materials.

TABLE 12

| Product | Precursor | % C | SSA (m$^2$/g) | SPV (cm$^3$/g) | APD (Å) | ΔSSA (m$^2$/g) | ΔAPD (Å) |
|---|---|---|---|---|---|---|---|
| 11a | 10a | 6.01 | 123 | 0.64 | 184 | −50 | 44 |
| 11b | 10b | 5.80 | 129 | 0.65 | 178 | −53 | 37 |

Example 12

Addition of Nanoparticles to Polyorganosiloxanes

Diamond nanoparticles (Nanostructured & Amorphous Materials, Inc, Houston, Tex., 4-25 nm) or silicon carbide nanoparticles (Sigma-Aldrich, Saint Louis, Mo., <100 nm) were added to POS 1c in Example 1 to yield a 0.1-0.2 wt % dispersion. Dispersion was achieved using a rotor/stator mixer (Mega Sheer, Charles Ross & Son Co., Hauppauge, N.Y.). Products were then centrifuged (Thermo EXD, 4×1 L bottle centrifuge, Milford, Mass.) to reduce agglomerates. Specific amounts are listed in Table 13 for the starting materials used to prepare these products.

TABLE 13

| Product | POS 1c (Kg) | Nanoparticle Type | Nanoparticle Mass (g) |
|---|---|---|---|
| 12a | 9.08 | Diamond | 18.60 |
| 12b | 9.08 | Silicon Carbide | 7.57 |

Example 13

Nanoparticle Hybrid Composite Material Surrounding of Hybrid Particles

To a suspension of 3.5 μm BEH porous hybrid particles (20 g, Waters Corporation, Milford, Mass.; 6.5% C; SSA=185 m$^2$/g; SPV=0.76 cm$^3$/g; APD=146 Å) of the formula $(O_{1.5}SiCH_2CH_2SiO_{1.5})(SiO_2)_4$ (prepared following the method described in U.S. Pat. No. 6,686,035) in toluene (Fisher Scientific, Fairlawn, N.J.; 10 mL/g) was added a POS from Example 12 (16.42 g) and deionized water (0.8 g). This reaction was heated at 80° C. for one hour and 110° C. for 20 hours using a Dean-Stark trap to remove residual water. The reaction was cooled to room temperature and particles were isolated on 0.5 μm filtration paper and washed repeatedly using ethanol (anhydrous, J. T. Baker, Phillipsburgh, N.J.). The material was then heated to 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. The % C values, specific surface areas (SSA), specific pore volumes (SPV), average pore diameters (APD) and changes in SPV (ΔSPV) of these materials are listed in Table 14.

This set of experiments showed that a nanoparticle containing POS can be used to create composite surrounding materials. This may allow for modification of particle properties (e.g., surface acidity, thermal and mechanical properties). A reduction in SPV (0.11 cm$^3$/g) was achieved by this composite Material Surrounding approach. SEM analysis confirmed equivalent particle morphology and surface features to that of the starting particles. Particle size analysis (by Coulter Counter) indicated equivalent particle size and distribution of the starting particles. This suggests the decreased porosity of this Material Surrounding process is due to a filling of the porous particle framework, and is not due to the introduction of surface debris or secondary nonporous particles.

TABLE 14

| Product | Particles (g) | POS | Water (mL) | % C | SSA (m$^2$/g) | SPV (cm$^3$/g) | APD (Å) | ΔSPV (cm$^3$/g) |
|---|---|---|---|---|---|---|---|---|
| 13a | 20 | 12a | 0.8 | 6.42 | 199 | 0.65 | 137 | −0.11 |
| 13b | 20 | 12b | 0.8 | 6.47 | 204 | 0.65 | 136 | −0.11 |

Example 14

Hydrothermal Processing of Nanoparticle Hybrid Composite Surrounded Hybrid Particles Hybrid particles from Examples 13b were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the product was isolated on 0.5 µm filtration paper and washed with water and methanol (Fisher Scientific, Suwanee, Ga.). The particles were then dried at 80° C. under vacuum for 16 hours. The resulting product 14a had 6.49% C, a specific surface area (SSA) of 132 m$^2$/g, a specific pore volume of 0.64 cm$^3$/g, and an average pore diameter (APD) of 167 Å. Hydrothermal processing of a composite surrounded hybrid material reduced SSA and increased APD without having a significant changes in SPV or particle morphology (as determined by SEM) when compared with the precursor materials.

Example 15

Hybrid Inorganic/Organic Material Surrounding of Wider Pore Hybrid Particles

To a suspension of wider pore BEH porous hybrid particles of the formula (O$_{1.5}$SiCH$_2$CH$_2$SiO$_{1.5}$)(SiO$_2$)$_4$ (prepared following the method described in U.S. Pat. No. 6,686,035) denoted Type A (3.5 µm; 6.3% C; SSA=38 m$^2$/g; SPV=0.67 cm$^3$/g; APD=600 Å; MPV=0.67 cm$^3$/g; MPD=513 Å), Type B (3.5 µm; 6.6% C; SSA=83 m$^2$/g; SPV=0.65 cm$^3$/g; APD=287 Å; MPV=0.61 cm$^3$/g; MPD=243 Å), or Type C (5 µm; 6.44% C; SSA=95-100 m$^2$/g; SPV=0.81-0.83 cm$^3$/g; APD=289-324 Å; MPV=0.77-0.83 cm$^3$/g; MPD=252-265 Å) in toluene (Fisher Scientific, Fairlawn, N.J.; 10 mL/g) was added a POS from Example 1 and deionized water. Reactions were heated at 80° C. for one hour and 110° C. for 20 hours. For reactions 15a and 15b a Dean-Stark trap was used to remove residual water. The reaction was cooled to room temperature and particles were isolated on 0.5 µm filtration paper and washed repeatedly using ethanol (anhydrous, J. T. Baker, Phillipsburgh, N.J.). The material was then heated 50° C. in a suspension with ethanol (3 ml/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. The % C values and specific surface areas (SSA) of these materials are listed in Table 15. The median mesopore diameter (MPD) and mesopore pore volume (MPV), measured by Mercury Porosimetry are listed in Table 15. Changes in product SPV (ΔSPV) and MPV (ΔMPV), relative to the unmodified hybrid particles, are listed in Table 15.

This set of experiments showed that a hybrid POS can be used to create surrounded wider pore diameter hybrid materials. This may allow for modification of particle surface properties, and mechanical properties. A reduction in pore volume may allow for improvements in mechanical strength of the porous network. Reduction in MPV (0.06-0.16 cm$^3$/g) were achieved by this composite Material Surrounding approach. SEM analysis confirmed equivalent particle morphology and surface features of the starting particles. Particle size analysis (by Coulter Counter) indicated equivalent particle size and distribution to that of the starting particles.

TABLE 15

| Product | Particle Type | Particles (g) | POS | POS mass (g) | Water (g) | % C | SSA (m$^2$/g) | SPV (cm$^3$/g) | APD (Å) | ΔSPV (cc/g) | MPV (cm$^3$/g) | MPD (Å) | ΔMPV (cc/g) |
|---|---|---|---|---|---|---|---|---|---|---|---|---|---|
| 15a | A | 20 | 1c | 16.4 | 0.82 | 6.29 | 54 | 0.30 | 251 | −0.37 | 0.60 | 459 | −0.07 |
| 15b | B | 20 | 1c | 16.4 | 0.82 | 6.53 | 98 | 0.58 | 260 | −0.03 | 0.55 | 226 | −0.06 |
| 15c | C | 10 | 1c | 50.0 | 5.0 | 6.40 | 126 | 0.72 | 272 | −0.11 | 0.68 | 227 | −0.15 |

TABLE 15-continued

| Product | Particle Type | Particles (g) | POS | POS mass (g) | Water (g) | % C | SSA ($m^2/g$) | SPV ($cm^3/g$) | APD (Å) | ΔSPV (cc/g) | MPV ($cm^3/g$) | MPD (Å) | ΔMPV (cc/g) |
|---|---|---|---|---|---|---|---|---|---|---|---|---|---|
| 15d | C | 10 | 1c | 50.0 | 5.0 | 6.42 | 120 | 0.70 | 291 | −0.13 | 0.67 | 231 | −0.16 |
| 15e | C | 10 | 1c | 50.0 | 2.5 | 6.48 | 114 | 0.72 | 276 | −0.11 | 0.68 | 231 | −0.15 |
| 15f | C | 10 | 1c | 50.0 | 0.4 | 6.63 | 116 | 0.79 | 303 | −0.07 | 0.73 | 239 | −0.10 |
| 15g | C | 10 | 1c | 50.0 | 0.4 | 6.48 | 111 | 0.75 | 301 | −0.08 | 0.76 | 238 | −0.07 |
| 15h | C | 10 | 1c | 8.2 | 5.0 | 6.48 | 117 | 0.72 | 295 | −0.11 | 0.69 | 234 | −0.14 |
| 15i | C | 10 | 1c | 8.2 | 2.5 | 6.66 | 114 | 0.76 | 303 | −0.07 | 0.71 | 242 | −0.12 |
| 15j | C | 20 | 1v | 16.4 | 0.82 | 6.96 | 103 | 0.76 | 296 | −0.03 | 0.73 | 235 | −0.04 |
| 15k | C | 20 | 1w | 16.4 | 0.82 | 8.02 | 95 | 0.74 | 301 | −0.07 | 0.73 | 233 | −0.04 |

Example 16

Hydrothermal Processing of Hybrid Surrounding Material with Wider Pore Particles Hybrid particles from Examples 15 were mixed with an aqueous solution of 0.3 M tris(hydroxymethyl)aminomethane (TRIS, Aldrich Chemical, Milwaukee, Wis.) at a slurry concentration of 5 mL/g. The pH of the resultant slurry was adjusted to 9.8 using acetic acid (J. T. Baker, Phillipsburgh, N.J.). The slurry was then enclosed in a stainless steel autoclave and heated to 155° C. for 20 hours. After cooling the autoclave to room temperature, the product was isolated on 0.5 μm filtration paper and washed with water and methanol (Fisher Scientific, Suwanee, Ga.). The particles were then dried at 80° C. under vacuum for 16 hours. Specific characterization data for these materials are listed in Table 16. Hydrothermal processing of a surrounding material with wider pore hybrid material reduced SSA and increased MPD without a significant changes in % C or particle morphology (as determined by SEM) when compared with the precursor materials. A high resolution SEM of product 16a indicates that a highly porous pore network is maintained by this process.

TABLE 16

| Product | Precursor | % C | SSA ($m^2/g$) | SPV ($cm^3/g$) | APD (Å) | ΔSSA ($m^2/g$) | MPV ($cm^3/g$) | MPD (Å) |
|---|---|---|---|---|---|---|---|---|
| 16a | 15a | 6.27 | 37 | 0.27 | 290 | −17 | 0.59 | 500 |
| 16b | 15b | 6.55 | 73 | 0.58 | 293 | −25 | 0.55 | 250 |
| 16c | 15j | 6.93 | 90 | 0.76 | 307 | −13 | 0.72 | 230 |
| 16d | 15k | 8.04 | 94 | 0.75 | 302 | −1 | 0.73 | 237 |
| 16e | 15c, 15d, 15e, 15h | 6.42 | 80 | 0.72 | 315 | −39 | 0.70 | 254 |

Example 17

Acid Treatment of Hybrid Particles with Surrounding Material

Porous particles prepared according to Examples 5, 9 and 11 were dispersed in a 1 molar hydrochloric acid solution (Aldrich, Milwaukee, Wis.) for 20 h at 98° C. The particles were isolated on 0.5 μm filtration paper and washed with water to a neutral pH, followed by acetone (HPLC grade, Fisher Scientific, Fairlawn, N.J.). The particles were dried at 80° C. under vacuum for 16 h. Specific characterization data for these materials are listed in Table 17.

While no significant changes in SSA, SPV or APD occurred with respect to the precursor materials, there are noticeable reductions in SSA (reduced 13-63 $m^2/g$) and SPV (reduced 0.05-0.23 cm3/g) with respect to the unmodified BEH hybrid particles.

With the exception of product 17k and 17l, no significant changes in % C occurred with respect to the precursor materials. The loss in % C for these two products (reduced 0.41-0.75% C) may have resulted in deprotection of remaining tert-butoxycarbonyl groups, resulting in the formation of an aminopropyl group (e.g., $NH_2(CH_2)_3SiO_{1.5}$). Changes in % C, with respect to the unmodified BEH hybrid increased or decreased due to the chemical formula of the surrounding material. The micropore surface area (MSA) for these materials are all within the requirement for chromatographic material having chromatographically enhanced pore geometry. Repeat experiments, products 17t-17x, demonstrate good reproducibility with relative standard deviations for % C, SSA, SPV, and APD less than 5%.

TABLE 17

| Product | Precursor | $dp_{50}$ vol % (μm) | 90/10 ratio | % C | SSA ($m^2/g$) | SPV ($cm^3/g$) | APD (Å) | MSA ($m^2/g$) |
|---|---|---|---|---|---|---|---|---|
| 17a | 5a | 4.79 | 1.49 | 6.84 | 160 | 0.69 | 149 | 19 |
| 17b | 5h, 5i | 3.72 | 1.48 | 7.16 | 161 | 0.66 | 144 | 24 |
| 17c | 9d | 3.47 | 1.46 | 7.30 | 149 | 0.67 | 159 | 23 |
| 17d | 9e | 3.49 | 1.46 | 7.28 | 149 | 0.67 | 156 | 25 |
| 17e | 9i | 3.45 | 1.46 | 7.23 | 152 | 0.69 | 160 | 26 |
| 17f | 9j | 3.53 | 1.46 | 7.23 | 160 | 0.69 | 147 | 21 |
| 17g | 9k | 3.55 | 1.46 | 7.48 | 122 | 0.59 | 154 | 20 |
| 17h | 9m | 3.63 | 1.50 | 6.90 | 153 | 0.53 | 131 | 25 |
| 17i | 9n | 3.45 | 1.58 | 8.08 | 178 | 0.71 | 144 | 20 |
| 17j | 9o | 3.51 | 1.54 | 7.49 | 170 | 0.70 | 150 | 22 |
| 17k | 9p | 3.45 | 1.64 | 7.53 | 147 | 0.66 | 157 | 15 |
| 17l | 9q | 3.36 | 1.61 | 7.68 | 156 | 0.73 | 166 | 18 |
| 17m | 9r | 3.45 | 1.62 | 7.80 | 161 | 0.67 | 147 | 17 |
| 17n | 9s | 3.43 | 1.61 | 8.50 | 163 | 0.68 | 146 | 13 |
| 17o | 9t | 3.31 | 1.61 | 6.31 | 136 | 0.72 | 191 | 24 |
| 17p | 11a | 3.47 | 1.46 | 6.08 | 122 | 0.63 | 180 | 28 |
| 17q | 16c | 4.74 | 1.47 | 6.97 | 91 | 0.77 | 307 | 17 |

TABLE 17-continued

| Product | Precursor | dp$_{50}$ vol % (μm) | 90/10 ratio | % C | SSA (m²/g) | SPV (cm³/g) | APD (Å) | MSA (m²/g) |
|---|---|---|---|---|---|---|---|---|
| 17r | 16d | 4.73 | 1.51 | 7.98 | 94 | 0.75 | 297 | 20 |
| 17s | 16e | 4.52 | 1.63 | 6.38 | 81 | 0.71 | 316 | 23 |
| 17t | 9u | 4.91 | 1.59 | 8.53 | 165 | 0.67 | 140 | 12 |
| 17u | 9v | 4.89 | 1.61 | 8.63 | 164 | 0.66 | 140 | 12 |
| 17v | 9w | 2.99 | 1.56 | 8.49 | 162 | 0.62 | 133 | 9 |
| 17w | 9x | 2.98 | 1.55 | 8.53 | 162 | 0.62 | 135 | 10 |
| 17x | | 2.99 | 1.54 | 8.49 | 161 | 0.61 | 134 | 13 |
| 17y | 16b | 3.31 | 1.54 | 6.46 | 73 | 0.55 | 178 | 18 |
| 17z | 9z | 2.97 | 1.54 | 8.55 | 163 | 0.62 | 134 | 14 |
| 17aa | 9aa | 3.53 | 1.64 | 8.36 | 162 | 0.66 | 143 | 12 |
| 17ab | 9ab | 3.55 | 1.64 | 8.27 | 162 | 0.66 | 144 | 13 |
| 17ac | 9ac | 3.95 | 1.42 | 8.31 | 159 | 0.65 | 143 | 12 |
| 17ad | 9ad | 4.84 | 1.60 | 8.35 | 154 | 0.64 | 140 | 8 |

Example 18

Reaction of Hybrid Particles with a Surrounding Material with Isocyanates

Hydroxypropyl containing Hybrid particles with a surrounding material from Example 17 were modified with octadecyl isocyanate (ODIC, Aldrich Chemical), dodecyl isocyanate (DIC, Aldrich Chemical), pentafluorophenyl isocyanate (PFPIC, Aldrich Chemical), 1-adamantly isocyanate (AIC, Aldrich Chemical), 4-cyanophenyl isocyanate (4CPIC, Aldrich Chemical), 3-cyanophenyl isocyanate (3CPIC, Aldrich Chemical), 4-biphenylyl isocyanate (BPIC, Aldrich Chemical), 2,2-Diphenylethyl isocyanate (DPEIC, Aldrich Chemical), 3,5-dimethoxyphenyl isocyanate (DMPIC, Aldrich Chemical), 4-iodophenyl isocyanate (IPIC, Aldrich Chemical), 4-(chloromethyl)phenyl isocyanate (CMPIC, Aldrich Chemical), methyl (S)-(−)-2-isocyanato-3-phenylpropionate (MIP, Aldrich, Milwaukee, Wis.), phenyl isocyanate (PIC, Aldrich Chemical), benzyl isocyanate (BIC, Aldrich Chemical), or phenethyl isocyanate (PEIC, Aldrich Chemical) in dry toluene (5 mL/g, J. T. Baker) under an argon blanket. The suspension was heated to reflux (110° C.) for 16 h and then cooled to <30° C. Product 18 g was prepared in refluxing xylenes (30 ml/g, J. T. Baker). The particles were transferred to a filter apparatus and washed exhaustively with toluene and acetone. The material was then heated for an hour at 50° C. in a 1:1 v/v mixture of acetone and 1% trifluoroacetic acid (Aldrich, Milwaukee, Wis.) solution (10 mL/g particles, Hydrolysis type A), or in a 60:40 v/v mixture of acetone and 100 mM ammonium bicarbonate (pH 8, Aldrich, Milwaukee, Wis.) for 20 hours (Hydrolysis type B), or in a 60:40 v/v mixture of acetone and 100 mM ammonium bicarbonate (pH 10, Aldrich, Milwaukee, Wis.) for 20 hours (Hydrolysis type C). Product 18r was heated for 1 hour. The reaction was then cooled and the product was filtered and washed successively with acetone and toluene (heated at 70° C.). The product was then dried at 70° C. under reduced pressure for 16 hours. Reaction data is listed in Table 18. The surface coverage of carbamate groups was determined by the difference in particle % C before and after the surface modification as measured by elemental analysis.

TABLE 18

| Product | Precursor | Particles (g) | Isocyanate | Isocyanate mass (g) | Hydrolysis | % C | Carbamate Surface Coverage (μmol/m²) |
|---|---|---|---|---|---|---|---|
| 18a | 17b | 10 | DIC | 3.5 | A | 8.36 | 0.59 |
| 18b | 17b | 10 | MIP | 3.3 | A | 8.36 | 0.65 |
| 18c | 17i | 10 | DIC | 5.0 | A | 11.82 | 1.76 |
| 18d | 17j | 5.4 | DIC | 2.5 | A | 10.47 | 1.44 |
| 18e | 17m | 9.5 | DIC | 4.8 | A | 12.49 | 2.48 |
| 18f | 17n | 10 | DIC | 10.0 | A | 14.53 | 3.27 |
| 18g | 17t, 17u | 12 | DIC | 6.7 | A | 14.10 | 2.96 |
| 18h | 17v | 50 | DIC | 25 | A | 14.53 | 3.29 |
| 18i | 17v | 50 | ODIC | 25 | A | 15.41 | 2.34 |
| 18j | 17w | 110 | ODIC | 52.7 | A | 15.39 | 2.32 |
| 18k | 17x | 20 | ODIC | 9.52 | A | 15.16 | 2.26 |
| 18l | 17v | 10 | PFPIC | 3.4 | A | 11.99 | 3.66 |
| 18m | 17w | 15 | PFPIC | 5.05 | A | 12.08 | 3.79 |
| 18n | 17x | 30 | PFPIC | 10.10 | A | 12.16 | 3.89 |
| 18o | 17x | 20 | AIC | 5.71 | A | 10.96 | 1.36 |
| 18p | 17x | 20 | 4CPIC | 4.64 | A | 13.08 | 3.69 |
| 18q | 17x | 20 | BPIC | 6.29 | A | 16.64 | 4.09 |
| 18r | 17x | 10 | ODIC | 4.76 | B | 15.59 | 2.42 |
| 18s | 17x | 10 | ODIC | 4.76 | B | 15.64 | 2.44 |
| 18t | 17x | 20 | DPEIC | 7.19 | A | 14.87 | 2.70 |
| 18u | 17x | 20 | DMPIC | 5.77 | A | 13.38 | 3.61 |
| 18v | 17x | 20 | IPIC | 7.89 | A | 11.70 | 3.60 |
| 18w | 17x | 20 | CMPIC | 5.40 | A | 12.63 | 3.43 |
| 18x | 17ab | 20 | DIC | 6.85 | C | 13.56 | 2.83 |
| 18y | 17z | 6 | ODIC | 1.44 | B | 12.31 | 1.20 |
| 18z | 17z | 6 | ODIC | 2.31 | B | 13.57 | 1.64 |
| 18aa | 17aa | 20 | ODIC | 2.59 | B | 11.94 | 1.15 |
| 18ab | 17aa | 15 | ODIC | 2.73 | C | 13.12 | 1.63 |
| 18ac | 17aa | 15 | ODIC | 5.46 | C | 14.61 | 2.20 |
| 18ad | 17ac | 25 | 4CPIC | 1.95 | C | 11.73 | 2.66 |
| 18ae | 17z | 30 | 4CPIC | 7.05 | A | 13.08 | 3.60 |
| 18af | 17ad | 60 | 3CPIC | 4.59 | C | 12.03 | 3.03 |
| 18ag | 17z | 30 | 3CPIC | 7.05 | A | 13.09 | 3.61 |
| 18ah | 17z | 20 | PIC | 3.88 | C | 12.42 | 3.43 |
| 18ai | 17aa | 20 | PEIC | 4.77 | C | 11.92 | 2.43 |
| 18aj | 17aa | 20 | BIC | 4.31 | C | 12.62 | 3.32 |

TABLE 18-continued

| Product | Precursor | Particles (g) | Isocyanate | Isocyanate mass (g) | Hydrolysis | % C | Carbamate Surface Coverage (µmol/m²) |
|---|---|---|---|---|---|---|---|
| 18ak | 17aa | 12 | DPEIC | 4.34 | C | 14.05 | 2.36 |
| 18al | 17z | 10 | PFPIC | 3.41 | B | 11.89 | 3.46 |
| 18am | 17z | 10 | PFPIC | 1.16 | B | 11.68 | 3.22 |
| 18an | 17z | 15 | PFPIC | 1.37 | B | 11.29 | 2.78 |
| 18ao | 17z | 10 | PFPIC | 1.16 | B | 11.53 | 3.05 |
| 18ap | 17z | 10 | PFPIC | 0.92 | B | 11.34 | 2.84 |

Example 19

Secondary Surface Modification of Hybrid Particles with a Surrounding Material with Isocyanates The material of Example 18 were further modified with octadecyl isocyanate (ODIC, Aldrich Chemical), t-butyl isocyanate (TBIC, Aldrich Chemical), or n-butyl isocyanate (NBIC, Aldrich Chemical) in dry toluene (5 mL/g, J. T. Baker) under similar reaction conditions as Example 18. Reaction data is listed in Table 19. The additional surface coverage of carbamate groups was determined by the difference in particle % C before and after the surface modification as measured by elemental analysis.

TABLE 19

| Product | Precursor | Precursor Carbamate Surface Coverage (µmol/m²) | Particles (g) | Isocyanate | Isocyanate mass (g) | % C | Additional Carbamate Surface Coverage (µmol/m²) |
|---|---|---|---|---|---|---|---|
| 19a | 18h | 3.29 | 24 | TBIC | 3.85 | 14.52 | none determined |
| 19b | 18h | 3.29 | 24 | NBIC | 3.85 | 14.77 | 0.36 |
| 19c | 18i | 2.34 | 24 | ODIC | 11.5 | 16.56 | 0.44 |
| 19d | 18j | 2.34 | 10 | PFPIC | 3.39 | 16.30 | 1.25 |

Example 20

Modification of Hybrid Particles with a Surrounding Material with Chlorosilanes The materials of Example 18 and 19 were further modified with either trimethylchlorosilane (TMCS, Gelest Inc., Morrisville, Pa.), triethylchlorosilane (TECS, Gelest Inc., Morrisville, Pa.), triisopropylchlorosilane (TIPCS, Gelest Inc., Morrisville, Pa.), thexyldimethylchlorosilane (TDMCS, Gelest Inc., Morrisville, Pa.), tert-butyldimethylchlorosilane (TBDMCS, Gelest Inc., Morrisville, Pa.), 1-(tert-Butyldimethylsilyl)imidazole (TBDMSI, TCI America), or tert-butyldiphenylchlorosilane (TBDPCS, Gelest Inc., Morrisville, Pa.) using imidazole (Aldrich, Milwaukee, Wis.) in refluxing toluene (5 mL/g) for 4 hours. The reaction was then cooled and the product was filtered and washed successively with water, toluene, 1:1 v/v acetone/water and acetone (all solvents from J. T. Baker) and then dried at 80° C. under reduced pressure for 16 hours. Product 20f was performed for 20 hours. Products 20f, 20i, 20j, 20k, and 20l underwent a subsequent reaction with TMCS under similar reaction conditions. Reaction data are listed in Table 20.

TABLE 20

| Product | Precursor | Particles (g) | Silane | Silane (g) | Imidazole (g) | % C |
|---|---|---|---|---|---|---|
| 20a | 18a | 9.3 | TMCS | 1.75 | 1.32 | 9.67 |
| 20b | 18b | 9.4 | TMCS | 1.65 | 1.24 | 9.57 |
| 20c | 18c | 8.5 | TMCS | 1.65 | 1.24 | 12.95 |
| 20d | 18e | 7.1 | TMCS | 1.24 | 0.93 | 13.44 |
| 20e | 18f | 17.3 | TMCS | 3.06 | 2.30 | 15.29 |
| 20f | 18g | 9.5 | TBDMCS | 2.36 | 1.28 | 14.78 |
| 20g | 18i | 21 | TMCS | 4.22 | 3.18 | 16.42 |
| 20h | 18j | 20 | TMCS | 3.52 | 2.65 | 16.24 |
| 20i | 18j | 20 | TECS | 4.88 | 2.37 | 16.24 |
| 20j | 18j | 20 | TBDMCS | 4.88 | 2.37 | 16.68 |
| 20k | 18j | 20 | TIPCS | 6.25 | 2.21 | 16.67 |
| 20l | 18j | 20 | TDMCS | 5.77 | 1.89 | 16.87 |
| 20m | 18k | 19 | TMCS | 3.32 | 2.50 | 16.22 |
| 20n | 18l | 9.5 | TMCS | 1.67 | 1.26 | 12.26 |
| 20o | 18m | 13.7 | TMCS | 2.40 | 1.80 | 12.35 |
| 20p | 18n | 15 | TMCS | 2.62 | 1.97 | 12.21 |
| 20q | 18o | 15.5 | TMCS | 2.71 | 2.04 | 12.35 |
| 20r | 18p | 17.9 | TMCS | 3.13 | 2.35 | 13.62 |
| 20s | 18q | 20.0 | TMCS | 3.50 | 2.63 | 20.53 |
| 20t | 19a | 21 | TMCS | 3.70 | 2.78 | 1527 |
| 20u | 19b | 21 | TMCS | 3.70 | 2.78 | 15.38 |
| 20v | 19c | 9.3 | TMCS | 1.64 | 1.23 | 17.28 |
| 20w | 19d | 6.9 | TMCS | 1.21 | 0.91 | 16.51 |
| 20x | 18r | 6.3 | TMCS | 0.83 | 1.10 | 16.40 |
| 20y | 18s | 6.2 | TMCS | 1.08 | 0.82 | 16.52 |
| 20z | 18t | 16.9 | TMCS | 2.96 | 2.22 | 15.60 |
| 20aa | 18u | 18.9 | TMCS | 3.31 | 2.49 | 13.86 |
| 20ab | 18aa | 19.0 | TMCS | 3.34 | 2.51 | 13.20 |
| 20ac | 18ae | 15.0 | TBDMCS | 3.70 | 2.00 | 13.64 |
| 20ad | 18ae | 14.0 | TBDMCS | 4.16 | 1.86 | 13.03 |
| 20ae | 18ag | 15.0 | TBDMCS | 3.69 | 2.00 | 13.61 |
| 20af | 18ag | 15.0 | TBDMSI | 4.46 | 2.00 | 13.32 |
| 20ag | 18ah | 17.4 | TMCS | 3.08 | 2.32 | 13.14 |
| 20ah | 18aj | 10.0 | TBDPCS | 4.45 | 1.32 | 13.48 |
| 20ai | 18al | 8.0 | TDMCS | 2.33 | 1.07 | 12.41 |

Example 21

Initial Surface Modification of Hybrid Particles with a Surrounding Material with Chlorosilanes Samples from Example 17 were modified with octadecyltrichlorosilane (OTCS, Aldrich, Milwaukee, Wis.) or octadecyldimethylchlorosilane (ODMCS, Gelest Inc., Morrisville, Pa.) using imidazole (Aldrich, Milwaukee, Wis.) in refluxing toluene (HPLC grade, Fisher Scientific, Fairlawn, N.J.) for 4 hours. The reaction was then cooled and the product was filtered and washed successively with toluene, 1:1 v/v acetone/water and acetone (all solvents from J. T. Baker). For product 21a, the material was then refluxed in an acetone/aqueous 0.12 M ammonium acetate solution (Sigma Chemical Co., St. Louis, Mo.) for 2 hours. The reaction was then cooled and the product was filtered and washed successively with toluene, 1:1 v/v acetone/water and acetone (all solvents from J. T. Baker). The product was then dried at 80° C. under reduced pressure for 16 hours. Reaction data is listed in Table 21. The surface coverage of $C_{18}$-groups was determined by the difference in particle % C before and after the surface modification as measured by elemental analysis.

TABLE 21

| Product | Precursor | Particles (g) | Silane | Silane (g) | Imidazole (g) | Toluene (mL) | % C | Coverage ($\mu mol/m^2$) |
|---|---|---|---|---|---|---|---|---|
| 21a | 17p | 15 | OTCS | 2.84 | 1.00 | 75 | 12.93 | 3.18 |
| 21b | 17o | 17 | ODMCS | 8.97 | 1.89 | 85 | 14.74 | 3.19 |
| 21c | 17ad | 20 | TBDPCS | 8.47 | 2.52 | 200 | 13.77 | 2.21 |

Example 22

Secondary Surface Modification of Hybrid Particles with a Surrounding Material with Chlorosilanes The surface of the $C_{18}$-bonded hybrid material of Example 21a (14 g) was further modified with triethylchlorosilane (2.76 g, TECS, Gelest Inc., Morrisville, Pa.) using imidazole (1.50 g, Aldrich, Milwaukee, Wis.) in refluxing toluene (75 mL) for 4 hours. The reaction was then cooled and the product was filtered and washed successively with water, toluene, 1:1 v/v acetone/water and acetone (all solvents from J. T. Baker) and then dried at 80° C. under reduced pressure for 16 hours. The materials were then mixed with hexamethyldisilazane (HMDS, Gelest Inc., Morrisville, Pa.) yielding a slurry (concentration 1.1 g HMDS per 1.0 g particles). The resultant slurry was then enclosed in a stainless steel autoclave and heated at 200° C. for 18 hours. After the autoclave cooled to room temperature the product was isolated on filtration paper and washed successively with water, toluene, 1:1 v/v acetone/water and acetone (all solvents from J. T. Baker) and then dried at 80° C. under reduced pressure for 16 hours. The product (22a) had 14.04% C.

Example 23

Secondary Surface Modification of Hybrid Particles with a Surrounding Material with Chlorosilanes The surface of the hybrid particle with a surrounding material from Examples 17 and 21 were modified with trimethylchlorosilane (TMCS, Gelest Inc., Morrisville, Pa.) using imidazole (Aldrich, Milwaukee, Wis.) in refluxing toluene for 4 hours. The reaction was then cooled and the product was filtered and washed successively with water, toluene, 1:1 v/v acetone/water and acetone (all solvents from J. T. Baker) and then dried at 80° C. under reduced pressure for 16 hours. Reaction data are listed in Table 22.

TABLE 22

| Product | Precursor | Particles (g) | TMCS (g) | Imidazole (g) | Toluene (mL) | % C |
|---|---|---|---|---|---|---|
| 23a | 17o | 12 | 1.77 | 1.33 | 60 | 7.65 |
| 23b | 21b | 14 | 2.07 | 1.56 | 70 | 14.81 |

Example 24

Sub-1 μm Particle Containing Hybrid Inorganic/Organic Material Surrounding of Hybrid Particles To a suspension of 3.5 μm BEH porous hybrid particles (20 g, Waters Corporation, Milford, Mass.; 6.5% C; SSA=188 $m^2/g$; SPV=0.78 $cm^3/g$; APD=150 Å) of the formula $(O_{1.5}SiCH_2CH_2SiO_{1.5})(SiO_2)_4$ (prepared following the method described in U.S. Pat. No. 6,686,035) in toluene (Fisher Scientific, Fairlawn, N.J.; 10 mL/g) was added a dispersion of <0.5 μm BEH porous hybrid particles within POS 1c from Example 1, and water (0.82 mL). The dispersion of <0.5 μm BEH porous hybrid particles (particle size determined by SEM) within POS 1c was achieved for examples 24a and 24b by stirring overnight. The dispersion for example 24c required initial dilution in ethanol, followed by vacuum distillation of ethanol. This Material Surrounding reaction was heated at 80° C. for one hour and 110° C. for 20 hours. The reaction was cooled to room temperature and particles were isolated on 0.5 μm filtration paper and washed repeatedly using ethanol (anhydrous, J. T. Baker, Phillipsburgh, N.J.). The material was then heated to 50° C. in a suspension with ethanol (3 mL/g, anhydrous, J. T. Baker, Phillipsburgh, N.J.), deionized water (7 mL/g) and 30% ammonium hydroxide (20 g; J. T. Baker, Phillipsburgh, N.J.) for 4 hours. The reaction was then cooled and the product was filtered and washed successively with water and methanol (Fisher Scientific, Fairlawn, N.J.). The product was then dried at 80° C. under reduced pressure for 16 hours. Specific amounts of starting materials used to prepare these products are listed in Table 23. The % C values, specific surface areas (SSA), specific pore volumes (SPV), average pore diameters (APD) and change in SPV (ΔSPV) of these materials are listed in Table 23. SEM analysis indicated the presence of surface<0.5 μm particulates on the 3.5 μm particles.

TABLE 23

| Product | Particle Additive Size (μm) | Particle Additive Mass (g) | POS (g) | % C | SSA (m²/g) | SPV (cm³/g) | APD (Å) | ΔSPV (cm³/g) |
|---|---|---|---|---|---|---|---|---|
| 24a | 0.17 | 0.5 | 16.42 | 6.68 | 207 | 0.65 | 138 | −0.13 |
| 24b | 0.30 | 0.5 | 16.42 | 6.63 | 196 | 0.65 | 139 | −0.13 |
| 24c | 0.17 | 5.0 | 16.42 | 6.66 | 208 | 0.64 | 136 | −0.14 |

Example 25

Acetoxypropyl Bondings on Hybrid Particles

To a suspension of BEH porous hybrid particles (Type A, Waters Corporation, Milford, Mass.; 6.5% C; SSA=190 m²/g; SPV=0.80 cm³/g; APD=155 Å) or 3 μm wider pore BEH porous particles (Type B, Waters Corporation, Milford, Mass.; 6.5% C; SSA=88 m²/g; SPV=0.68 cm³/g; APD=285 Å) of the formula $(O_{1.5}SiCH_2CH_2SiO_{1.5})(SiO_2)_4$ (prepared following the method described in U.S. Pat. No. 6,686,035) in toluene (HPLC grade, Fisher Scientific, Fairlawn, N.J.) were modified with 3-acetoxypropyltrichlorosilane (ATPTCS, Silar Laboratories, Scotia, N.Y.) and imidazole (Aldrich, Milwaukee, Wis.) and deionized water in refluxing toluene (HPLC grade, Fisher Scientific, Fairlawn, N.J.) for 20 hours. Reaction 25a used 5 μm particles, and Reactions 25g and 25h used 3.5 μm particles. The reaction was then cooled and the material was filtered and washed successively with toluene, 1:1 v/v acetone/water and acetone (all solvents from Fisher Scientific, Fairlawn, N.J.). The material was then refluxed in an acetone/aqueous 0.12 M ammonium acetate solution (Sigma Chemical Co., St. Louis, Mo.) for 2 hours. The reaction was then cooled and the product was filtered and washed successively with toluene, 1:1 v/v acetone/water and acetone (all solvents from J. T. Baker). The product was then dried at 80° C. under reduced pressure for 16 hours. The material was then dispersed in a 1 molar hydrochloric acid solution (Aldrich, Milwaukee, Wis.) for 20 h at 98-100° C. to yield hydroxypropyl groups (e.g., $HO(CH_2)_3SiO_{1.5}$), as confirmed by NMR spectroscopy. The particles were isolated on 0.5 μm filtration paper and washed with water to a neutral pH, followed by acetone (HPLC grade, Fisher Scientific, Fairlawn, N.J.). The particles were dried at 80° C. under vacuum for 16 h. Reaction data is listed in Table 24. Product 25h was also hydrothermally treated following the procedure in Experiment 9, and was acid treated following the procedure in Experiment 17. The surface coverage of hydroxypropyl groups was determined by the difference in particle % C before and after the surface modification as measured by elemental analysis.

Example 26

Reaction of Bonded Hybrid Particles with Isocyanates

Particles from Example 25a (20 g) were modified with octadecyl isocyanate (9.99 g, Aldrich Chemical) in dry toluene (100 mL, Fisher Scientific, Fairlawn, N.J.) under an argon blanket. The suspension was heated to reflux (110° C.) for 16 h and then cooled to <30° C. The particles were transferred to a filter apparatus and washed exhaustively with toluene and acetone. The material was then heated for an hour at 50° C. in a 1:1 v/v mixture of acetone and 1% trifluoroacetic acid (Aldrich, Milwaukee, Wis.) solution (100 mL). The reaction was then cooled and the product was filtered and washed successively with acetone and toluene (heated at 70° C.). The material was then dried at 70° C. under reduced pressure for 16 hours. The carbon content of this material was 13.32% C, and the surface coverage of carbamate groups was 1.73 μmol/m², determined by the difference in % C before and after the surface modification as measured by elemental analysis. The surface of these particles were modified with trimethylchlorosilane (TMCS, Gelest Inc., Morrisville, Pa.) using imidazole (Aldrich, Milwaukee, Wis.) in refluxing toluene for 4 hours. The reaction was then cooled and the product was filtered and washed successively with water, toluene, 1:1 v/v acetone/water and acetone (all solvents from J. T. Baker) and then dried at 80° C. under reduced pressure for 16 hours. The final carbon content of the product (26a) was 14.24% C.

Example 27

Chromatographic Evaluation of Porous Hybrid Particles with a Surrounding Material Samples of porous particles from Example 18, 20, 23 and 26 were used for the separation of a mixture of neutral, polar and basic compounds listed in Table 25. The 2.1×100 mm chromatographic columns were packed using a slurry packing technique. The chromatographic system consisted of an

TABLE 24

| Product | Particle Type | Particles (g) | ATPTCS (g) | Imidazole (g) | Toluene (mL) | Water (μL) | % C | Surface Coverage (μmol/m²) |
|---|---|---|---|---|---|---|---|---|
| 25a | A | 50 | 20.73 | 0 | 250 | 0 | 7.79 | 2.80 |
| 25b | B | 15 | 3.11 | 0 | 75 | 0 | 7.08 | 2.80 |
| 25c | B | 15 | 3.11 | 0 | 75 | 7.5 | 7.30 | 3.37 |
| 25d | B | 15 | 3.11 | 0 | 75 | 15 | 7.23 | 3.08 |
| 25e | B | 15 | 3.04 | 1.05 | 75 | 7.5 | 7.42 | 4.34 |
| 25f | B | 15 | 3.04 | 1.05 | 75 | 15 | 7.42 | 4.34 |
| 25g | A | 50 | 20.73 | 7.55 | 250 | 25 | 8.40 | 3.28 |
| 25h | A | 50 | 32.15 | 11.15 | 250 | 50 | 8.18 | 3.30 |

ACQUITY UPLC® System and an ACQUITY UPLC® Tunable UV detector. Empower 2 Chromatography Data Software (Build 2154) was used for data collection and analysis. Mobile phase conditions were: 20 mM $K_2HPO_4$/$KH_2PO_4$, pH 7.00±0.02/methanol (36/65 v/v); flow rate: 0.25 mL/min; temperature: 23.4° C.; detection: 254 nm.

It can be seen that these porous hybrid particles with a surrounding material provide sufficient retention and resolution in the separation of neutral, polar, and basic compounds. Relative retention is the retention time of the analyte divided by the retention time of acenaphthene. Therefore values less than one, indicate less retention than acenaphthene, and values greater than one, indicate more retention than acenaphthene. (Relative retention is a well known parameter in the field of HPLC.)

TABLE 25

| Sample | Retention Factor: Acenaphthene | Relative Retention: | | | | |
|---|---|---|---|---|---|---|
| | | Propranolol/ Acenaphthene | Butylparaben/ Acenaphthene | Naphthalene/ Acenaphthene | Dipropylphthalate/ Acenaphthene | Amitriptyline/ Acenaphthene |
| Product 18d | 1.86 | 1.094 | 0.454 | 0.576 | 0.543 | 3.484 |
| Product 18n | 2.01 | 1.536 | 0.405 | 0.617 | 0.764 | 2.548 |
| Product 20a | 2.18 | 0.503 | 0.492 | 0.583 | 0.692 | 1.757 |
| Product 20c | 4.65 | 0.251 | 0.406 | 0.523 | 0.485 | 1.228 |
| Product 20d | 5.84 | 0.173 | 0.390 | 0.502 | 0.443 | 1.045 |
| Product 20e | 7.91 | 0.148 | 0.352 | 0.482 | 0.387 | 0.952 |
| Product 20f | 8.60 | 0.161 | 0.332 | 0.478 | 0.395 | 0.986 |
| Product 20g | 11.02 | 0.129 | 0.269 | 0.440 | 0.320 | 0.899 |
| Product 20h | 11.06 | 0.124 | 0.276 | 0.449 | 0.324 | 0.869 |
| Product 20i | 11.00 | 0.123 | 0.271 | 0.443 | 0.321 | 0.872 |
| Product 20j | 12.02 | 0.125 | 0.268 | 0.434 | 0.349 | 0.979 |
| Product 20k | 12.22 | 0.126 | 0.265 | 0.441 | 0.332 | 0.960 |
| Product 20l | 11.63 | 0.128 | 0.273 | 0.438 | 0.342 | 0.979 |
| Product 20n | 2.47 | 0.877 | 0.370 | 0.593 | 0.742 | 1.719 |
| Product 20o | 1.88 | 0.827 | 0.405 | 0.615 | 0.768 | 1.709 |
| Product 20p | 1.83 | 0.909 | 0.401 | 0.621 | 0.753 | 1.826 |
| Product 20q | 1.57 | 0.275 | 0.541 | 0.612 | 0.610 | 1.195 |
| Product 20r | 1.56 | 2.748 | 0.620 | 0.487 | 0.428 | 4.734 |
| Product 20s | 8.34 | 0.238 | 0.233 | 0.430 | 0.696 | 2.113 |
| Product 20t | 8.62 | 0.147 | 0.340 | 0.473 | 0.382 | 0.964 |
| Product 20u | 8.65 | 0.146 | 0.348 | 0.482 | 0.387 | 0.965 |
| Product 20v | 13.40 | 0.113 | 0.239 | 0.433 | 0.288 | 0.829 |
| Product 20w | 12.86 | 0.133 | 0.227 | 0.432 | 0.365 | 1.038 |
| Product 20y | 11.58 | 0.123 | 0.266 | 0.444 | 0.317 | 0.846 |
| Product 20z | 3.64 | 0.267 | 0.353 | 0.525 | 0.739 | 1.544 |
| Product 20aa | 1.86 | 0.240 | 0.328 | 0.617 | 0.655 | 1.062 |
| Product 22a | 1.34 | 0.772 | 0.487 | 0.635 | 0.773 | 2.049 |
| Product 23b | 9.59 | 0.141 | 0.212 | 0.422 | 0.367 | 1.317 |
| Product 26a | 7.67 | 0.145 | 0.321 | 0.469 | 0.381 | 0.969 |
| Commercial <2 μm Hybrid $C_{18}$ Column | 13.67 | 0.132 | 0.222 | 0.420 | 0.403 | 1.240 |
| Commercial <2 μm Silica $C_{18}$ Column | 17.90 | 0.130 | 0.218 | 0.415 | 0.393 | 1.256 |
| Commercial 3.5 μm Silica $C_{18}$ Column | 19.63 | 0.128 | 0.184 | 0.412 | 0.343 | 1.227 |
| Commercial 3.5 μm Silica $C_{18}$ Column | 12.57 | 0.181 | 0.283 | 0.439 | 0.525 | 1.839 |

Example 28

Peak Shape Evaluation of Porous Hybrid Particles with a Surrounding Material Samples of porous particles from Example 18, 20, 23 and 26 were evaluated for USP peak tailing factors using the mobile phase and test conditions of Example 25. The results are shown in Table 26. Peak tailing factors is a well known parameter in the field of HPLC (a lower value corresponds to reduced tailing). It is evident that the peak tailing factors these porous hybrid particles having a surrounding material have comparable basic compound tailing factors of commercially available $C_{18}$-columns.

Tunable UV detector. Empower 2 Chromatography Data Software (Build 2154) was used for data collection and analysis. Mobile phase conditions were: 100 mM ammonium formate, pH.3.00±0.02/acetonitrile (10/90 v/v); flow rate: 0.5 mL/min; temperature: 23.4° C.; detection: 254 nm.

It can be seen that these porous hybrid particles provide sufficient retention and resolution in the separation of polar compound under Hydrophilic Interaction Chromatography (HILIC) test conditions. Relative retention is the retention time of the analyte divided by the retention time of thymine.

TABLE 26

| Sample | Tailing Factor for: | | | | | |
|---|---|---|---|---|---|---|
| | Propranolol | Butyl-paraben | Naphthalene | Dipropyphthalate | Acenaphthene | Amitriptyline |
| Product 18d | 1.55 | 1.01 | 1.03 | 0.94 | 0.95 | 1.33 |
| Product 18n | 4.72 | 1.02 | 1.08 | 0.93 | 1.09 | 3.41 |
| Product 20a | 2.73 | 1.11 | 1.19 | 1.08 | 1.16 | 2.74 |
| Product 20c | 2.28 | 1.11 | 1.26 | 1.08 | 1.18 | 1.70 |
| Product 20d | 0.98 | 1.23 | 1.25 | 1.22 | 1.23 | 1.23 |
| Product 20e | 0.83 | 1.19 | 1.21 | 1.17 | 1.17 | 1.12 |
| Product 20f | 1.30 | 0.99 | 1.09 | 0.98 | 1.06 | 1.07 |
| Product 20g | 0.78 | 1.12 | 1.12 | 1.11 | 1.09 | 1.04 |
| Product 20h | 0.78 | 1.09 | 1.11 | 1.07 | 1.06 | 1.00 |
| Product 20i | 0.88 | 1.15 | 1.16 | 1.15 | 1.11 | 1.09 |
| Product 20j | 0.82 | 1.13 | 1.18 | 1.12 | 1.12 | 1.06 |
| Product 20k | 0.80 | 1.12 | 1.22 | 1.11 | 1.15 | 1.06 |
| Product 20l | 0.79 | 1.13 | 1.16 | 1.12 | 1.11 | 1.06 |
| Product 20n | 4.43 | 1.25 | 1.30 | 1.10 | 1.26 | 2.76 |
| Product 20o | 3.21 | 1.18 | 1.18 | 1.09 | 1.17 | 3.00 |
| Product 20p | 5.63 | 1.11 | 1.05 | 1.04 | 1.14 | 4.12 |
| Product 20q | 0.91 | 1.03 | 1.17 | 1.05 | 1.20 | 1.10 |
| Product 20r | 2.42 | 1.85 | 1.14 | 1.21 | 1.18 | 1.35 |
| Product 20s | 1.33 | 1.10 | 1.17 | 1.18 | 1.25 | 1.16 |
| Product 20t | 0.79 | 1.12 | 1.14 | 1.10 | 1.12 | 1.05 |
| Product 20u | 0.76 | 1.11 | 1.13 | 1.08 | 1.10 | 1.02 |
| Product 20v | 0.83 | 1.18 | 1.18 | 1.17 | 1.15 | 1.10 |
| Product 20w | 1.06 | 1.01 | 1.02 | 0.98 | 0.99 | 0.99 |
| Product 20y | 1.08 | 1.09 | 1.11 | 1.08 | 1.06 | 1.06 |
| Product 20z | 0.80 | 1.13 | 1.20 | 1.25 | 1.20 | 1.23 |
| Product 20aa | 1.26 | 1.25 | 1.26 | 1.17 | 1.22 | 1.15 |
| Product 22a | 2.78 | 1.18 | 1.22 | 1.13 | 1.23 | 3.07 |
| Product 23b | 1.01 | 1.36 | 1.25 | 1.35 | 1.23 | 1.40 |
| Product 26a | 1.15 | 1.25 | 1.28 | 1.28 | 1.26 | 1.30 |
| Commercial <2 µm Hybrid $C_{18}$ Column | 0.81 | 1.13 | 1.05 | 1.11 | 1.02 | 1.41 |
| Commercial <2 µm Silica $C_{18}$ Column | 0.76 | 1.03 | 1.05 | 1.01 | 0.97 | 1.03 |
| Commercial 3.5 µm Silica $C_{18}$ Column | 1.37 | 1.15 | 1.07 | 1.08 | 1.03 | 2.01 |
| Commercial 3.5 µm Silica $C_{18}$ Column | 1.12 | 1.22 | 1.17 | 1.21 | 1.13 | 3.89 |

Example 29

Chromatographic Evaluation of Porous Hybrid Particles Having a Surrounding Material Samples of porous particles from Example 9 and 17 were used for the separation of a mixture of neutral, polar and basic compounds listed in Table 27. The 2.1×100 mm chromatographic columns were packed using a slurry packing technique. The chromatographic system consisted of an ACQUITY UPLC® System and an ACQUITY UPLC®

Therefore, values less than one, indicate less retention than thymine, and values greater than one, indicate more retention than acenaphthene. (Relative retention is a well known parameter in the field of HPLC) t-Boc protected aminopropyl hybrid particles having a surrounding material, 9q, showed low retention times for all analytes under these test conditions. This is expected due to the increased hydrophobicity of the t-Boc group. The deprotected aminopropyl surrounding hybrid particles, 17l, resulted in a significant increase in retentivity.

TABLE 27

| Sample | Retention Factor: Thymine | Relative Retention: Adenine/ Thymine | Cytosine/ Thymine | 5-Fluoroorotic Acid/ Thymine |
|---|---|---|---|---|
| Product 9q | 0.02 | 20.50 | 13.75 | 16.00 |
| Product 17l | 0.40 | 2.70 | 5.71 | 18.67 |
| Product 17g | 0.40 | 2.64 | 5.68 | 16.92 |
| Product 17w | 0.27 | 2.87 | 3.66 | 3.37 |
| Commercial 3.5 µm HILIC Column | 0.33 | 4.85 | 6.19 | 3.07 |
| Commercial 3 µm HILIC Column | 0.48 | 4.14 | 7.38 | 4.01 |

Example 30

Peak Shape Evaluation of Porous Hybrid Particles with a Surrounding Material

Samples of porous particles from Example 9 and 17 were evaluated for USP peak tailing factors using the mobile phase and test conditions of Example 27. The results are shown in Table 28. Peak tailing factor is a well known parameter in the field of HPLC (a lower value corresponds to reduced tailing). It is evident that the porous hybrid particles having a surrounding material have comparable basic compound tailing factors of commercially available Hydrophilic Interaction Chromatography (HILIC) columns.

TABLE 28

| Sample | Tailing Factor for: Acenaphthene | Thymine | Adenine | Cytosine | 5-Fluoroorotic Acid |
|---|---|---|---|---|---|
| Product 9q | 1.19 | 1.40 | 1.55 | 1.43 | 2.14 |
| Product 17l | 1.35 | 1.62 | 1.08 | 1.00 | 1.10 |
| Product 17g | 1.06 | 0.97 | 0.92 | 0.73 | 0.60 |
| Product 17w | 1.50 | 1.47 | 1.15 | 1.09 | 0.96 |
| Commercial 3.5 µm HILIC Column | 1.05 | 0.96 | 0.90 | 0.88 | 1.09 |
| Commercial 3 µm HILIC Column | 1.47 | 2.41 | 1.15 | 1.06 | 1.27 |

Example 31

Low pH Chromatographic Stability Test

Surface derivatized hybrid porous particles from Examples 18, 20 and 26 as well as selected commercial columns ($C_{18}$ Type) based on silica, which have similar alkyl silyl groups, were evaluated for stability in acidic mobile phases using the following procedure. Columns were prepared by slurry packing the materials into 2.1×50 mm steel columns and were tested on the following instrument configuration: Waters ACQUITY UPLC™ system was used for solvent delivery, sample injection (1 µt on a 5 µL loop using partial loop injection), UV detection (500 nL flow cell, Absorbance: 254 nm) and column heating at 60° C. Analysis conditions were as follows: 1) the retention time was measured for a test analyte, methyl paraben (100 µg/mL sample); 2) mobile phase conditions were 0.5% aqueous TFA at a flow of 1.4 mL/min and a column temperature of 60° C.; and 3) 20 minute run times for 61 repeated injections under the same isocratic test conditions were used. The percent changes in the retention time are reported for final injections for methyl paraben, with respect to the retention obtained on the third injection. The results are shown in Table 29.

It is evident that the lifetimes of most of the columns containing hybrid particles having a surrounding material had similar chemical stability with respect to commercial columns containing silica-based materials (lower percent loss in original retention for each injection corresponds to improved chemical stability).

TABLE 29

| Column | Loss in original retention time after 20.3 h of exposure to 0.5% TFA |
|---|---|
| Commercial 3.5 µm Silica $C_{18}$ Column | 16.6% |
| Commercial 3.5 µm Silica $C_{18}$ Column | 13.7% |
| Commercial 3 µm Silica $C_{18}$ Column | 9.4% |
| Product 18n | 5.4% |
| Product 20e | 12.2% |
| Product 20f | 6.7% |
| Product 20g | 8.5% |
| Product 20h | 9.5% |
| Product 20i | −2.7% |
| Product 20j | 2.0% |
| Product 20k | 4.0% |
| Product 20l | −7.0% |
| Product 20m | 10.5% |
| Product 20n | 19.7% |
| Product 20o | 25.9% |

TABLE 29-continued

| Column | Loss in original retention time after 20.3 h of exposure to 0.5% TFA |
|---|---|
| Product 20p | 24.9% |
| Product 20r | 17.7% |
| Product 20s | 21.8% |
| Product 20t | 12.1% |
| Product 20u | 7.1% |
| Product 20v | 7.4% |
| Product 20w | 6.5% |
| Product 20z | 25.8% |
| Product 20aa | 19.2% |
| Product 26a | 19.0% |

Example 32

Hydrolytic Stability Test

The hydrolytic stability of the columns packed with porous hybrid particles from Example 17, 18, 20, 22, and 26 as well as some comparison columns were evaluated using the following procedure. Columns (3×30 mm) were equilibrated in 1:1 acetonitrile/water (210 minutes) before initial chromatographic performance was tested using uracil and decanophenone (1:1 acetonitrile/water; 0.43 mL/min). The columns were then heated at 50° C. and were challenged with a solution of 0.02 N NaOH in water (pH 12.3, 0.85 mL/min for 60 min) before flushing with 10:90 methanol/water followed by methanol. Chromatographic performance was reassessed at regular intervals by equilibrating the columns with acetonitrile (50 minutes), followed by testing using uracil and decanophenone (1:1 acetonitrile/water or 0.1% formic acid in 30:70 methanol/water, 0.43 mL/min). This process was repeated and the performance of the column was monitored until column failure. Column failure is defined as the time when the plate number drops to 50% of the initial value or when the test system shut down due to high column pressure. The results of these tests, including final reported loss in original column efficiency are shown in Table 30. Comparison Column A was commercially available 5 μm porous hybrid particles of the formula $(O_{1.5}SiCH_2CH_2SiO_{1.5})(SiO_2)_4$, that was surface modified with $C_{18}H_{37}SiCl_3$ followed by endcapping. Comparison Column B (repeated on three separate columns) was 3.5 μm porous hybrid particles of the formula $(O_{1.5}SiCH_2CH_2SiO_{1.5})(SiO_2)_4$, that was surface modified with $CH_3(CH_2)_{11}NHCO_2(CH_2)_3Si(CH_3)_2Cl$ followed by endcapping. Comparison Column C was a commercially available 3 μm silica-core particle that was surface modified with an organofunctional silane followed by $C_{18}$ surface modification. Comparison Column D was commercially available 5 μm porous hybrid particles of the formula $(CH_3SiO_{1.5})(SiO_2)_2$, that was surface modified with $C_{18}H_{37}SiCl_3$ followed by endcapping. Comparison Column E was commercially available 5 μm porous silica particles that was surface modified with $C_{18}H_{37}Si(CH_3)_2Cl$ followed by endcapping.

Comparison Column A and B (which is based on a hybrid formula that is substantially enriched in silica content) failed under these test conditions between 22-52 hours exposure to 0.02 N NaOH. Hybrid Column E failed within 3 hours exposure to 0.02 N NaOH. Comparison Column C and E (which are based on a silica base particle) failed under these test conditions at 3-5 hours exposure to 0.02 N NaOH. It is well known in the field of HPLC that column failure resulting in high column pressure when silica based columns are exposed to alkaline solutions can result from the dissolution of the silica particle resulting in the collapse of the column bed. For Comparison Column B this packed-bed collapse was confirmed by column dissection and the measurement of a 10 mm void at the inlet of the column.

It can be concluded that the durability of the porous hybrid packing materials from Example 17, 20 and 22 are improved over the both Comparison Columns C, D, and E, and are comparable to Comparison Columns A and B under these test conditions.

TABLE 30

| Column | Exposure Time to 0.02N NaOH (h) | Loss in original Column efficiency |
|---|---|---|
| Comparison Column A | 52 | 53% |
| Comparison Column B | 22 | 55% |
| Comparison Column C | 5 | high pressure |
| Comparison Column D | 5 | 50% |
| Comparison Column E | 3 | 64% |
| Product 17c | 25 | 54% |
| Product 17e | 24 | High pressure |
| Product 18n | 11 | 50% |
| Product 20c | 19 | 56% |
| Product 20e | 26 | 51% |
| Product 20f | 34 | 54% |
| Product 20g | 16 | 52% |
| Product 20h | 23 | 55% |
| Product 20i | 23 | 70% |
| Product 20j | 33 | 54% |
| Product 20k | 31 | 57% |
| Product 20l | 32 | 56% |
| Product 20n | 17 | 71% |
| Product 20o | 10 | 51% |
| Product 20p | 8 | 51% |
| Product 20r | 11 | 51% |
| Product 20s | 23 | 64% |
| Product 20t | 25 | 55% |
| Product 20u | 24 | 55% |
| Product 20v | 24 | 61% |
| Product 20w | 23 | 55% |
| Product 20z | 24 | 60% |
| Product 20aa | 22 | 60% |
| Product 22a | 49 | 51% |
| Product 26a | 10 | 52% |

Example 33

Selectivity Comparison of Surrounding Porous Hybrid Particles Having a Surrounding Material with a Commercial C18 Column Chromatographic selectivity differences for select products from Example 18 and 20 were evaluated under pH 7 and pH 3 test conditions (2.1×100 mm columns). System conditions were the same as detailed in Experiment 27. Mobile phase conditions were: 20 mM $K_2HPO_4/KH_2PO_4$, pH 7.00±0.02/methanol (36/65 v/v) or 15.4 mM ammonium formate, pH 3.0/acetonitrile (65/35 v/v); flow rate: 0.25 ml/min, temperature: 23° C.; detection: 254 nm. pH 7 test molecules included uracil, propranolol, butylparaben, naphthalene, dipropylphthalate, acenaphthene, and amitriptyline. pH 3 test molecules included uracil, pyrenesulfonic acid, desipramine, amitriptyline, butylparaben, and toluene. The correlation coefficient ($R^2$) for retention times were made with a commercially available C18 column (XBridge C18, Waters Corporation) under both pH 7 and pH 3 test conditions. The selectivity value was calculated by $100(1-R^2)^{0.5}$ as shown in Table 31. A lower $R^2$ and higher Selectivity Value indicate a greater selectivity difference under these test conditions. It can be concluded that surface modification of hybrid particles under conditions used in Examples 18 and 20 provide a different chromatographic selectivity under these test conditions.

TABLE 31

| Sample | pH 7 Correlation ($R^2$) | pH 7 Selectivity Value | pH 3 Correlation ($R^2$) | pH 3 Selectivity Value |
|---|---|---|---|---|
| Product 18n | 0.401 | 77.4 | 0.621 | 61.5 |
| Product 20m | 0.910 | 30.0 | 0.886 | 33.7 |
| Product 20o | 0.727 | 52.3 | 0.002 | 99.9 |
| Product 20p | 0.674 | 57.1 | 0.025 | 98.7 |
| Product 20q | 0.960 | 20.0 | 0.673 | 57.2 |
| Product 20r | 0.285 | 84.6 | 0.419 | 76.2 |
| Product 20s | 0.867 | 36.5 | 0.973 | 16.5 |

TABLE 31-continued

| Sample | pH 7 Correlation ($R^2$) | pH 7 Selectivity Value | pH 3 Correlation ($R^2$) | pH 3 Selectivity Value |
|---|---|---|---|---|
| Product 20z | 0.928 | 26.7 | 0.900 | 31.6 |
| Product 20aa | 0.922 | 27.9 | 0.953 | 21.6 |

Example 34

Reaction of Chloromethylphenyl containing Porous Hybrid Particles with a Surrounding Material with Piperazine Chloromethylphenyl containing particles 18w from Experiment 18 were further modified with piperazine (Acros, Geel Belgium) in refluxing toluene (110° C., HPLC grade, Fisher Scientific, Fairlawn, N.J.) for 20 hours. The reaction was then cooled and the material was filtered and washed successively with toluene, 1:1 v/v acetone/water and acetone (all solvents from J. T. Baker). The product was then dried at 80° C. under reduced pressure for 16 hours. Reaction data is listed in Table 32. The surface coverage of piperazyl groups (e.g., $O_{1.5}Si(CH_2)_3OC(O)NHC_6H_4CH_2N(CH_2CH_2)_2NH$) was determined by the difference in particle % C before and after the surface modification as measured by elemental analysis.

TABLE 32

| Product | Particles (g) | Piperazine (g) | Toluene (mL) | % C | % N | Piperazine coverage ($\mu mol/m^2$) |
|---|---|---|---|---|---|---|
| 34a | 2 | 0.3 | 10 | 13.52 | 1.22 | 2.80 |

Example 35

Reaction of Propanol Containing Porous Hybrid Particles with a Surrounding Material Using 1,1'-carbonyldiimidazole Propanol containing hybrid particles from Example 17 were modified with 1,1'-carbonyldiimidazole (CDI, Fluka, Buchs, Switzerland) in toluene (Tol, 5 mL/g, Fisher Scientific, Fairlawn, N.J.) for 2 hours at room temperature, or in dimethylformamide (DMF, 5 mL/g, Aldrich) for 20 hours at room temperature. Reactions performed in toluene were transferred to a filter apparatus and washed exhaustively with toluene, before redispersing in toluene. Octadecylamine (ODA, Fluka), octylamine (OA, Aldrich), 4-aminophenol (AP, Aldrich), tris(hydroxymethyl)methylamine (TRIS, Aldrich, dissolved in DMF at 60° C.), or pentafluorophenylamine (PFPA, Aldrich) was then added and the reaction was stirred for an additional 20 hours. Specific reaction conditions are provided in Table 33. The product was filtered and washed successively with acetone, toluene, water and/or DMF. The material was then dried at 70° C. under reduced pressure for 16 hours. Product 35b and 35c were further heated for an hour at 50° C. in a 1:1 v/v mixture of acetone and 1% trifluoroacetic acid (Aldrich, Milwaukee, Wis.) solution (10 ml/g particles), and products 35f and 35g were further heated for 20 hours at 50° C. in a 60:40 v/v mixture of acetone and 100 mM ammonium bicarbonate (pH 8, Aldrich, Milwaukee, Wis.). The reaction was then cooled and the product was filtered and washed successively with acetone and toluene (heated at 70° C.). The product was then dried at 70° C. under reduced pressure for 16 hours. Product data is listed in Table 33. Product 35e was obtained by repeating this process on product 35d. The surface coverage of carbamate groups was determined by the difference in particle % C before and after the surface modification as measured by elemental analysis

TABLE 33

| Product | Precursor | Particles (g) | CDI (g) | Solvent | Solvent (mL) | Amine | Amine (g) | Temp. (° C.) | % C | Carbamate Coverage ($\mu mol/m^2$) |
|---|---|---|---|---|---|---|---|---|---|---|
| 35a | 17w | 2 | 0.63 | Tol | 10 | ODA | 1.51 | 25 | 13.12 | 3.23 |
| 35b | 17x | 20 | 6.27 | Tol | 100 | OA | 31.24 | 25 | 17.01 | 3.11 |
| 35c | 17x | 15 | 4.70 | Tol | 75 | AP | 9.49 | 25 | 9.10 | 0.53 |
| 35d | 17w | 20 | 6.30 | DMF | 100 | TRIS | 14.13 | 60 | 9.79 | 1.70 |
| 35e | 35d | 10 | 3.15 | DMF | 50 | TRIS | 7.06 | 60 | 10.32 | 2.46 |
| 35f | 17z | 15 | 4.76 | Tol | 75 | PFPA | 16.11 | 110 | 9.04 | 0.49 |
| 35g | 17z | 20 | 6.34 | Tol | 100 | PFPA | 21.5 | 110 | 9.1 | 0.55 |

Example 36

Hybrid Monolith with a Surrounding Material

Hybrid inorganic/organic monoliths of the formula $(O_{1.5}SiCH_2CH_2SiO_{1.5})(SiO_2)_4$ (which is prepared following the method described in U.S. Pat. No. 7,250,214) are soaked in toluene (J. T. Baker, 20 ml/g) and refluxed for 3.5 hours under an argon atmosphere to deoxygenate and to remove adsorbed water via azeotropic distillation. After cooling to room temperature under, POS 1c from Example 1 (0.8-1.6 g/g) and deionized water (0.04-0.2 ml/g) is added. The reaction is heated at 80° C. for one hour and 110° C. for 20 hours using a Dean-Stark trap to remove residual water. Alternatively the Dean-Stark trap is not employed to remove residual water from the reaction. The reaction is cooled to room temperature and monoliths are washed repeatedly using ethanol (anhydrous, J. T. Baker, Phillipsburgh, N.J.).

The material is then heated at 50° C. in a suspension with ethanol (3 ml/g, anhydrous, J. T. Baker, Phillipsburgh, N.J.), deionized water (7 ml/g) and 30% ammonium hydroxide (20 g; J. T. Baker, Phillipsburgh, N.J.) for 4 hours. The reaction is then cooled and the product is washed successively with water and methanol (Fisher Scientific, Fairlawn, N.J.). The product is dried at 80° C. under reduced pressure for 16 hours.

This Material Surrounding of hybrid inorganic/organic monoliths can be performed using a variety of hybrid inorganic/organic POS' from Example 1 (1a-1x), nanoparticle containing POS from Example 12, or sub-1 μm particle containing POS as detailed in Example 24. Silica hybrid monoliths with a surrounding material can also be prepared using POS 1y from Example 1. This Material Surrounding of hybrid inorganic/organic monoliths can be performed in a reactor, or within a chromatographic device (e.g., microbore tubes, extraction cartridges, capillary tubes) under a pressurized flow of solvent and reagents, or it can be performed under stop-flow conditions. This Material Surrounding can be performed using a variety of hybrid monoliths, including other hybrid monoliths detailed in U.S. Pat. No. 7,250,214, hybrid monoliths prepared from the condensation of one or more monomers that contain 0-99 mole percent silica (e.g., $SiO_2$), hybrid monoliths prepared from coalesced porous inorganic/organic particles (also detailed in U.S. Pat. No. 7,250,214), hybrid monoliths that have a chromatographically-enhancing pore geometry, hybrid monoliths that do not have a chromatographically-enhancing pore geometry, hybrid monoliths that have ordered pore structure, hybrid monoliths that have non-periodic pore structure, hybrid monoliths that have non-crystalline or amorphous molecular ordering, hybrid monoliths that have crystalline domains or regions, hybrid monoliths with a variety of different macropore and mesopore properties, and hybrid monoliths in a variety of different aspect ratios.

Example 37

Formation of Hybrid Monoliths with Porous Hybrid Particles Having a Surrounding Material Hybrid inorganic/organic particles having a surrounding material from Examples 8-11 and Examples 13-24 are mixed with 5 μm Symmetry silica (Waters Corporation, 0-50% weight) to yield 6 g total mass. The mixture is dispersed in an appropriate solvent (e.g., isopropanol/tetrahydrofuran mixtures) for 5 minutes, before slurry packing into 2.1×50 mm HPLC columns using a downward slurry technique with a high-pressure liquid packing pump. After completion of column packing, the pressure is released and the end fitted column is transferred to chromatographic pump station (Waters 590 HPLC pump or equivalent), whereupon the column is purged with dry toluene (J. T. Baker, 0.2 mL/min), before pumping (0.2 mL/min) a solution of POS 1c from Example 1 (0.8 g per gram of particle mixture) and water (0.04 mL per gram of particle mixture) that is pre-diluted in toluene. These reactions can use short (less than 1 hour) or extended flow times (less than 72 hours) to aid in monolith formation. The column pressure is allowed to drop for 30 minutes prior to disconnection. The columns are left uncapped in a chemical fume hood's air stream for 5-18 hours, transferred to a 65° C. convection oven for 28 hours and then cooled to room temperature. Analysis of these hybrid monoliths (SSA, SPV, APD, % C, SEM, mercury porosimetry) is performed on samples that are extruded from the columns and are vacuum dried for a minimum of 8 hours at room temperature.

This monolith formation of hybrid inorganic/organic particles is performed using a variety of hybrid inorganic/organic POS from Example 1 (1a-1x), nanoparticle containing POS from Example 12, or sub-1 μm particle containing POS as detailed in Example 24. To increase the macropore volume of this monolith, the silica template may be removed through purging the column with solutions of aqueous sodium hydroxide or trimethyl amine. Alternatively, the silica particle may be replaced with appropriately sized polystyrene latex. For this alternative monolith system, solvents that do not swell or dissolve the polystyrene latex must be employed (e.g., a polar protic solvent, or the pumping of a POS from Example 1 with or without additional water present). Upon formation of the coalesced hybrid particle monolith, the polystyrene particles can be removed thermally or by purging the column with toluene. Thermal removal of polystyrene can be aided with an inert atmosphere purge (nitrogen or argon) or the use of vacuum.

Example 38

Hydrothermal Processing of Surrounded Hybrid Monoliths

A monolith from Examples 36 or 37 is mixed with an aqueous solution of 0.3 M tris(hydroxymethyl)aminomethane (TRIS, Aldrich Chemical, Milwaukee, Wis.) at a concentration of 5 mL/g, and the pH is adjusted to 9.8 using acetic acid (J. T. Baker, Phillipsburgh, N.J.). The monolith is enclosed in a stainless steel autoclave and is heated to 155° C. for 20 hours. After cooling the autoclave to room temperature, the product is washed with water and methanol (Fisher Scientific, Suwanee, Ga.), and is dried at 80° C. under vacuum for 16 hours. Products prepared in this manner have chromatographically enhanced pore geometry.

Example 39

Surface Modification of Surrounded Hybrid Monoliths

A monolith from Examples 36, 37 or 38 is treated with a 1 molar hydrochloric acid solution (Aldrich, Milwaukee, Wis.) for 20 h at 98° C. After cooling the product is washed with water to a neutral pH, followed by acetone (HPLC grade, Fisher Scientific, Fairlawn, N.J.). The monolith is dried at 80° C. under vacuum for 16 h. Surface silanol groups of these surrounded hybrid monoliths can be modified in a similar manner as shown in Examples 20-22 by reaction with chlorosilanes. Hybrid monoliths containing surface hydroxypropyl groups can be modified in a similar manner as shown in Example 18-19 by reaction with isocyanates. Other transformations of synthetically relevant hybrid groups have been reported in U.S. Pat. No. 7,250,214. Chromatographic evaluation of surface modified hybrid monoliths having a surrounding material prepared in chromatographic columns can be performed in a similar manner as detailed in Examples 27-30. Chemical stability tests can also be performed as detailed in Examples 31-32.

Example 40

Reaction of Bonded Hybrid Particles with Isocyanates

Following the procedure in Example 26, products 25g and 25h were reacted with octadecyl isocyanate, followed by endcapping with trimethylchlorosilane. Product data is shown in Table 34.

TABLE 34

| Product | Precursor | Particles (g) | % C | Carbamate Coverage (μmol/m$^2$) | Endcap % C |
|---|---|---|---|---|---|
| 40a | 25g | 25 | 14.80 | 2.00 | 15.29 |
| 40b | 25h | 18 | 16.04 | 2.54 | 16.75 |

Example 41

Reaction of Bonded Hybrid Particles with Isocyanates

Following the general procedure in Example 26, product 25a-h reacts with 4-cyanophenyl isocyanate, 3-cyanophenyl isocyanate, or 2-cyanophenyl isocyanate. Hydrolysis type A, B, or C from Example 18 is preformed. Products prepared by this manner can be endcapped or used without any further transformation.

II. Superficially Porous Core Examples

The following non-limiting examples describe superficially porous chromatographic materials comprising a superficially porous core. Certain examples shown herein utilize a nonporous core. One of ordinary skill in the art would readily be able to adapt the methodology utilized therein on a superficially porous core material as described herein.

As described herein, this invention relates to the use of surface modified superficially porous cores as a stationary phase for chromatographic separations under high pH conditions. Until recently, commercially available superficially porous products were comprised of silica particles, which were not suited for high pH separations due to the dissolution of silica at pH values above 7. Modifying the surface of superficially porous cores with organic/inorganic hybrid surrounding material, in the presence of water, results in a product that successfully extends column stability at higher pH values (10-12). To determine the cause of column failure, the surface modified superficially porous cores were analyzed after testing under high pH conditions (10 mM Ammonium Bicarbonate, pH 10.5, 60° C.). SEM images of the unpacked material did not show significant changes compared to the same material before it was tested (FIG. 2), however after manually crushing the particles for the purpose of further analysis, a major failure mechanism was discovered; while the organic/inorganic hybrid surface was successfully protecting the shell from gross dissolution, evidence of significant core erosion as seen by morphological changes (surface indentations, holes, and/or reduced core size) was observed (FIG. 3).

Figure 4:
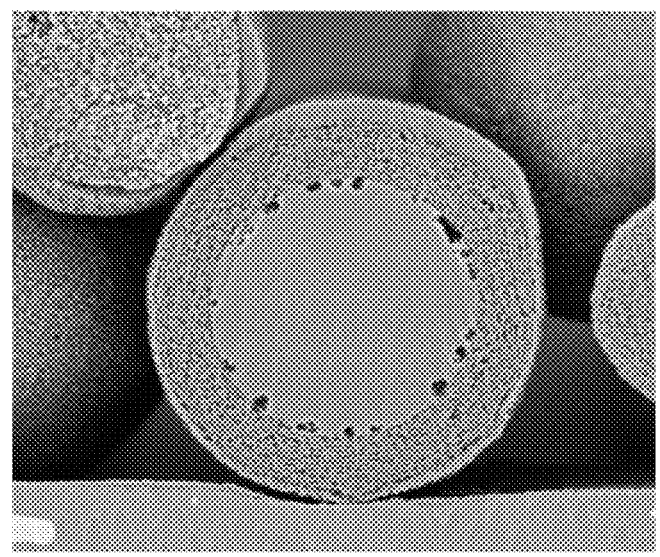
FIG. 4 (a & b) shows BIB-SEM images of superficially porous particles showing core erosion before the particles were packed and tested under high pH conditions (10 mM Ammonium Bicarbonate, pH 10.5, 60° C.).
Figure 4:
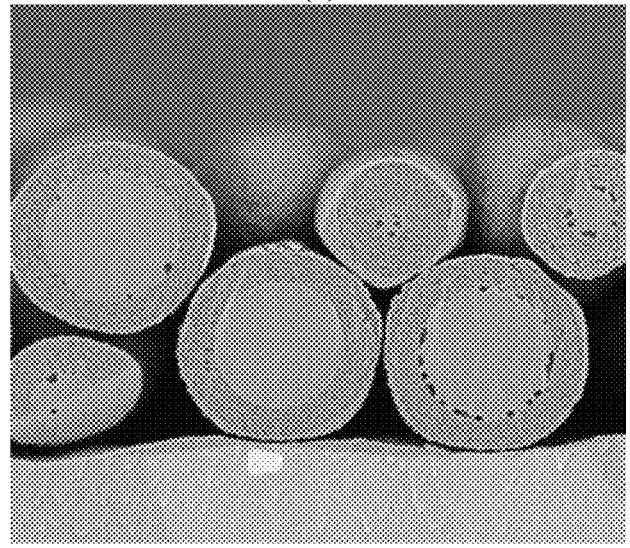
Figure 5:
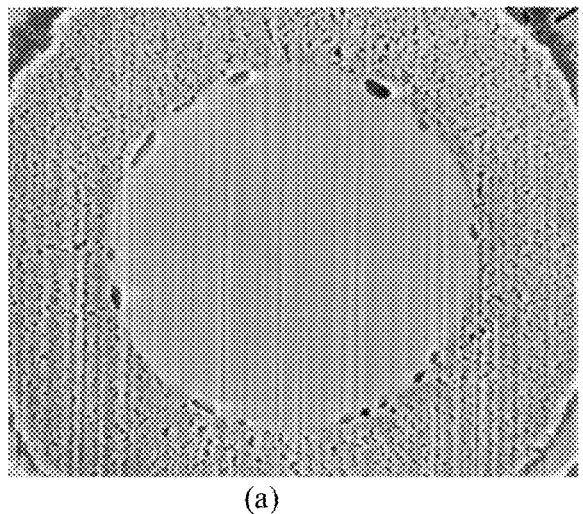
FIG. 5 shows BIB-SEM images of: Competitor A and Competitor B particles before exposure to high pH test conditions (a and b) and after exposure to high pH conditions (c & d). Test conditions: 10 mM Ammonium Bicarbonate, pH 10.5, 60° C.
Figure 5:
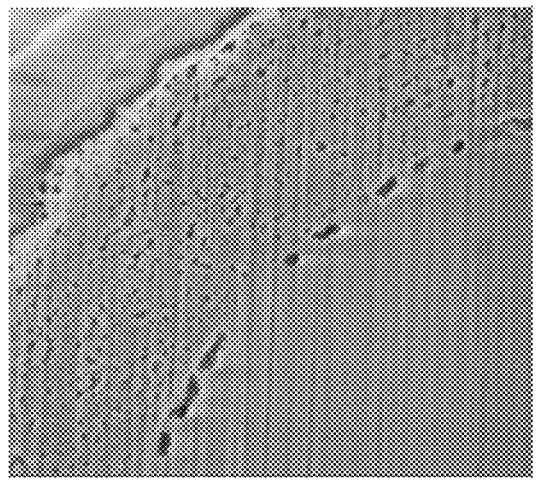
Figure 5:
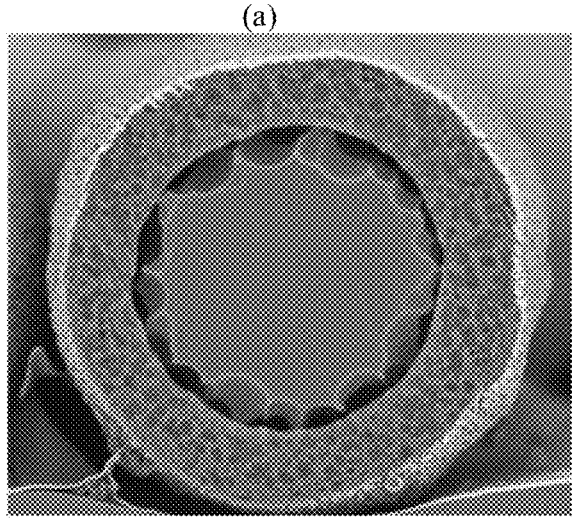
Figure 5:
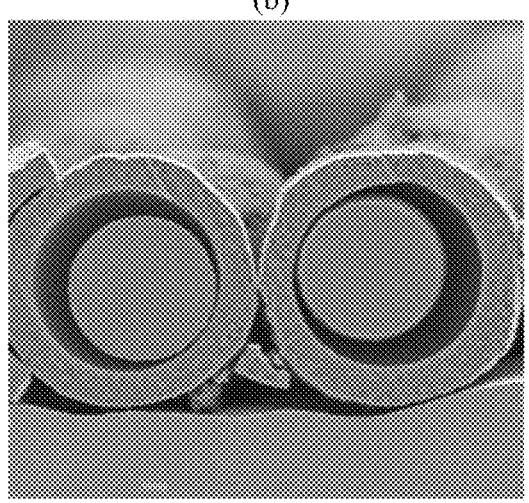

Core Erosion was later confirmed with cross-sectional images of these surface modified superficially porous cores (FIG. 4). Upon further investigation, significant core erosion was also observed in commercially available superficially porous cores marketed for high pH stability from competitors in the field (FIG. 5). Additionally, evidence of erosion (small holes in the outer edge of the core near the surface of the porous layer) was observed in materials before high pH testing, indicating the process in which the particles were made was pre-maturely affecting the integrity of the core (FIGS. 4 and 5).

The erosion of core particles leads to a mechanically unstable column that will result in bed collapse, causing large voids at the head of the column and frit clogging at the end of the column; this will be observed by a considerable increase in column backpressure as well as poor analyte peak shapes. The aforementioned physical observations and chromatographic effects are observed when these columns are tested under high pH conditions (10 mM Ammonium Bicarbonate, pH 10.5, 60° C.). In addition, a significant particle size effect is observed with respect to failure under high pH conditions—as particle size decreases, the high pH stability of the columns packed with that material considerably decreases (FIG. 6). While not limited by theory, it is believed that chromatographic effects due to core dissolution take longer on a larger particle since the core is much larger (more silica core per volume) as compared to a smaller particle.

Figure 2:
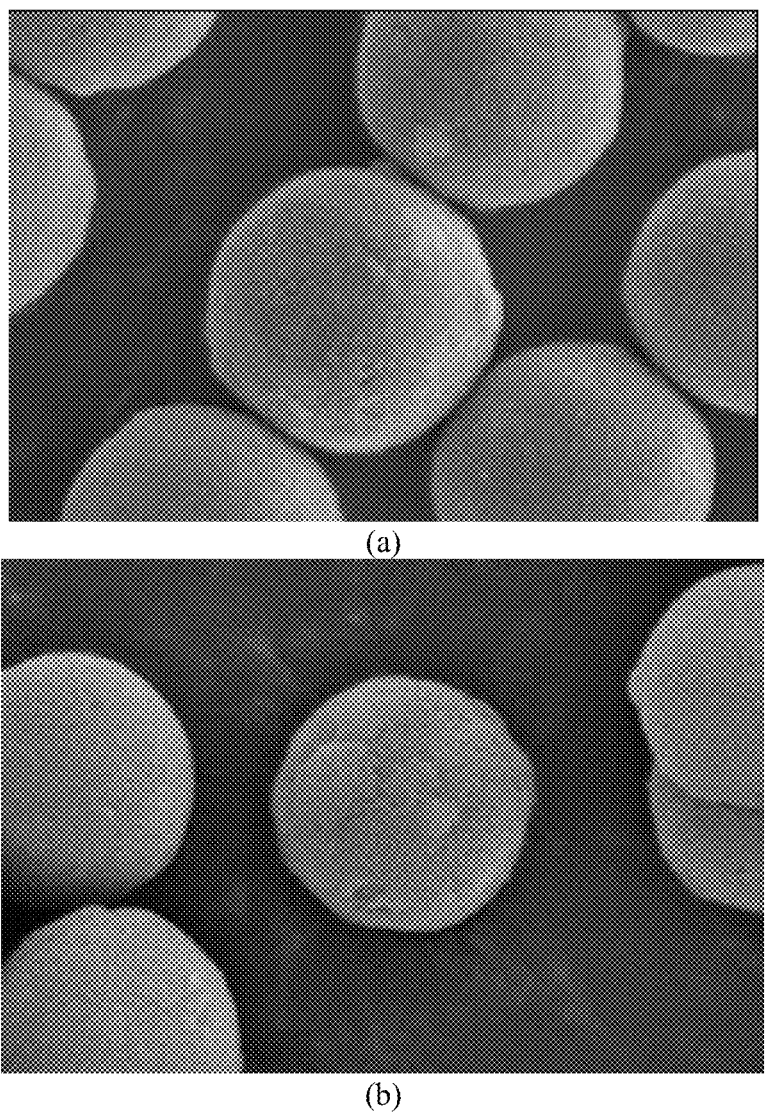
FIG. 2 shows SEM images of representative particles before the particles were packed into an HPLC column (a) and after the particles were packed in an HPLC column, and tested under high pH conditions, (10 mM Ammonium Bicarbonate, pH 10.5, 60° C.), and extruded from the column (b).
Figure 3:
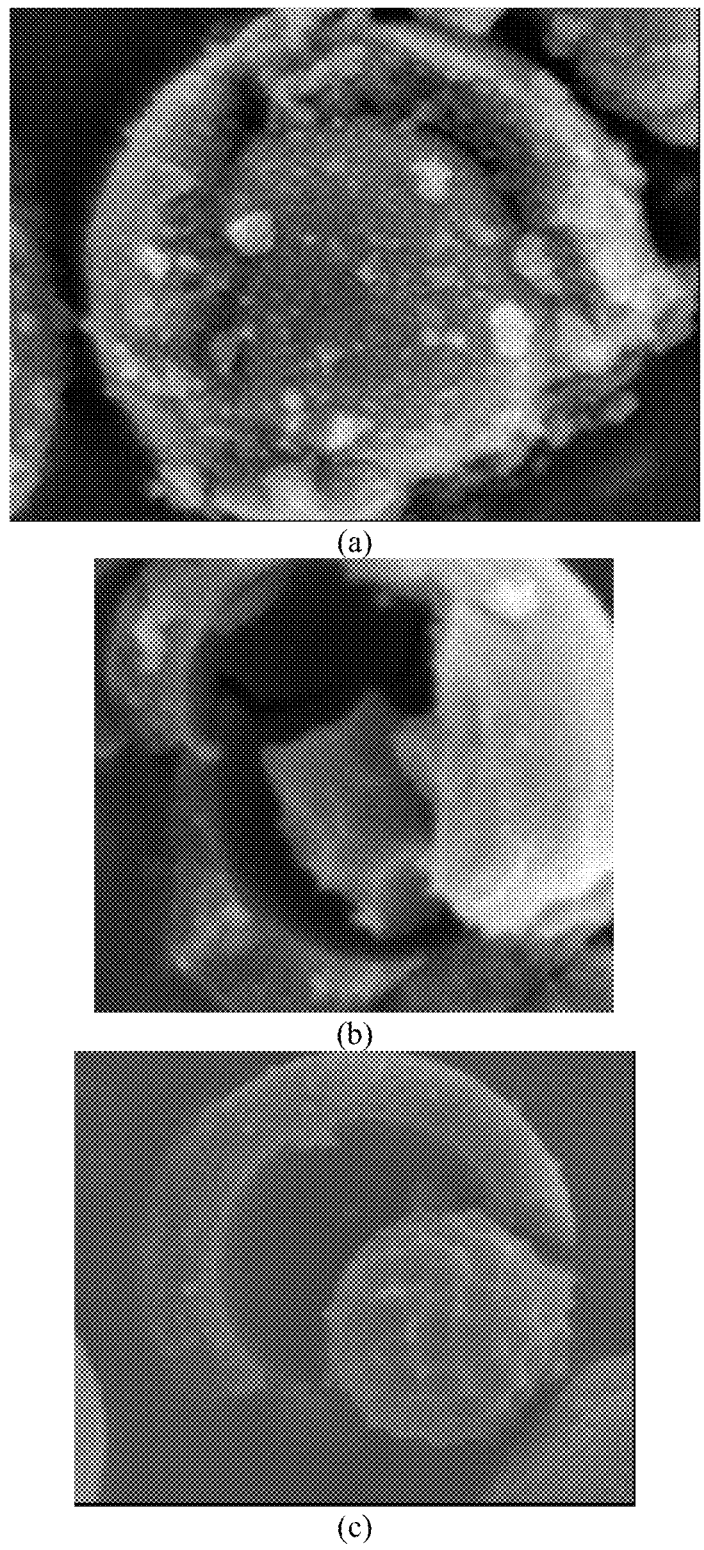
FIG. 3 shows SEM images of representative particles (crushed via mortar and pestle) before the particles were packing into an HPLC column (a) and after the particles were packed into an HPLC column, tested under high pH conditions (10 mM Ammonium Bicarbonate, pH 10.5, 60° C.), and extruded from the column (b & c).

FIG. 2 shows SEM images of representative particles before the particles were packed into an HPLC column (a) and after the particles were packed in an HPLC column, and tested under high pH conditions, (10 mM Ammonium Bicarbonate, pH 10.5, 60° C.), and extruded from the column (b).

FIG. 3 shows SEM images of representative particles (crushed via mortar and pestle) before the particles were packing into an HPLC column (a) and after the particles were packed into an HPLC column, tested under high pH conditions (10 mM Ammonium Bicarbonate, pH 10.5, 60° C.), and extruded from the column (b & c).

FIG. 4 shows BIB-SEM images of superficially porous cores showing core erosion before the particles were packed and tested under high pH conditions (10 mM Ammonium Bicarbonate, pH 10.5, 60° C.).

FIG. 5 shows BIB-SEM images of: Competitor A and Competitor B particles before exposure to high pH test conditions (a and b) and after exposure to high pH conditions (c & d). Test conditions: 10 mM Ammonium Bicarbonate, pH 10.5, 60° C.

Figure 6A:
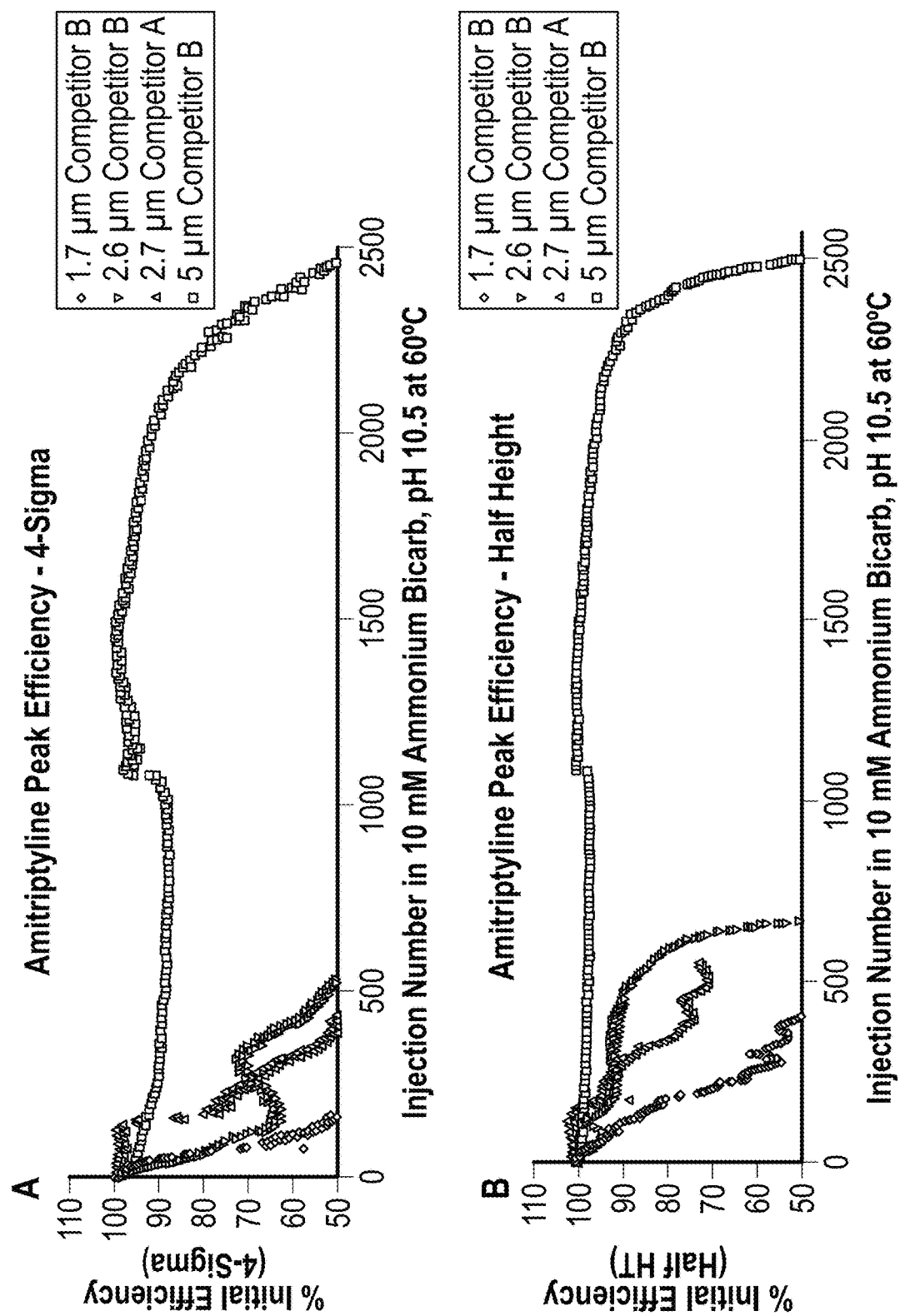
FIGS. 6A and 6B show chromatographic results illustrating particle size influence on high pH stability for competitor columns as determined by percent change of 4-sigma initial efficiency (a), percent change of half height efficiency (b), tailing factor (c), percent change in pressure (d).
Figure 6B:
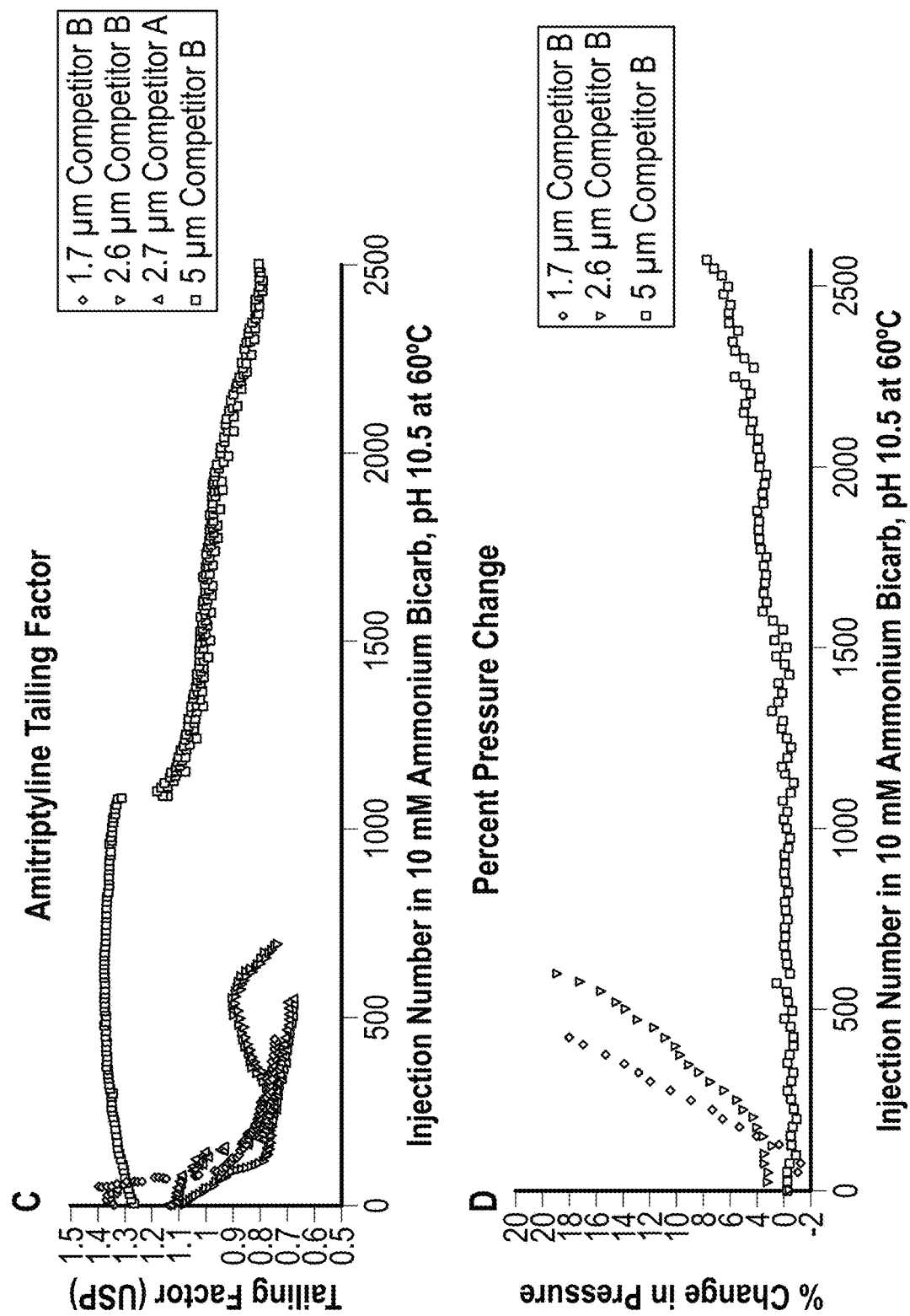

FIGS. 6A and 6B show chromatographic results illustrating particle size influence on high pH stability for competitor columns as determined by percent change of 4-sigma initial efficiency (a), percent change of half height efficiency (b), tailing factor (c), percent change in pressure (d)*. Detailed testing conditions are described in "Sample test 1"
*Pressure trace for Competitor A is not available.

Sample test conditions for determining base stability:
Test 1) Mobile Phase Gradient: 5% to 95% B in 2.3 minutes using a linear curve; 0.7 minute hold at 95% B; return to initial conditions and hold for 1.5 minutes (A=10 mM Ammonium Bicarbonate, pH 10.5 and B=100% Acetonitrile) at a flow rate of 0.8 mL/minute. The 2.1×50 mm column is kept at a constant temperature of 60° C. The standard injection volume is 3 µL. In this test, a material is considered base stable if it exhibits none of the performance or attribute changes listed above before 500-3000 injections;
Test 2) Mobile phase: 10 mM Ammonium Bicarbonate (pH 10.5) isocratic at a constant flow rate of 0.21 mL/min. The 2.1×50 mm column is kept at a constant temperature of 70° C. A material is considered base stable if it retains more than 60-80% of stationary mass after 36 hours.

Materials

All reagents were used as received unless otherwise noted. Those skilled in the art will recognize that equivalents of the following supplies and suppliers exist and, as such, the suppliers listed below are not to be construed as limiting.

Characterization

Those skilled in the art will recognize that equivalents of the following instruments and suppliers exist and, as such, the instruments listed below are not to be construed as limiting.

The % C, % H, % N values were measured by combustion analysis (CE-440 Elemental Analyzer; Exeter Analytical Inc., North Chelmsford, Mass.) or % C by Coulometric Carbon Analyzer (modules CM5300, CM5014, UIC Inc., Joliet, Ill.). The specific surface areas (SSA), specific pore volumes (SPV) and the average pore diameters (APD) of these materials were measured using the multi-point $N_2$ sorption method (Micromeritics ASAP 2400; Micromeritics Instruments Inc., Norcross, Ga.). The SSA was calculated using the BET method, the SPV was the single point value determined for $P/P_0>0.98$ and the APD was calculated from the desorption leg of the isotherm using the BJH method.

The median mesopore diameter (MPD) and mesopore pore volume (MPV) were measured by mercury porosimetry (Micromeritics AutoPore IV, Micromeritics, Norcross, Ga.). Scanning electron microscopic (SEM) image analyses were performed (JEOL JSM-5600 instrument, Tokyo, Japan or Hitachi SU8030 instrument, Dallas, Tex.) at 1-7 kV. Focused ion beam scanning electron microscopic (FIB/SEM) image analyses were performed by Analytical Answers Inc. (Woburn, Mass.) on an FBI Model 200 Focused Ion Beam instrument, and a Hitachi S4800 Ultra-Field emission SEM. Particle sizes were measured using a Beckman Coulter Multisizer 3 analyzer (30 μm aperture, 70,000 counts; Miami, Fla.) or manually using SEM. Particles were prepared for cross-sectional imaging using a broad ion beam milling system (Hitachi IM 4000 plus). The particle diameter (dp) was measured by SEM or by using a Beckman Coulter as the 50% cumulative diameter of the volume based particle size distribution or mode of the number based particle size distribution. The width of the distribution was measured as the 90% cumulative volume diameter divided by the 10% cumulative volume diameter (denoted 90/10 ratio). Metals content was measured by ICP-AE (Thermo Fisher Scientific iCAP 6500 Duo). Light scattering particle size measurements were measured using a Malvern Mastersizer 2000 in water. Particle size measurements of nanoparticles and Zeta-potential measurements were made using a Malvern ZetaSizer NanoSeries (model ZEN3600). Multinuclear ($^{13}$C, $^{29}$Si) CP-MAS NMR spectra were obtained using a Bruker Instruments Avance-300 spectrometer (7 mm double broadband probe). The spinning speed was typically 5.0-6.5 kHz, recycle delay was 5 sec. and the cross-polarization contact time was 6 msec. Reported $^{13}$C and $^{29}$Si CP-MAS NMR spectral shifts were recorded relative to tetramethylsilane using the external standards adamantane ($^{13}$C CP-MAS NMR, δ 38.55) and hexamethylcyclotrisiloxane ($^{29}$Si CP-MAS NMR, δ-9.62). Populations of different silicon environments were evaluated by spectral deconvolution using DMFit software. [Massiot, D.; Fayon, F.; Capron, M.; King, I.; Le Calve, S.; Alonso, B.; Durand, J.-O.; Bujoli, B.; Gan, Z.; Hoatson, G. *Magn. Reson. Chem.* 2002, 40, 70-76]. Classification techniques are described, for example, in W. Gerhartz, et al. (editors) *Ullmann's Encyclopedia of Industrial Chemistry*, 5$^{th}$ edition, Volume B2: Unit Operations I, VCH Verlagsgesellschaft mbH, (Weinheim, Fed. Rep. Germ. 1988). Magnetic measurements were made using a vibrating sample magnetometer (ADE/DMS Model 880) by ArKival Technology Corporation (Nashua, N.H.). Phase characterization were made by Wide Angle X-Ray Powder Diffraction (XRPD) analysis (H&M Analytical Services, Inc. Allentown, N.J.), using a Bruker D4 diffractometer (Cu radiation at 40 KV/30 mA). Scans were run over the angular range of 10° to 90° 2-Theta with a step size of 0.02° and a counting time of 715 seconds per step.

Example SPC-1

Non-porous silica particles, as received, were heat treated (900° C.) in air for 10 h. The surface of the particles were rehydroxylated using 10% v/v nitric acid at 100° C. for 16 h, then dried at 80° C. under 25 mm vacuum. This process of treating NPS cores is used often in the subsequent examples. It can be referred to as "control cores".

Example SPC-2

Control cores from Example SPC-1 were fully dispersed in toluene (10 mL/g) then azeotropically stripped (111° C., 2.5 h) to ensure anhydrous conditions. Zirconium propoxide (70% in propanol; 2 μmol/m$^2$) was diluted in an equal mass of toluene, added to the NPS/toluene slurry, then stirred at RT for 1 h. The slurry was then allowed to stir at reflux for 16 h under an inert atmosphere. The reaction was then cooled to RT and the particles were isolated via filtration. The particles were subsequently washed (10 ml/g) using the following sequence: 3×toluene, 3×formic acid (aqueous; 1% w/w), 7× water, 1× acetone/water (1:1 v/v), 2× acetone. Finally, the isolated, surface modified particles were dried for 16 h at 65° C. under 25 mm vacuum. Zirconium concentration was determined to be 793 ppm by ICP-AE. There was no noticeable particle size difference observed via SEM as compared to material before it was modified.

Example SPC-3

The surface modified particles from Example SPC-2 were heat treated at 450° C. for 6 hours followed by 5 hours at 750° C. Zirconium concentration was determined to be 812 ppm by ICP-AE.

Example SPC-4

The surface modified particles from Example SPC-2 were further modified by adding an additional layer of Zirconium following the process as described in Example SPC-2 after the initial heat treatment. Zirconium concentration was determined to be 1667 ppm by ICP-AE. There was no noticeable particle size difference observed via SEM as compared to material before it was modified.

Example SPC-5

The surface modified particles from Example SPC-4 were heat treated at 450° C. for 6 hours followed by 5 hours at 750° C. Zirconium concentration was determined to be 1682 ppm by ICP-AE.

Example SPC-6

The surface modified particles from Example SPC-2 are further modified by repeating the process as described in Example SPC-2, after the initial heat treatment and rehydroxylation, up to 60 times and/or to a total Zirconium thickness of 100 nm.

Example SPC-7

The surface modified particles from Example SPC-6 are heat treated at 450° C. for 6 hours followed by 5 hours at 750° C.-1300° C.

Example SPC-8

Control cores from Example SPC-1 were fully dispersed in toluene (18 mL/g) then azeotropically stripped (111° C., 1 h) to remove residual water from the material. These initial anhydrous conditions are important as they ensure water content accuracy when water is added in the subsequent step. The reaction temperature was held at 40° C. while 100% 1,2-bis(triethoxylsilyl)ethane (BTEE) PEOS (0.821 g PEOS/g NPS) was added and allowed to stir for 10 minutes followed by water in the form of an acid or base catalyst, in this case, NH$_4$OH$_{(aq)}$ (0.1 g base/g NPS). The reaction was stirred for an additional 10 minutes at 40° C. before the temperature was increased to 60° C. for 2 h. The reaction was then cooled to RT and the particles were isolated via filtration. The particles were subsequently washed twice with ethanol (10 ml/g) then redispersed in 70/30 (v/v) water/ethanol (10 mL/g). Ammonium Hydroxide (1 g NH$_4$OH/g NPS) was then added and the mixture was stirred at 50° C. for 2 h. The reaction was then cooled<40° C. and the particles were isolated via filtration. The isolated particles were washed (10 ml/g) using the following sequence: 2× methanol/water (1:1 v/v), 2× methanol. Finally, the isolated, surface modified particles were dried for 16 h at 80° C. under 25 mm vacuum. Carbon content was determined to be 435 ppm by Coulometric Carbon Analyzer.

Example SPC-8a

Nonporous silica particles (10.4 g, 1.26 μm), that were previously thermally treated at 600° C. (10 h) and rehydroxylated using 10% nitric acid (Fisher scientific), were dispersed in 100 mL of solvent (water: anhydrous ethanol 2:1 v/v) by sonicating for 10 minutes. Separately, octadecyltrimethylammonium bromide (2.46 g, C$_{18}$TAB, Sigma-Aldrich) was dissolved in 100 mL of solvent (water: anhydrous ethanol 2:1 v/v). The C$_{18}$TAB solution was then added into the particle solution and was sonicated for 10 minutes. This solution was labeled solution A. In a separate beaker of Pluronic P123 (39.0 g, Sigma-Aldrich) was dissolved in 400 mL of solvent (water: anhydrous ethanol 2:1 v/v) and was labeled solution B. Solution B (400 mL) was added into solution A (200 mL) and allowed to continue sonicate for 20 minutes. The mixture was then transferred into a 1 L round bottom flask and stirred at 750 rpm Ammonium hydroxide solution (30%, 24 mL, J. T. Baker) was added into the flask and allowed to continue stirring for 5 minutes. 1,2-bis(triethoxysilyl)ethane (6 mL, BTEE, Gelest) was first diluted with anhydrous ethanol (dilution factor=3) and then added to the flask with a peristaltic pump (ISMATEC, ISM596D equipped with 1/32 inch diameter PTFE tubing from Cole-Palmer) at a constant flow rate (50 μL/min). The reaction was allowed to continue stirring until all BTEE was added, allowed to stir for an extra hour before washing. The coating thickness was controlled by the amount of BTEE added to the reaction. The final concentrations reagents used were C$_{18}$TAB (2.6-17.27 mM), Pluronic P123 (3.5-22.16 mM), and BTEE (0.020-0.030 M). During the washing step, the sample was diluted four times the sample volume with deionized water, followed by centrifugation (Forma Scientific Model 5681, 2,500 rpm, 6 min). The wash sequence was repeated two times using sonication to redisperse particles. The growth process was done once to grow a hybrid layer on the nonporous silica core. Products were isolated by centrifugation and washed consecutively with copious amounts of water and methanol (HPLC grade, J. T. Baker, Phillipsburgh, N.J.) The particles were then dispersed in 2 M solution of hydrochloric acid in acetone, at room temperatures (30° C.). The mixture was mechanically stirred for 18 hours. Products were isolated by centrifugation (Forma Scientific Model 5681, 4000 rpm, 10 min) followed by 4 washes with DI water (or until pH is greater than 6) and 2 washes with methanol using sonication to redisperse particles. Products were dried at 80° C. under vacuum for 16 hours and submitted for, SEM, and nitrogen sorption analysis.

Example SPC-9

The process as described in Example SPC-8 and SPC-8a, after the initial heat treatment and rehydroxylation, is further expanded to include monomer and polymer inorganic and/or organic materials in place of 100% BTEE PEOS, as noted in patents [US 2014031905, 20150133294, 20150136700, 20130319086, 20130273404, 20130112605, 20130206665, 2012055860, 20110049056, 20120141789, 20140194283, 20090209722, 20100076103, as well as U.S. Pat. Nos. 9,248,383, 9,145,481, 9,120,083, 8,778,453, 8,658,277, 7,919,177, 7,223,473,6,686,035] up to 60 times and/or to a total surrounding material thickness of 200 nm.

Example SPC-10

Non-porous silica particles, as received, were heat treated (1090° C.) in air for 24 h. While not limited by theory, the increased temperature and time at temperature should allow for further densification of the silica core resulting in increased stability under high pH conditions. A significant degree of agglomerated particles were present after thermal treatment; this may be reduced by adding dispersants and/or surfactants prior to thermal treatment.

Example SPC-11

The modified core particles from Experiments SPC-1, SPC-2, SPC-8, and SPC-10, were subjected to elevated temperatures (100 and 140° C.) and pH (9.8) following the hydrothermal treatment process as noted by Jiang {U.S. Pat. Nos. 6,686,035; 7,223,473; 7,919,177} and Wyndham {WO 2008/103423}. Stability for these experiments was determined by evidence of silica dissolution via change in particle size (n, mode; Coulter) and SEM morphology (surface holes and indentations) compared to the starting material. A summary of these experiments can be viewed in Table SPC-1.

Results indicate none of the hydrothermally treated, core modified materials show evidence of core erosion at 100° C. or 140° C. Some morphology differences (surface indentations) were visible on the SEM images of the NPS material that was calcined at 1090° C. then hydrothermally treated. While not limited by theory, it is believed that these indentations are not due to silica dissolution; instead they are due to particles agglomerating together during thermal treatment at the extreme temperature then breaking apart during the sonication step before hydrothermal treatment, exposing non-spherical areas where the particles were once connected. It was therefore concluded that the surface modified cores resulted in no measureable high pH stability difference compared to the starting, non-modified, NPS under these conditions. Surprisingly, the non-modified NPS, control product (Sample 1) did not show evidence of dissolution after hydrothermal treatment at 100° C. or 140° C., Samples 1a and 1 b; respectively, either. The level of defects observed in each of the hydrothermally treated materials was equivalent to the defect level of the starting NPS materials, thus no morphology differences were reported. The lack of morphology change could indicate uniform dissolution; since the experiments were performed in a closed system dissolved silicates were allowed to redeposit onto the silica surface. Therefore, while not limited by theory, morphology changes observed in cores (surface holes and indentations), may indicate non-uniform dissolution.

TABLE SPC-1

|  |  | Control Cores | Higher Thermal Treatment Temperature | Single Zirconium Bonding | Single 100% BTEE Modification |
|---|---|---|---|---|---|
| Core Modification | Sample ID | 1 | 10 | 2 | 8 |
|  | SEM Observations | Spherical | Spherical | Spherical | Spherical |
|  | PS (n, mode) | 1.99 | 1.94 | 1.99 | 1.99 |
|  | Other | N/A | N/A | 793 ppm Zr | 435 ppm % C |
| 100° C. Hydrothermal Treatment | Sample ID | 1a | 10a | 2a | 8a |
|  | SEM Observations | Spherical | Several indentations | Spherical | Spherical |
|  | PS (n, mode) | 1.99 | 1.94 | 1.99 | 1.99 |
|  | Change in PS (n, mode) | 0.0 | 0.0 | 0.0 | 0.0 |
| 140° C. Hydrothermal Treatment | Sample ID | 1b | 10b | 2b | 8b |
|  | SEM Observations | Spherical | Several indentations | Spherical | Spherical |
|  | Particle Size (n, mode) | 1.99 | 1.94 | 1.99 | 1.99 |
|  | Change in PS (n, mode) | 0.0 | 0.0 | 0.0 | 0.0 |

Example SPC-12

The surface modified NPS cores from Examples SPC-1, SPC-3, SPC-5, SPC-8, and SPC-10 as well as 100% Zirconium cores were packed into a HPLC column (2.1×50 mm), dried (60° C., 30 in Hg), weighted, exposed to high pH conditions as described in "sample test 2" (10 mM Ammonium Bicarbonate, pH 10.5, 0.21 mL/min, 36 h), then re-dried and re-weighed. Results from this example can be found in Table SPC-2. Stability for these experiments was determined by evidence of silica dissolution via SEM morphology (surface holes, texture, and indentations) as well as change in particle size (n, mode; Coulter), column weight loss (%), and column bed loss (%), compared to the starting material. Not limited by theory, it is believed that any dissolved silicates would continue to travel with the mobile phase out of the column with minimal, if any, re-deposition of silica onto the surface of the NPS under the aforementioned testing conditions.

While significant silica dissolution was expected for the control (Sample 1), it was surprising that the BTEE surface modified product (Sample 8), and zirconium modified products (Samples 3 and 5) did not show an improvement over the control; all resulted in similar column weight losses and column bed voids of approximately 51% for both metrics. However, SEM images of the surface modified materials (FIGS. 7, 8, 9) show a slightly more wrinkled appearance as compared to the control (FIG. 10); while not limited by theory, this may indicate preferential dissolution of the silica core due to an inhomogeneous BTEE surface layer. This seems to suggest that if the process were optimized (i.e., higher coverage of surrounding material) as described in Examples SPC-6 and SPC-9, it may successfully reduce core erosion to a considerable degree.

The sample that was exposed to a higher thermal temperature (Sample 10) resulted in significantly less weight loss as compared to the control (Sample 1; 31% vs. 51%). Smooth particle surfaces, similar to the starting material, were observed in SEM images of this product (FIG. 11), indicating uniform erosion. As stated in Example SPC-10, a significant degree of agglomerated particles were observed after thermal treatment, while not limited by theory, it is believed that the large surface indentations seen in the images are not due to silica dissolution; instead they are due to particles agglomerating together during thermal treatment at the extreme temperature then breaking apart during the sonication step before packing, exposing non-spherical areas where the particles were once connected.

The 100% zirconium product (Sample 0) showed no signs of core erosion as determined by a 0% weight loss and 1% column void after 36 hours of testing under these high pH conditions.

TABLE SPC-2

| Sample ID | Example Ref. | Sample Description | Change in Column Weight (%) | Void in Column Bed (%) | Change in Particle Size (n, mode) | SEM Observations |
|---|---|---|---|---|---|---|
| 1 | 1 | Control Cores | −51% | −52% | −23.5 | Uniform Dissolution |
| 8 | 8 | Single 100% BTEE modification | −50% | −51% | −19.7 | Non-Uniform Dissolution |
| 10 | 10 | 1090° C. Thermal Treatment | −31% | −31% | −13.6 | Uniform Dissolution |
| 3 | 3 | Single Zr modification | −51% | −50% | −21.6 | Non-Uniform Dissolution |
| 5 | 5 | Double Zr modification | −52% | −49% | −17 | Non-Uniform Dissolution |
| 0 | n/a | 100% ZrO$_2$ Core | 0% | −1% | / | / |

Figure 7:
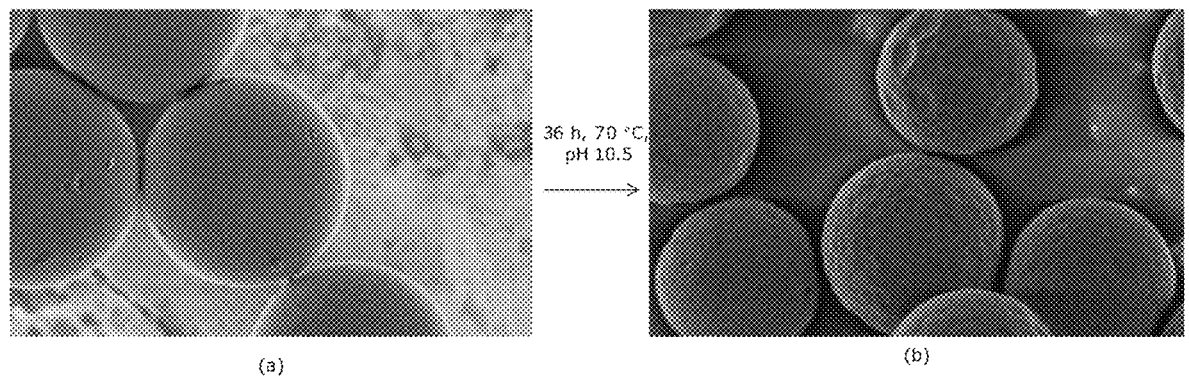
FIG. 7 shows Sample 8—NPS cores with single addition of 100% BTEE PEOS before (a) and after (b) exposure to high pH conditions.

FIG. 7 shows Sample 8—NPS cores with single addition of 100% BTEE PEOS before (a) and after (b) exposure to high pH conditions.

Figure 8:
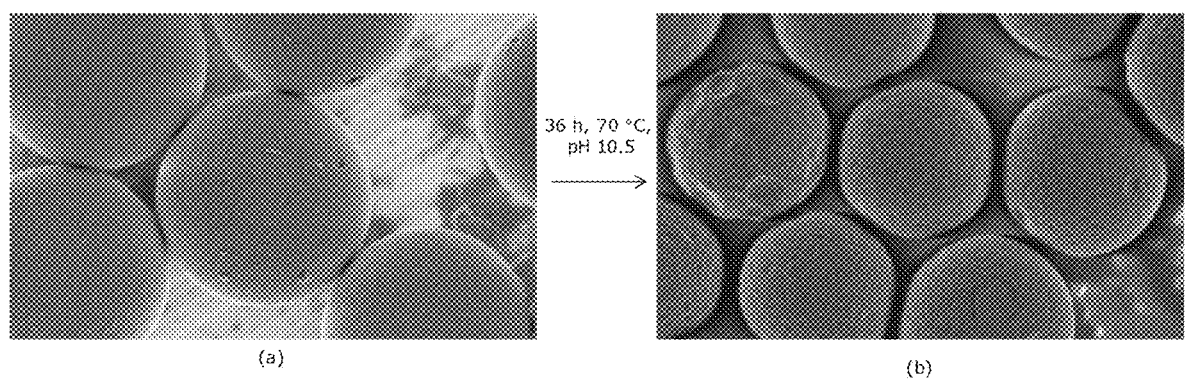
FIG. 8 shows Sample 3—NPS cores surface modified with a single addition of Zr before (a) and after (b) exposure to high pH.

FIG. 8 shows Sample 3—NPS cores surface modified with a single addition of Zr before (a) and after (b) exposure to high pH.

Figure 9:
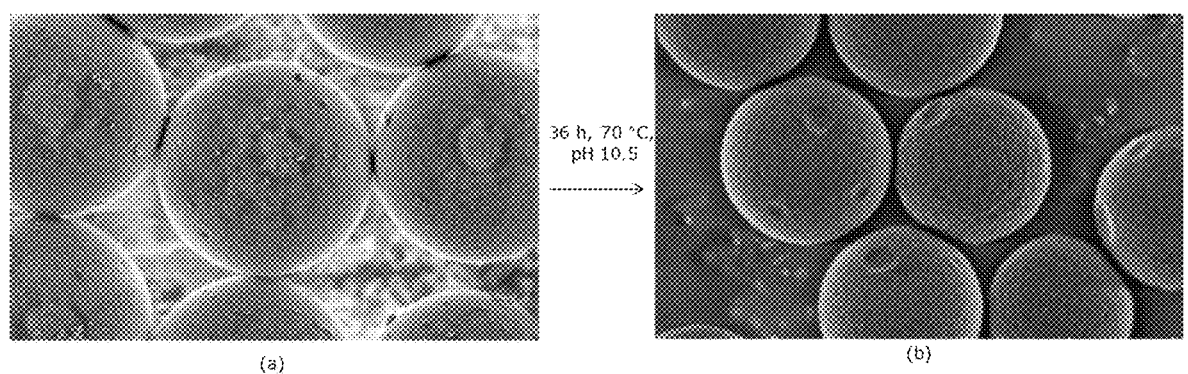
FIG. 9 shows Sample 5—NPS cores surface modified with a double addition of Zr before (a) and after (b) exposure to high pH.

FIG. 9 shows Sample 5—NPS cores surface modified with a double addition of Zr before (a) and after (b) exposure to high pH.

Figure 10:
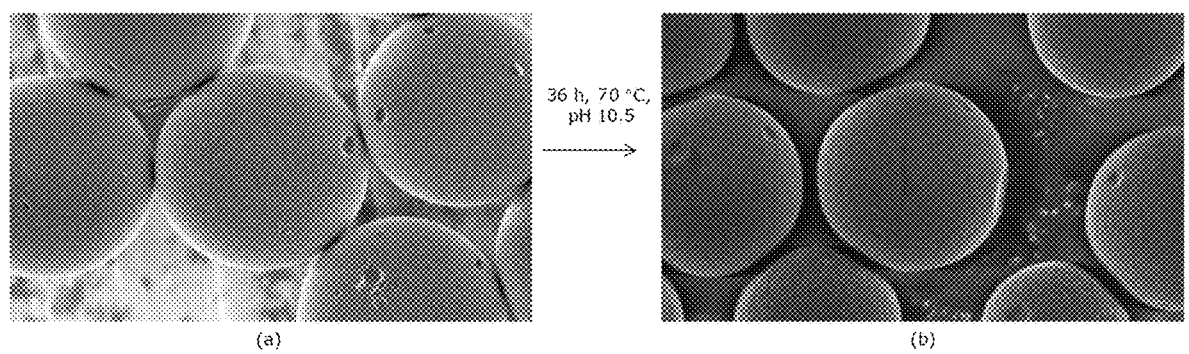
FIG. 10 shows Control NPS cores before (a) and after (b) exposure to high pH conditions.

FIG. 10 shows Control NPS cores before (a) and after (b) exposure to high pH conditions.

Figure 11:
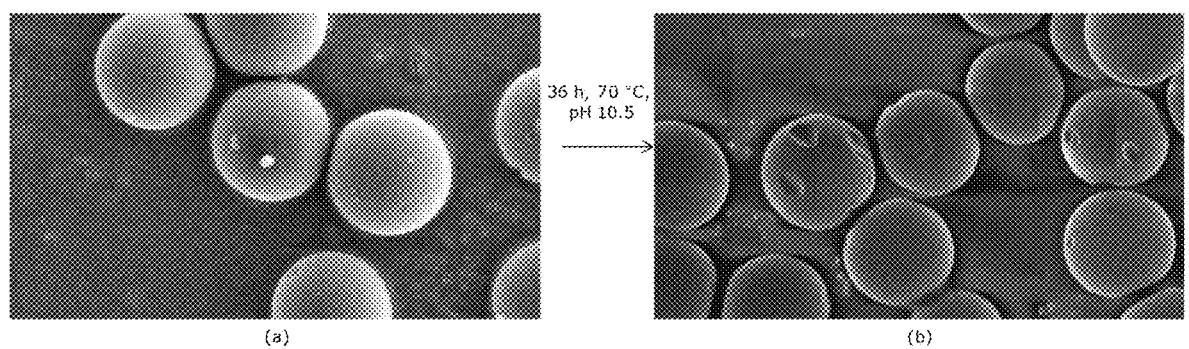
FIG. 11 shows NPS cores treated at a higher thermal temperature, compared to the control, before (a) and after (b) exposure to high pH conditions.

FIG. 11 shows NPS cores treated at a higher thermal temperature, compared to the control, before (a) and after (b) exposure to high pH conditions.

Example SPC-13

Figure 15:
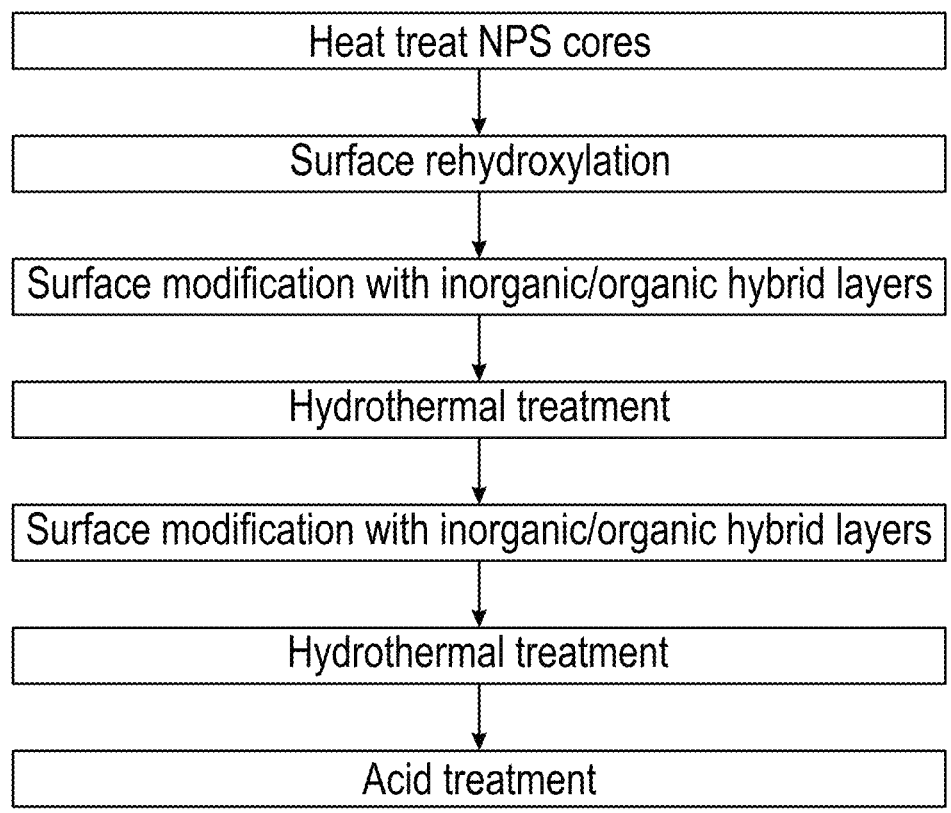
FIG. 15 shows a process of creating a hybrid surface on NPS cores.

Non-porous silica particles, as received, are heat treated (900-1300° C.) in air for 10-24 h. The surface of the particles are rehydroxylated using 10% v/v nitric acid at 100° C. for 16 h, then dried in at 80° C. under 25 mm vacuum. The surface of the core is then modified using the process described below (FIG. 15).

Heat treated NPS particles are fully dispersed in toluene (21 mL/g). An azeotropic strip (111° C., 1 h) is then performed to remove residual water from the material. These initial anhydrous conditions are important as they ensure water content accuracy when water is added in the subsequent step. The reaction temperature is held at 40° C. while 100% BTEE PEOS (0.821 g PEOS/g cores) is added and allowed to stir for 10 minutes followed by water in the form of a catalyst (0.03-0.1 g acid or base/g cores). The reaction is stirred for an additional 10 minutes at 40° C. before the temperature is increased to 60° C. for 2 h. The reaction is then cooled to RT and the particles are isolated via filtration. The particles are subsequently washed twice with ethanol (10 ml/g) then redispersed in 70/30 (v/v) water/ethanol (10 ml/g). Ammonium Hydroxide (1 g $NH_4OH$/g cores) is added and the mixture is stirred at 50° C. for 2 h. The reaction is then cooled<40° C. and the particles are isolated via filtration. The isolated particles are washed (10 ml/g) using the following sequence: 2× methanol/water (1:1 v/v), 2× methanol. Finally, the isolated, surface modified particles are dried for 16 h at 80° C. under 25 mm vacuum. The above process is repeated a 1-60 times.

To ensure uniformity of the hybrid layer produced above, the modified particles are exposed to elevated temperatures (100-140° C.) and pH (8-9.8) following the hydrothermal treatment process as noted by Jiang {U.S. Pat. Nos. 6,686,035; 7,223,473; 7,919,177} and Wyndham {WO 2008/103423}. The process of attaching 100% BTEE PEOS surrounding material, as described above, is repeated 1-60 additional times. The surface modified particles are again exposed to elevated temperatures (100-140° C.) and pH (8-9.8) following the hydrothermal treatment process as noted by Jiang {U.S. Pat. Nos. 6,686,035; 7,223,473; 7,919,177} and Wyndham {WO 2008/103423}.

The surface hybridized particles are then refluxed in 1 M HCl (8.4 ml/g) for 20 hours. The reaction is then cooled to RT and the particles are isolated via filtration. The particles are washed with copious amounts of water until the pH is increased to >5. The semi-neutralized particles are then washed thrice with acetone (10 ml/g). The particles are then sized to remove any agglomerated and fine particles that may be present.

FIG. 15 shows a process of creating a hybrid surface on NPS cores.

Example SPC-14

The process as described in Example SPC-13 is further expanded to include monomer and polymer inorganic and/or organic materials in place of 100% BTEE PEOS, as noted in patents [US 2014031905, 20150133294, 20150136700, 20130319086, 20130273404, 20130112605, 20130206665, 2012055860, 20110049056, 20120141789, 20140194283, 20090209722, 20100076103 as well as U.S. Pat. Nos. 9,248,383, 9,145,481, 9,120,083, 8,778,453, 8,658,277, 7,919,177, 7,223,473,6,686,035] and the surface modification process can be repeated up to 60 times and/or to a total surround material thickness of 200 nm.

Example SPC-15

The surface of the control core particles from Example SPC-1 were then modified as described below.

Superficially porous silica layers can be formed on non-porous silica core material, by the general approach of Stöber {U.S. Pat. No. 3,634,558; *J. Coll. Interf. Sci.*, 1968, 26,62}, using a polyelectrolyte layering process described by Lawrence {US 20130112605, US 20130206665}, Kirkland {US 20070189944; 20080277346}, Blue {*J. Chromatogr. A*, 2011, 1218 (44), 7989}, and Brennan {*J. Mater. Chem.*, 2012, 22, 13197}. In this process a porous layer was formed in a layer-by-layer approach using alternating additions of polyelectrolyte and silica nanoparticles (or silica sols){Muriithi, B. W. Ph.D. Thesis, University of Arizona, 2009, pp. 396}. In this process 8-12 layers of the same size nanoparticles were used.

As detailed in Lawrence {US 20130112605, US 20130206665}, the polyelectrolyte was removed by thermal treatment in air (540° C.) for 20 hours. To further strengthen these materials, a second thermal treatment (900° C.) was employed for 20 hours. A rehydroxylation step was then performed using the process described in Example 64 of Lawrence {US 20130112605, US 20130206665}.

The surface of the superficially porous cores were then modified with hybrid using the process below:

The superficially porous cores were fully dispersed in toluene (21 mL/g). An azeotropic strip (111° C., 1 h) was then performed to remove residual water from the material. These initial anhydrous conditions are important as they ensure water content accuracy when water is added in the subsequent step. The reaction temperature was held at 40° C. while 100% BTEE PEOS (0.821 g PEOS/g particle) was added and allowed to stir for 10 minutes followed by water in the form of a catalyst, in this case $NH_4OH_{(aq)}$ (0.03-0.1 g base/g particle). The reaction was stirred for an additional 10 minutes at 40° C. before the temperature was increased to 60° C. for 2 h. The reaction was then cooled to RT and the particles were isolated via filtration. The particles were subsequently washed twice with ethanol (10 ml/g) then redispersed in 70/30 (v/v) water/ethanol (10 mL/g). Ammonium Hydroxide (1 g $NH_4OH$/g particle) was added and the mixture was stirred at 50° C. for 2 h. The reaction was then cooled<40° C. and the particles were isolated via filtration. The isolated particles were washed (10 ml/g) using the following sequence: 2× methanol/water (1:1 v/v), 2× methanol. Finally, the isolated, surface modified particles were dried for 16 h at 80° C. under 25 mm vacuum. The above process was repeated a second time.

To ensure uniformity of the hybrid layer produced above, the modified particles were exposed to elevated temperatures (100-155° C.) and pH (8-9.8) following the hydrothermal treatment process as noted by Jiang {U.S. Pat. Nos. 6,686,035; 7,223,473; 7,919,177} and Wyndham {WO 2008/103423}. The process of attaching 100% BTEE PEOS surrounding material, as described above, was repeated one additional time for a 2.7 μm particle and two additional times for a 1.6 μm particle. The surface modified particles were again exposed to elevated temperatures (100-155° C.) and pH (8-9.8) following the hydrothermal treatment process as noted by Jiang {U.S. Pat. Nos. 6,686,035; 7,223,473; 7,919,177} and Wyndham {WO 2008/103423}.

The hybrid surface modified superficially porous particles were then refluxed in 1 M HCl (8.4 mL/g) for 20 hours. The reaction was then cooled to RT and the particles were isolated via filtration. The particles were washed with copious amounts of water until the pH was increased to >5. The semi-neutralized particles were then washed thrice with acetone (10 ml/g). The particles were sized to remove any agglomerates that may have been present. The surface of the particles were then bonded with $tC_{18}$

Example SPC-16

Non-porous silica particles, as received, are heat treated (900-1300° C.) in air for 10-24 h. The surface of the particles are rehydroxylated using 10% v/v nitric acid at 100° C. for 16 h, then dried in at 80° C. under 25 mm vacuum. The surface of the particles are then modified as described below.

Superficially porous silica layers can be formed on non-porous silica core material, by the general approach of Stöber {U.S. Pat. No. 3,634,558; J. Coll. Interf. Sci., 1968, 26,62}, using a polyelectrolyte layering process described by Lawrence {US 20130112605, US 20130206665}, Kirkland {US 20070189944; 20080277346}, Blue {J. Chromatogr. A, 2011, 1218 (44), 7989}, and Brennan {J. Mater. Chem., 2012, 22, 13197}. In this process a porous layer was formed in a layer-by-layer approach using alternating additions of polyelectrolyte and silica nanoparticles (or silica sols){Muriithi, B. W. Ph.D. Thesis, University of Arizona, 2009, pp. 396}. In this process 8-20 layers of the same size nanoparticles are used.

As detailed in Lawrence {US 20130112605, US 20130206665}, the polyelectrolyte is removed by thermal treatment in air (540° C.) for 20 hours. To further strengthen these materials, a second thermal treatment (900° C.) is employed for 20 hours. A rehydroxylation step is then performed using the process described in Example 64 of Lawrence {US 20130112605, US 20130206665}.

The surface of the superficially porous cores are then modified with hybrid using the process below:

The superficially porous cores are fully dispersed in toluene (21 mL/g). An azeotropic strip (111° C., 1 h) is then performed to remove residual water from the material. These initial anhydrous conditions are important as they ensure water content accuracy when water is added in the subsequent step. The reaction temperature is held at 40° C. while 100% BTEE PEOS (0.821 g PEOS/g particle) is added and allowed to stir for 10 minutes followed by water in the form of an acid or base catalyst (0.03-0.1 g acid or base/g particle). The reaction is stirred for an additional 10 minutes at 40° C. before the temperature is increased to 60° C. for 2 h. The reaction is then cooled to RT and the particles are isolated via filtration. The particles are subsequently washed twice with ethanol (10 ml/g) then redispersed in 70/30 (v/v) water/ethanol (10 mL/g). Ammonium Hydroxide (1 g NH$_4$OH/g particle) is added and the mixture is stirred at 50° C. for 2 h. The reaction is then cooled<40° C. and the particles are isolated via filtration. The isolated particles are washed (10 ml/g) using the following sequence: 2× methanol/water (1:1 v/v), 2× methanol. Finally, the isolated, surface modified particles are dried for 16 h at 80° C. under 25 mm vacuum. The above process is repeated up to 60 times and/or to a total surround material thickness of 200 nm.

To ensure uniformity of the hybrid layer produced above, the modified particles are exposed to elevated temperatures (100-155° C.) and pH (8-9.8) following the hydrothermal treatment process as noted by Jiang {U.S. Pat. Nos. 6,686,035; 7,223,473; 7,919,177} and Wyndham {WO 2008/103423}. The process of attaching 100% BTEE PEOS surrounding material, as described above, is repeated 1-60 additional times. The surface modified particles are again exposed to elevated temperatures (100-155° C.) and pH (8-9.8) following the hydrothermal treatment process as noted by Jiang {U.S. Pat. Nos. 6,686,035; 7,223,473; 7,919, 177} and Wyndham {WO 2008/103423}.

The hybrid surface modified superficially porous cores are then refluxed in 1 M HCl (8.4 mL/g) for 20 hours. The reaction is then cooled to RT and the particles are isolated via filtration. The particles are washed with copious amounts of water until the pH was increased to >5. The semi-neutralized particles are then washed thrice with acetone (10 ml/g). The particles are then sized to remove any agglomerates that may be present.

Example SPC-17

The process as described in Example SPC-16 is further expanded to include monomer and polymer inorganic and/or organic materials in place of or in addition to 100% BTEE PEOS, as noted in patents [US 2014031905, 20150133294, 20150136700, 20130319086, 20130273404, 20130112605, 20130206665, 2012055860, 20110049056, 20120141789, 20140194283, 20090209722, 20100076103 as well as U.S. Pat. Nos. 9,248,383, 9,145,481, 9,120,083, 8,778,453, 8,658,277, 7,919,177, 7,223,473,6,686,035].

Example SPC-18

Figure 12A:
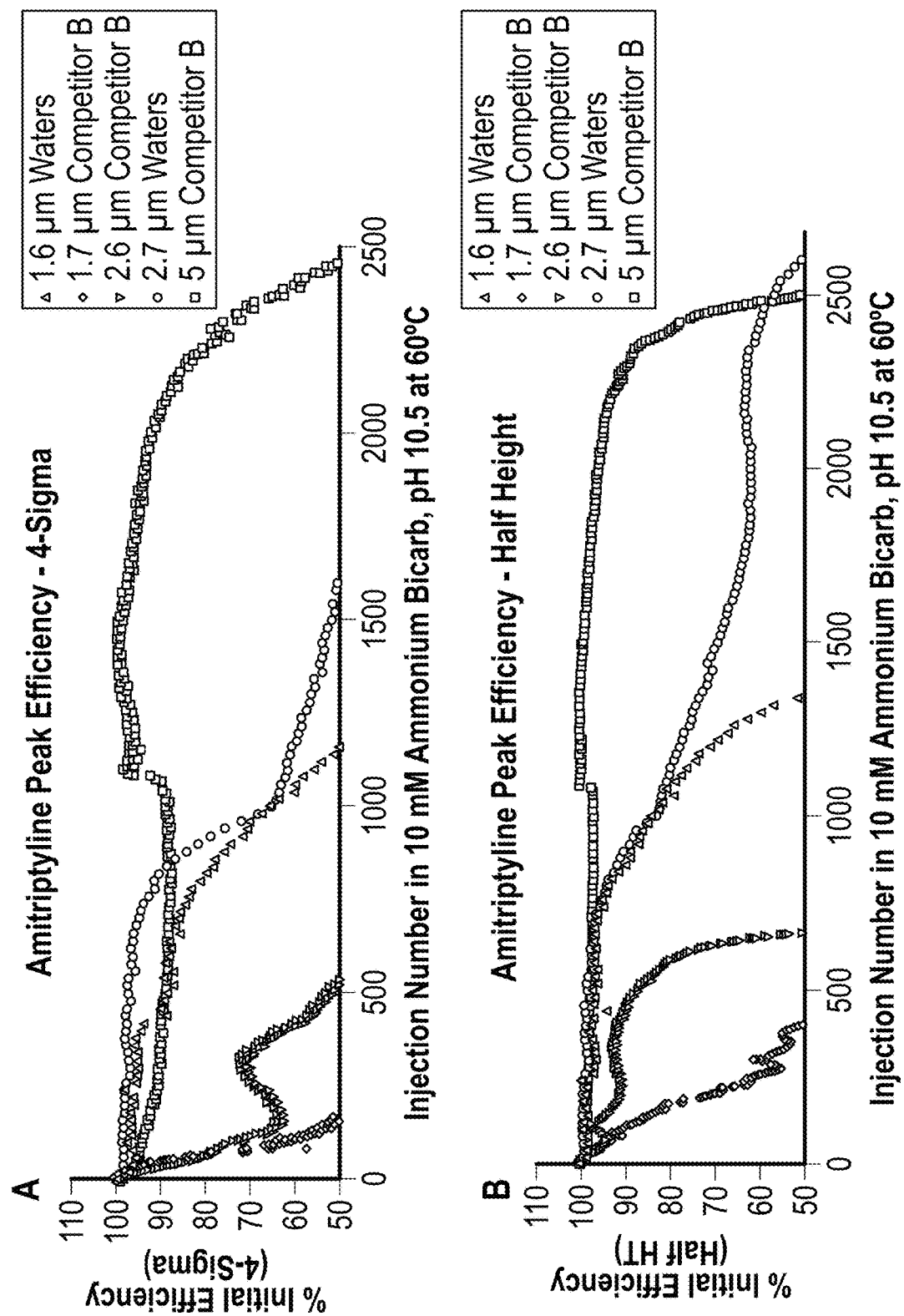
FIGS. 12A and 12B show High pH stability results as illustrated by percent change of 4-sigma initial efficiency (a), percent change of half height efficiency (b), tailing factor (c), percent change in pressure (d), Detailed testing conditions are described in "sample test 1".
Figure 12B:
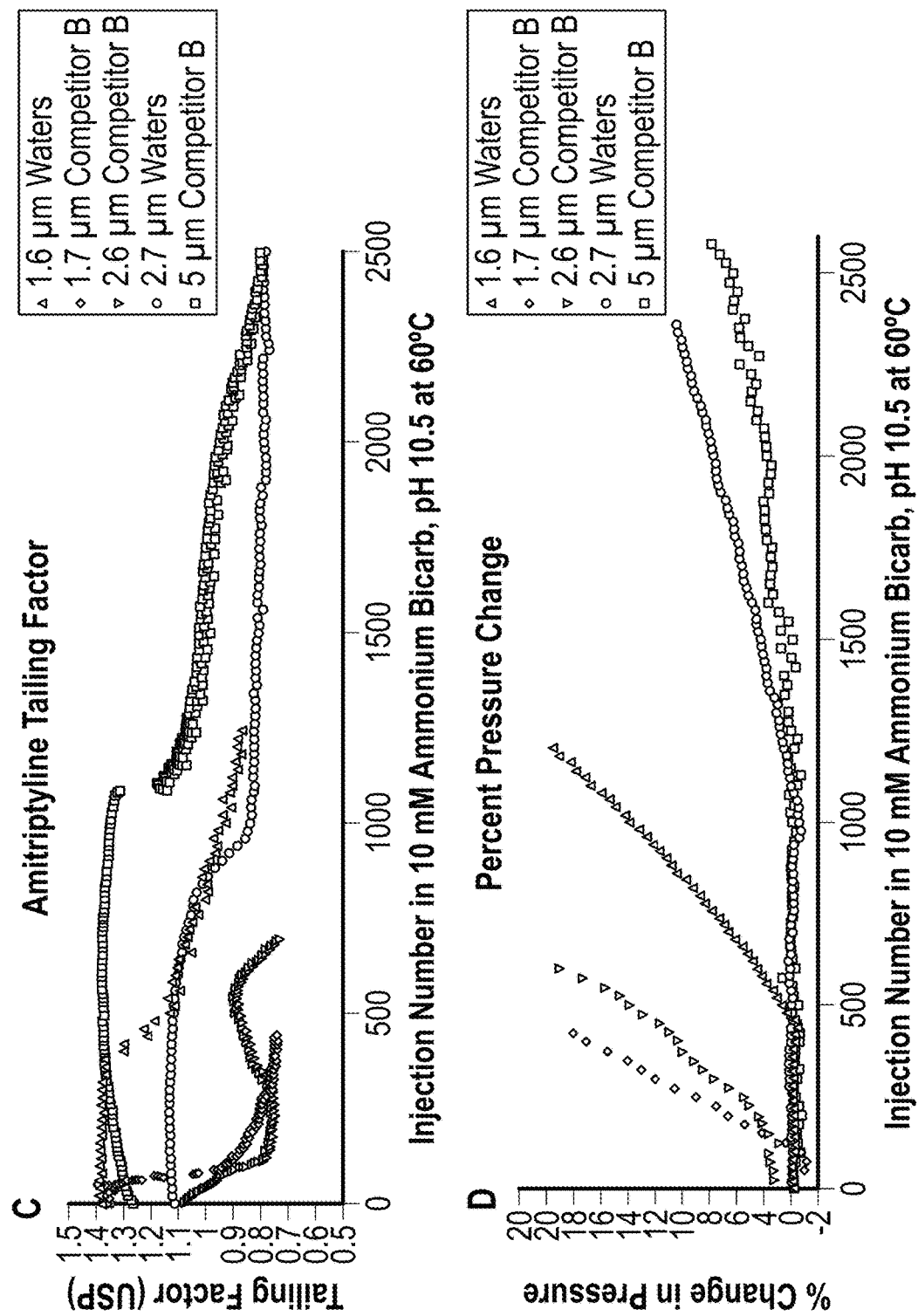

The surface modified superficially porous cores from Example SPC-15 were packed into HPLC columns (2.1×50 mm) and tested for stability under high pH conditions (10 mM Ammonium Bicarbonate, pH 10.5, 60° C.) using the mobile phase gradient as described in "sample test 1". FIGS. 12A and 12B shows stability data for columns packed with 1.6 μm and 2.7 μm particles produced using the process as described in Example SPC-15 as well as competitor columns for comparison. As shown in the figure, particles produced by the method in Example SPC-15 are significantly more stable under the tested conditions than the competitor columns. Although the coverage of surrounding material is slightly greater on the 1.6 μm particle size due to the repeated process step as compared to the 2.7 μm particles, a particle size influence on high pH stability is still observed by a drastic increase in both peak shape, seen as fronting (FIG. 12B c), and pressure (FIG. 12B, d).

FIGS. 12A and 12B shows High pH stability results as illustrated by percent change of 4-sigma initial efficiency (a), percent change of half height efficiency (b), tailing factor (c), percent change in pressure (d), Detailed testing conditions are described in "sample test 1".

Example SPC-19

While not limited by theory, bumpy cores increase the surface area around the core; this allows for more surface on which to build the initial hybrid layer. More significantly, it changes the curvature of the core.

An unmodified core is highly spherical and has very low surface area. When the porous layer is applied, a new interface between the core surface and the porous layer is produced. Localized areas of this interface (e.g., 10-100 nm regions of this core/porous layer interface), as imaged by BIB-SEM or FIB-SEM, indicate three possible states that can be uniform or non-uniform across the remaining core/porous-layer interface of a single particle. This observation of uniformity or non-uniformity can also be observed as homogeneous or heterogeneous throughout for multiple particles in a BIB-SEM or FIB-SEM analysis. It is desirable to have uniform morphology at this interface both within a particle and for a plurality of particles. The disadvantages of poor morphology at this interface can result in both mechanical and chemical instability.

Figure 13:
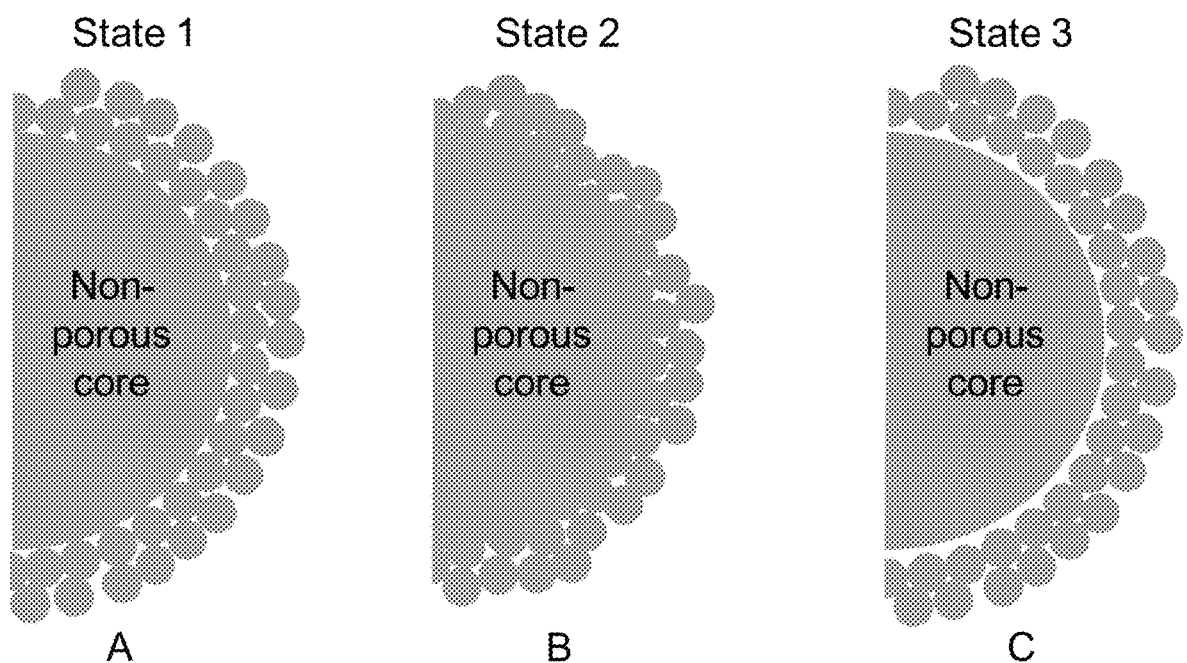
FIG. 13 shows (a) State 1—Direct contact of the porous layer with the particle core (b) State 2—Fused, coalesced, or sintered appearance of the porous layer with the particle core (c) State 3—No contact of the porous layer with the particle core

The three states of this core/porous-layer interface, as determined by BIB-SEM or FIB-SEM analysis, include;

(State 1) direct contact of the porous layer (as observed as nanoparticle) with the particle core (FIG. 13, a), (State 2) a fused, coalesced, or sintered appearance of the porous layer (as observed as a hemi-spherical nanoparticle interface) with the particle core (FIG. 13, b), or (State 3) no point of contact of the porous layer (as observed as a gap) with the particle core (FIG. 13, c).

When a hybrid surrounding material is applied on these differing core/porous-layer interfaces, different results are expected. For the region of state 3, the core and porous layer have independent surfaces. The concern for this region is mechanical instability, potential failure or delamination of the core/porous-layer interface, or chemical instability. The porous layer has a similar state of curvature between any two nanopariticles, and is this curvature is significantly higher than the curvature of an unmodified core. For the region of state 1, it is inconclusive if there is a strong attachment between the core and porous-layer. As such, there are concerns of mechanical instability, potential failure or delamination of the core/porous-layer interface, or chemical instability. There are additional concerns of differing surface curvatures between the core and porous layer. The porous layer has a similar state of curvature between any two nanopariticles, and is this curvature is significantly higher than the curvature of an unmodified core. The nanoparticle that is situated at the core/porous-layer interface creates a unique surface curvature that is higher than the curvature experience between any two nanoparticle in the porous layer.

State 2 is preferred. The ways in which state 2 can be obtained are:

(1) During the polyelectrolyte/nanoparticle layering process as described by Lawrence {US 20130112605, US 20130206665}, Kirkland {US 20070189944; 20080277346}, Blue {*J. Chromatogr. A,* 2011, 1218 (44), 7989}, and Brennan {*J. Mater. Chem.,* 2012, 22, 13197}, an initial sol (nanoparticle) layer is attached using the same sol size as subsequent layers to ensure improved adhesion of the porous layer to the core. This may be done in combination with a subsequent hydrothermal treatment(s) and/or thermal treatment(s) (560-1200° C.);

(2) A larger sol (nanoparticle) layer is attached for the initial porous layer using the process as described in (1) followed by the same or smaller sols for subsequent layers. It is desirable to consider larger sols for this initial layer because it would further reduce the surface curvature of State 2;

(3) Increase hydrothermal treatment temperature, pH, or both, increase temperature of thermal treatment, or modify both the hydrothermal treatment and thermal treatment temperature, as noted, after the initial sol layers are attached as described in (1) and (2) and/or after the final polyelectrolyte/nanoparticle layering process is complete.

FIG. 13 shows (a) State 1—Direct contact of the porous layer with the particle core (b) State 2—Fused, coalesced, or sintered appearance of the porous layer with the particle core (c) State 3—No contact of the porous layer with the particle core.

An example in which superficially porous cores were made using the same size sols as an initial layer combined with an aggressive hydrothermal treatment is described below.

Non-porous silica particles, as received, were heat treated (900° C.) in air for 10 h. The surface of the particles were rehydroxylated using 10% v/v nitric acid at 100° C. for 16 h, then dried in at 80° C. under 25 mm vacuum. The surface of the particles were then modified as described below.

Superficially porous silica layers are formed on nonporous silica core material, prepared by the general approach of Stöber {U.S. Pat. No. 3,634,558; *J. Coll. Interf. Sci.,* 1968, 26,62}, using a polyelectrolyte layering process described by Lawrence {US 20130112605, US 20130206665}, Kirkland {US 20070189944; 20080277346}, Blue {*J. Chromatogr. A,* 2011, 1218 (44), 7989}, and Brennan {*J. Mater. Chem.,* 2012, 22, 13197}. In this process a porous layer was formed in a layer-by-layer approach using alternating additions of polyelectrolyte and silica nanoparticles (or silica sols){Muriithi, B. W. Ph.D. Thesis, University of Arizona, 2009, pp. 396}. The initial 2 layers were formed using 6 nm sols to create a bumpy surface.

As detailed in Lawrence {US 20130112605, US 20130206665}, the polyelectrolyte was removed by thermal treatment in air at 560° C. (10-20 hours). The bumpy particles were then exposed to elevated temperature (100° C.) and pH (8) following the hydrothermal treatment process as noted by Jiang {U.S. Pat. Nos. 6,686,035; 7,223,473; 7,919,177}. The layer-by-layer approach as described above was continued using the same sized sols (6 nm) until a total of 8 layers were deposited on the surface of the core. The polyelectrolyte was removed using the same thermal treatment as described above followed by a second thermal treatment at 900° C. for 10-20 hours. A rehydroxylation step was performed using the process described in Example 64 of Lawrence {US 20130112605, US 20130206665}.

The surface of the superficially porous core was then modified with a hybrid layer using the surface modification processes employed in Examples SPC-15, SPC-16, or SPC-17.

Example SPC-20

Following the reasoning from Example SPC-19, an example in which superficially porous cores were made using different size sols as an initial layer combined with an aggressive hydrothermal treatment is described below.

Non-porous silica particles, as received, were heat treated (900° C.) in air for 10 h. The surface of the particles were rehydroxylated using 10% v/v nitric acid at 100° C. for 16 h, then dried in at 80° C. under 25 mm vacuum. The surface of the particles were then modified as described below.

Superficially porous silica layers are formed on nonporous silica core material, prepared by the general approach of Stöber {U.S. Pat. No. 3,634,558; *J. Coll. Interf. Sci.,* 1968, 26,62}, using a polyelectrolyte layering process described by Lawrence {US 20130112605, US 20130206665}, Kirkland {US 20070189944; 20080277346}, Blue {*J. Chromatogr. A,* 2011, 1218 (44), 7989}, and Brennan {*J. Mater. Chem.,* 2012, 22, 13197}. In this process a porous layer was formed in a layer-by-layer approach using alternating additions of polyelectrolyte and silica nanoparticles (or silica sols){Muriithi, B. W. Ph.D. Thesis, University of Arizona, 2009, pp. 396}. The initial 2 layers were formed using 12 nm sols to create a bumpy surface.

As detailed in Lawrence {US 20130112605, US 20130206665}, the polyelectrolyte was removed by thermal treatment in air at 560° C. (10-20 hours). The bumpy particles were then exposed to elevated temperature (100° C.) and pH (8) following the hydrothermal treatment process as noted by Jiang {U.S. Pat. Nos. 6,686,035; 7,223,473; 7,919,177}. The layer-by-layer approach as described above was continued using different sized sols (6 nm) as compared to the initial layers, until a total of 8 layers were deposited on the surface of the core. The polyelectrolye was removed using the same thermal treatment as described above followed by a second thermal treatment at 900° C. for 10-20 hours. A rehydroxylation step was performed using the process described in Example 64 of Lawrence {US 20130112605, US 20130206665}.

The surface of the superficially porous core was then modified with a hybrid layer using the surface modification process employed in Examples SPC-15, SPC-16, or SPC-17.

Example SPC-21

The process as described in Examples SPC-19 or SPC-20 is further expanded to include the same and/or varying sol sizes for different layers ranging from 1-100 nm to create initial sol layers ranging from 1-40 layers and total sol layers from 1-40 layers.

Example SPC-22

Following the reasoning from Example SPC-19, an example in which superficially porous cores were made using a higher temperature thermal treatment is below:

Non-porous silica particles, as received, were heat treated (900° C.) in air for 10 h. The surface of the particles was rehydroxylated using 10% v/v nitric acid at 100° C. for 16 h, then dried in at 80° C. under 25 mm vacuum. The surface of the particles was then modified as described below.

Superficially porous silica layers can be formed on non-porous silica core material, by the general approach of Stöber {U.S. Pat. No. 3,634,558; *J. Coll. Interf. Sci.*, 1968, 26,62}, using a polyelectrolyte layering process described by Lawrence {US 20130112605, US 20130206665}, Kirkland {US 20070189944; 20080277346}, Blue {*J. Chromatogr. A*, 2011, 1218 (44), 7989}, and Brennan {*J. Mater. Chem.*, 2012, 22, 13197}. In this process a porous layer was formed in a layer-by-layer approach using alternating additions of polyelectrolyte and silica nanoparticles (or silica sols) {Muriithi, B. W. Ph.D. Thesis, University of Arizona, 2009, pp. 396}. In this process 8 layers of the same size nanoparticles were used.

As detailed in Lawrence {US 20130112605, US 20130206665}, the polyelectrolyte was removed by thermal treatment in air (540° C.) for 20 hours. To further strengthen these materials, a second thermal treatment (1000° C. vs. 900° C. in previous examples) was employed for 2.5 hours. A rehydroxylation step was then performed using the process described in Example 64 of Lawrence {US 20130112605, US 20130206665}.

The surface of the superficially porous cores was then modified with hybrid using the process below:

The superficially porous cores were fully dispersed in toluene (13 mL/g). An azeotropic strip (111° C., 1 h) was then performed to remove residual water from the material. These initial anhydrous conditions are important as they ensure water content accuracy when water is added in the subsequent step. The reaction temperature was reduced to <40° C. while 100% BTEE PEOS (0.821 g PEOS/g particle) was added and allowed to stir for 10 minutes followed by 0.04 g water/g particle. The reaction was stirred for an additional 10 minutes at <40° C. before the temperature was increased to 80° C. for 1 h. The reaction was then heated to 111° C. and two additional azeotropic strips were performed at half hour intervals to remove excess water, and the volume of water removed was recorded. The reaction was held at 110° C. for 20 h. After a 20 h hold, the reaction was cooled to RT and the particles were isolated via filtration. The particles were subsequently washed twice with ethanol (10 ml/g) then redispersed in 70/30 (v/v) water/ethanol (10 mL/g). Ammonium Hydroxide (1 g NH$_4$OH/g particle) was added and the mixture was stirred at 50° C. for 4 h. The reaction was then cooled<40° C. and the particles were isolated via filtration. The isolated particles were washed (10 ml/g) using the following sequence: 2× methanol/water (1:1 v/v), 2× methanol. Finally, the isolated, surface modified particles were dried for 16 h at 70° C. under 25 mm vacuum. The above process was repeated a second time.

To ensure uniformity of the hybrid layer produced above, the modified particles were exposed to elevated temperatures (115° C.) and pH (8) following the hydrothermal treatment process as noted by Jiang {U.S. Pat. Nos. 6,686, 035; 7,223,473; 7,919,177} and Wyndham {WO 2008/103423}.

Example SPC-23

Example 22 is expanded to include thermal temperature treatments on the superficially porous cores in a range from 900-1300° C. these particles can then follow the general process as described in Examples SPC-15, SPC-16 or SPC-17.

Example SPC-24

As is, or surface modified non-porous silica particles as those described in Examples SPC-2-SPC-9, are heat treated (750-1300° C.) in air for 10-24 h. The surface of the particles are rehydroxylated using 10% v/v nitric acid at 100° C. for 16 h, then dried in at 80° C. under 25 mm vacuum. The surface of the particles are then modified as described below.

Superficially porous silica layers are formed on nonporous silica core material, prepared by the general approach of Stöber {U.S. Pat. No. 3,634,558; *J. Coll. Interf. Sci.*, 1968, 26,62}, using a polyelectrolyte layering process described by Lawrence {US 20130112605, US 20130206665}, Kirkland {US 20070189944; 20080277346}, Blue {*J. Chromatogr. A*, 2011, 1218 (44), 7989}, and Brennan {*J. Mater. Chem.*, 2012, 22, 13197}. In this process a porous layer is formed in a layer-by-layer approach using alternating additions of polyelectrolyte and silica nanoparticles (or silica sols){Muriithi, B. W. Ph.D. Thesis, University of Arizona, 2009, pp. 396}. In this process 1-40 layers of the same size or different sized nanoparticles are used using the process as described in Examples SPC-15, SPC-19, SPC-20, or SPC-21.

As detailed in Lawrence {US 20130112605, US 20130206665}, the polyelectrolyte is removed by thermal treatment in air at temperatures greater than 500-600° C. (10-20 hours). To further strengthen these materials, a second thermal treatment at 825-1000° C. for 10-20 hours is employed. A rehydroxylation step is performed using the process described in Example 64 of Lawrence {US 20130112605, US 20130206665}.

The surface of the superficially porous cores are then modified with a surrounding material using the surface modification process as described in Examples SPC-15 or SPC-16.

Example SPC-25

As is, or surface modified non-porous silica particles as those described in Examples SPC-2-SPC-9, are heat treated (750-1200° C.) in air for 10-24 h. The surface of the particles are rehydroxylated using 10% v/v nitric acid at 100° C. for 16 h, then dried in at 80° C. under 25 mm vacuum.

In this process superficially porous silica layers are formed on non-porous core material using a polyelectrolyte layering process described by Lawrence {US 20130112605, US 20130206665}, Kirkland {US 20070189944; 20080277346}, Blue {J. Chromatogr. A, 2011, 1218 (44), 7989}, and Brennan {J. Mater. Chem., 2012, 22, 13197}. The porous layer is formed in a layer-by-layer approach using alternating additions of polyelectrolyte and the same size or different size silica nanoparticles (or silica sols) {Muriithi, B. W. Ph.D. Thesis, University of Arizona, 2009, pp. 396. In this example, the layering process is stopped a single or multiple times before the final superficially porous core is created. During this hold, a surrounding material is attached, using a process similar to, but not limited by Example SPC-2, to the surface of the intermediate particle to create an impervious layer surrounding the core and sol layer(s). Once the surrounding material is attached, the layering process is continued until the desired thickness of porous layer is achieved (1-60 layers) (FIG. 14).

As detailed in Lawrence {US 20130112605, US 20130206665}, the polyelectrolyte is removed by thermal treatment in air at temperatures greater than 500-600° C. (10-20 hours). To further strengthen these materials, a second thermal treatment at 825-1000° C. for 10-20 hours is employed. A rehydroxylation step is performed using the process described in Example 64 of Lawrence {US 20130112605, US 20130206665}.

The superficially porous cores can then be further modified using the surface modification process as described in Examples SPC-15, SPC-16 or SPC-17.

Figure 14:
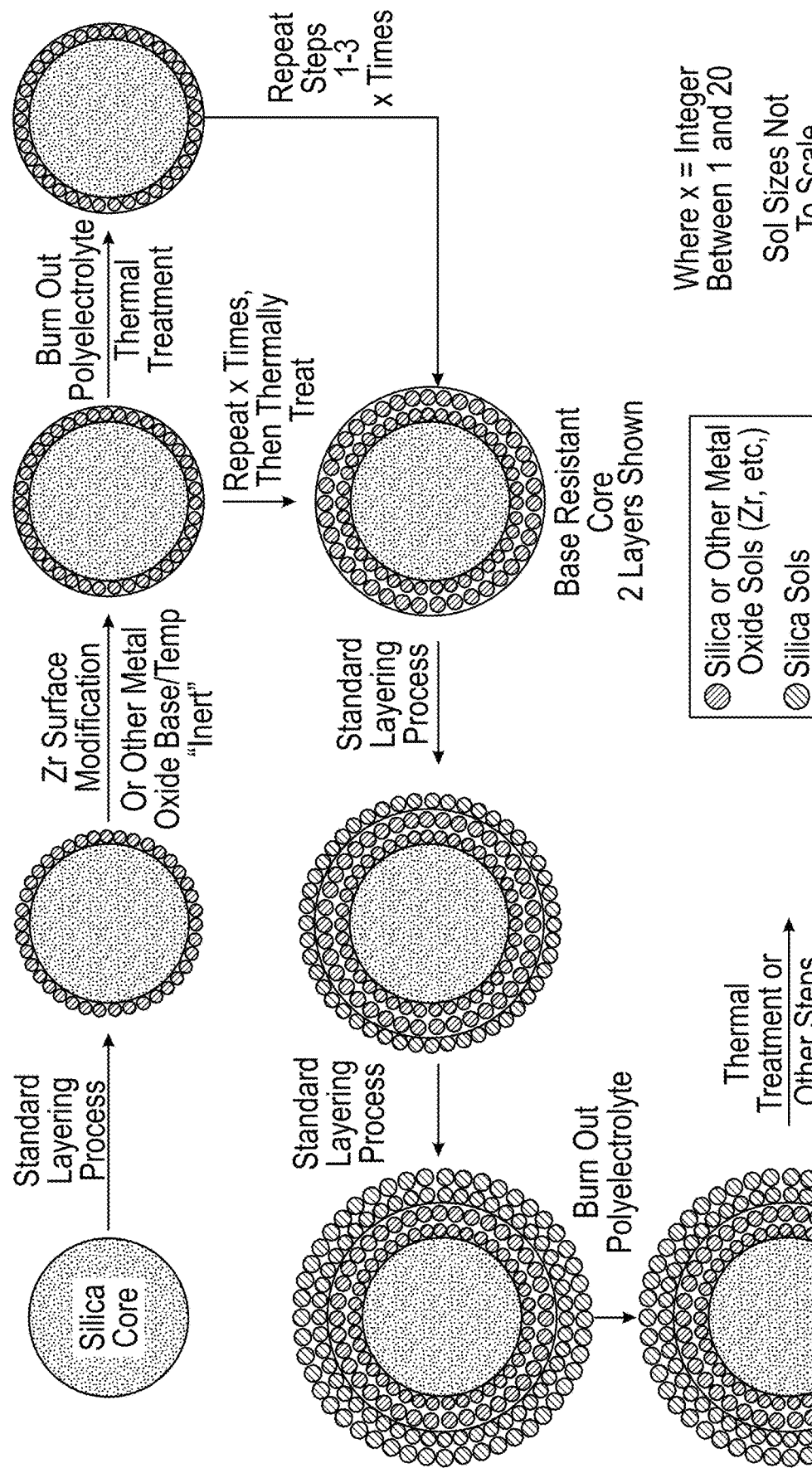
FIG. 14 shows a schematic depicting the pathway described in Example SPC-25.

FIG. 14 shows a schematic depicting pathway described in Example SPC-25.

Example SPC-26

As an alternative method to hydrothermal treatment for reducing microporosity post-surface modification and/or attaining a uniform coverage of pH stable surrounding material, one can use the following process at any point, in combination with or without the surface modification methods as detailed in Example SPC-16 or SPC-17:

Two grams of HPLC grade silica sorbent was dried at 160° C. for 2 hours in an air friction oven then cooled under dry nitrogen. Vacuum glassware components necessary for a simple bulb to bulb vapor transfer were dried in the same manner, assembled hot and cooled under dry nitrogen. The entire vacuum glassware assembly, with dried silica in bulb A and nothing in bulb B, was evacuated to 0.05 mm Hg. Bulb A was isolated and held under static 0.05 mm Hg vacuum. Bulb B was vented to dry nitrogen, infused with 4.2 grams of tetramethyldisilafuran, and re-evacuated to 0.1 mm Hg. Bulbs A and B were independently isolated from the vacuum pumping system. Tetramethyldisilafuran vapor was introduced into bulb A by allowing the bulbs A and B to equilibrate. After 2.5 hours of equilibration, the pressure in the bulbs was 8 mm Hg. Bulb A was isolated and held at reduced pressure and room temperature for 5 days. Bulb A was then vented to dry nitrogen and heated to 80° C. in an oil bath under dry nitrogen. The tetramethyldisilafuran vapor treated silica was transferred to a pressure filter, washed with twice with aliquots of toluene and aliquots of acetone, and vacuum dried overnight at 80° C. Portions of the untreated silica and the tetramethyldisilafuran vapor treated silica were analyzed by % C, nitrogen sorption and He pyncnometry. The tabulated analysis results (Table SPC-3) are consistent with tetramethyldisilafuran vapor condensation and reaction in the micropores of the base silica.

TABLE SPC-3

| Metric | Base Silica | Tetremethyldisilafuran Treated Silica |
|---|---|---|
| % C | 0.15 | 1.28 |
| N2 Sorption | | |
| SA (m2/g) | 333 | 295 |
| TPV (cc/g) | 0.87 | 0.82 |
| BJH Des APD (A) | 99 | 98 |
| T-Plot Micropore Area (m2/g) | 55 | 10 |
| T-Plot Micropore Vol (cc/g) | 0.022 | −0.0005 |
| He Pyncnometry | | |
| Skeletal density (g/cc) | 2.143 | 2.069 |

Example SPC-27

The process as described in Example SPC-25 can be followed in combination with or without the surface modification methods as detailed in Examples SPC-16 or SPC-17 using superficially porous cores as prepared in the process below. Here, the general process as described in Example SPC-26 is expanded to include monomer and polymer inorganic and/or organic materials in place of or in addition to tetramethyldisilafuran, such as 1,1,3,3,5,5-hexaethoxy-1,3,5-trisilacyclohexane, and/or as noted in patents [US 2014031905, 20150133294, 20150136700, 20130319086, 20130273404, 20130112605, 20130206665, 2012055860, 20110049056, 20120141789, 20140194283, 20090209722, 20100076103 as well as U.S. Pat. Nos. 9,248,383, 9,145,481, 9,120,083, 8,778,453, 8,658,277, 7,919,177, 7,223,473, 6,686,035]. This process may be repeated 1-60 times.

Superficially porous silica layers can be formed on non-porous silica core material, by the general approach of Stöber {U.S. Pat. No. 3,634,558; J. Coll. Interf. Sci., 1968, 26,62}, using a polyelectrolyte layering process described by Lawrence {US 20130112605, US 20130206665}, Kirkland {US 20070189944; 20080277346}, Blue {J. Chromatogr. A, 2011, 1218 (44), 7989}, and Brennan {J. Mater. Chem., 2012, 22, 13197}. In this process a porous layer was formed in a layer-by-layer approach using controlled cores from Example SPC-1 and alternating additions of polyelectrolyte and silica nanoparticles (or silica sols){Muriithi, B. W. Ph.D. Thesis, University of Arizona, 2009, pp. 396}. In this process 8-12 layers of the same size nanoparticles are used.

As detailed in Lawrence {US 20130112605, US 20130206665}, the polyelectrolyte is removed by thermal treatment in air (540° C.) for 20 hours. To further strengthen these materials, a second thermal treatment (900° C.) is employed for 20 hours. A rehydroxylation step is then performed using the process described in Example 64 of Lawrence {US 20130112605, US 20130206665}.

Example SPC-28

The surface of the control core particles from Example SPC-1 were modified as described below.

Superficially porous silica layers can be formed on non-porous silica core material, by the general approach of Stöber {U.S. Pat. No. 3,634,558; J. Coll. Interf. Sci., 1968, 26,62}, using a polyelectrolyte layering process described by Lawrence {US 20130112605, US 20130206665}, Kirkland {US 20070189944; 20080277346}, Blue {*J. Chromatogr. A*, 2011, 1218 (44), 7989}, and Brennan {*J. Mater. Chem.*, 2012, 22, 13197}. In this process a porous layer was formed in a layer-by-layer approach using alternating additions of polyelectrolyte and silica nanoparticles (or silica sols){Muriithi, B. W. Ph.D. Thesis, University of Arizona, 2009, pp. 396}. In this process 12 layers of the same size nanoparticles were used.

As detailed in Lawrence {US 20130112605, US 20130206665}, the polyelectrolyte was removed by thermal treatment in air (540° C.) for 20 hours. To further strengthen these materials, a second thermal treatment (900° C.) was employed for 20 hours. A rehydroxylation step was then performed using the process described in Example 64 of Lawrence {US 20130112605, US 20130206665}.

For the same reasoning as described in Example SPC-26, one can use the following process at any point, in combination with or without the surface modification methods as detailed in Examples SPC-16 or SPC-17:

Tetramethyldisilafuran was thoroughly mixed with superficially porous cores (7.7 g/g particles) in a round bottom flask. The slurry was evacuated (25 mm Hg) thrice while stirring. The flask was vented, slowly heated to 80° C. under a nitrogen atmosphere, then held at temperature for 2.7 h. Upon cooling<40° C., the material was washed twice with toluene and then twice with acetone(5 mL/g). The material was dried overnight 80° C. under 25 mm vacuum.

Example SPC-29

The process as described in Example SPC-28, after the initial heat treatment and rehydroxylation, is further expanded to include monomer and polymer inorganic and/or organic materials in place of Tetramethyldisilafuran, such as 1,1,3,3,5,5-hexaethoxy-1,3,5-trisilacyclohexane, and/or as noted in patents [US 2014031905, 20150133294, 20150136700, 20130319086, 20130273404, 20130112605, 20130206665, 2012055860, 20110049056, 20120141789, 20140194283, 20090209722, 20100076103, as well as U.S. Pat. Nos. 9,248,383, 9,145,481, 9,120,083, 8,778,453, 8,658,277, 7,919,177, 7,223,473,6,686,035]. This process may be repeated 1-60 times.

Example SPC-30

Non-porous silica particles, as received, were heat treated (900° C.) in air for 10 h. The surface of the particles were rehydroxylated using 10% v/v nitric acid at 100° C. for 16 h, then dried at 80° C. under 25 mm vacuum.

Zirconium butoxide (80 wt % in 1-butanol) solution was added (1 g/g particle) to a premixed solution of 1:0.012 wt/wt butanol: stearic acid (6.5 g/g particle). The solution was then stirred at 200 rpm for 1 h. To a separate beaker, water (1.8 g) and butanol (70.4 g) was added to 13 g of the above NPS silica particles. The particles were thoroughly dispersed via sonication. The slurry was then added to the butanol/stearic acid/zirconium mixture and agitated for 21 min at 150 rpm. The mixture was then quenched with acetone (350 g) and allowed to settle. The supernatant was decanted and the quenching process was repeated.

After the second decanting, the material was air dried (16 h) then thermally treated in air at 120° C. for 3 h, 450° C. for 3 h, and then 750° C. for 5 h. The particles were then sized to isolate singlet particles from agglomerates. The resulting surrounding material averaged in a thickness of 45 nm by FE-SEM, indicating thick coverage of surrounding material.

Example SPC-31

The process from Example SPC-30 is further expanded to include alumina, titanium oxide, cerium oxide or mixtures thereof.

INCORPORATION BY REFERENCE

The entire contents of all patents published patent applications and other references cited herein are hereby expressly incorporated herein in their entireties by reference.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. An inorganic/organic hybrid material comprising (a) a nonporous inorganic/organic hybrid surrounding material and (b) a superficially porous core that comprises a substantially nonporous core having a pore volume of less than 0.10 cc/g and one or more layers or porous inorganic/organic hybrid shell material surrounding the core, wherein the inorganic/organic hybrid shell material is different from the material of the superficially porous core and wherein the inorganic/organic hybrid surrounding material is condensed on the superficially porous core.

2. The inorganic/organic hybrid material of claim 1, wherein the inorganic/organic surrounding material is derived from
   condensation of one or more polymeric organofunctional metal precursors, and/or polymeric metal oxide precursors on a surface of the superficially porous core, or
   application of partially condensed polymeric organofunctional metal precursors, a mixture of two or more polymeric organofunctional metal precursors, or a mixture of one or more polymeric organofunctional metal precursors with a polymeric metal oxide precursors on a surface of the superficially porous core.

3. The inorganic/organic hybrid material of claim 2, wherein the inorganic portion of the inorganic/organic surrounding material is selected from the group consisting of alumina, silica, titania, cerium oxide, or zirconium oxide, and ceramic materials.

4. The inorganic/organic hybrid material of claim 1, wherein the inorganic/organic surrounding material is derived from
   condensation of one or more organofunctional silanes and/or tetraalkoxysilane on a surface of the superficially porous core, or
   application of partially condensed organofunctional silane, a mixture of two or more organofunctional silanes, or a mixture of one or more organofunctional silanes with a tetraalkoxysilane on a surface of the superficially porous core.

5. The inorganic/organic hybrid material of claim 1, wherein the inorganic/organic portion of the inorganic/organic surrounding material is selected from the group consisting of alumina, silica, titanium oxide, cerium oxide, zirconium oxide and ceramic materials.

6. The inorganic/organic hybrid material of claim 1, wherein the inorganic/organic surrounding material comprises a material of formula I:

$$(SiO_2)_d/[R^2((R)_p(R^1)_q SiO_t)_m];  \quad (I)$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0;

t is 0.5, 1.0, or 1.5;

d is 0 to about 30;

m is an integer from 1-20; wherein R, $R^1$ and $R^2$ are optionally substituted; provided that:

(1) when $R^2$ is absent, $m = 1$ and $t = \dfrac{(4 - (p+q))}{2}$, when $0 < p + q < 3$; and (2) when $R^2$ is present, $m = 2\text{-}20$ and $t = \dfrac{(3 - (p+q))}{2}$, when $p + q < 2$.

7. The inorganic/organic hybrid material of claim 1, wherein the inorganic/organic surrounding material comprises a material of formula II:

$$(SiO_2)_d/[(R)_p(R^1)_q SiO_t]  \quad (II);$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

8. The inorganic/organic hybrid material of claim 1, wherein the inorganic/organic surrounding material comprises a material of formula III:

$$(SiO_2)d/[R^2((R^1)_r SiO_t)_m]  \quad (III)$$

wherein $R^1$ is $C_1$-$C_{18}$ alkoxy, $C_1$-$C_{18}$ alkyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

9. The inorganic/organic hybrid material of claim 1, wherein the inorganic/organic hybrid shell has formula I:

$$(SiO_2)_d/[R^2((R)_p(R^1)_q SiO_t)_m];  \quad (I)$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

p and q are each independently 0.0 to 3.0;

t is 0.5, 1.0, or 1.5;

d is 0 to about 30;

m is an integer from 1-20; wherein R, $R^1$ and $R^2$ are optionally substituted;

provided that:

(1) when $R^2$ is absent, $m = 1$ and $t = \dfrac{(4 - (p+q))}{2}$, when $0 < p + q < 3$; and (2) when $R^2$ is present, $m = 2 - 20$ and $t = \dfrac{(3 - (p+q))}{2}$, when $p + q < 2$.

10. The inorganic/organic hybrid material of claim 1, wherein the inorganic/organic hybrid shell has formula II:

$$(SiO_2)_d/[(R)_p(R^1)_q SiO_t]  \quad (II);$$

wherein,

R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

d is 0 to about 30;

p and q are each independently 0.0 to 3.0, provided that when p+q=1 then t=1.5; when p+q=2 then t=1; or when p+q=3 then t=0.5.

11. The inorganic/organic hybrid material of claim 1, wherein the inorganic/organic hybrid shell has formula III:

$$(SiO_2)_d/[R^2((R^1)_n SiO_t)_m]  \quad (III)$$

wherein, $R^1$ is $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl;

$R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms;

d is 0 to about 30;

r is 0, 1 or 2, provided that when r=0 then t=1.5; or when r=1 then t=1; or when r=2 then t=0.5; and m is an integer from 1-20.

12. The inorganic/organic hybrid material of claim 1, wherein the superficially porous core is a particle.

13. The inorganic/organic hybrid material of claim 1, wherein the inorganic/organic hybrid material is hydrolytically stable at a pH of about 1 to about 14.

14. The inorganic/organic hybrid material of claim 1, wherein said inorganic/organic hybrid material has been surface modified by coating with a polymer.

15. The inorganic/organic hybrid material of claim 1, wherein said inorganic/organic hybrid material has been surface modified by a combination of organic group and silanol group modification.

16. The inorganic/organic hybrid material of claim 1, wherein said inorganic/organic hybrid material has been surface modified by a combination of organic group modification and coating with a polymer.

17. The inorganic/organic hybrid material of claim 1, wherein said inorganic/organic hybrid material has been surface modified by a combination of silanol group modification and coating with a polymer.

18. The inorganic/organic hybrid material of claim 1, wherein said inorganic/organic hybrid material has been surface modified via formation of an organic covalent bond between an organic group of the inorganic/organic hybrid material and a modifying reagent.

19. The inorganic/organic hybrid material of claim 1, wherein said inorganic/organic hybrid material has been surface modified by a combination of organic group modification, silanol group modification and coating with a polymer.

20. The inorganic/organic hybrid material of claim 1, wherein said inorganic/organic hybrid material has been surface modified by silanol modification.

21. The inorganic/organic hybrid material of claim 1, wherein the superficially porous core is derived from condensation of one or more organofunctional silanes selected from the following:

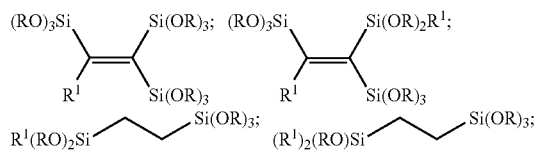

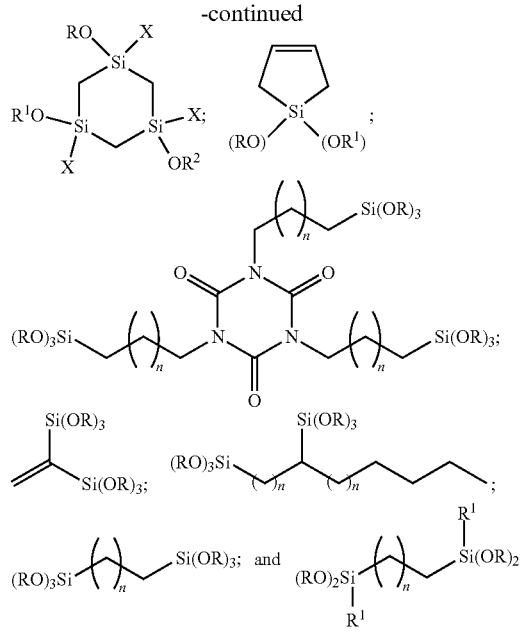

wherein R and $R^1$ are each independently $C_1$-$C_{18}$ alkoxy, $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_5$-$C_{18}$ aryloxy, or $C_1$-$C_{18}$ heteroaryl and wherein $R^2$ is $C_1$-$C_{18}$ alkyl, $C_2$-$C_{18}$ alkenyl, $C_2$-$C_{18}$ alkynyl, $C_3$-$C_{18}$ cycloalkyl, $C_1$-$C_{18}$ heterocycloalkyl, $C_5$-$C_{18}$ aryl, $C_1$-$C_{18}$ heteroaryl; or absent; wherein each $R^2$ is attached to two or more silicon atoms; wherein n is 1-8.

* * * * *